(12) United States Patent
Lee et al.

(10) Patent No.: US 10,649,647 B2
(45) Date of Patent: May 12, 2020

(54) DEVICE AND METHOD OF PROVIDING HANDWRITTEN CONTENT IN THE SAME

(71) Applicant: Samsung Electronics Co., Ltd., Suwon-si, Gyeonggi-do (KR)

(72) Inventors: Ki-bok Lee, Seoul (KR); Adrien Delaye, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 14/940,854

(22) Filed: Nov. 13, 2015

(65) Prior Publication Data

US 2016/0147434 A1 May 26, 2016

(30) Foreign Application Priority Data

Nov. 25, 2014 (KR) .................. 10-2014-0165496

(51) Int. Cl.
| | | |
|---|---|---|
| G06F 3/0488 | (2013.01) | |
| G06F 17/24 | (2006.01) | |
| G06F 3/0482 | (2013.01) | |
| G06F 3/0484 | (2013.01) | |
| G06F 3/0486 | (2013.01) | |
| G06K 9/00 | (2006.01) | |

(Continued)

(52) U.S. Cl.
CPC ........ G06F 3/04883 (2013.01); G06F 3/0482 (2013.01); G06F 3/0486 (2013.01); G06F 3/04842 (2013.01); G06F 3/04847 (2013.01); G06F 40/171 (2020.01); G06K 9/00409 (2013.01); G06K 9/00463 (2013.01); G06K 9/6253 (2013.01)

(58) Field of Classification Search
CPC ...... G06K 9/62; G06K 9/00416; G06F 3/048; G06F 17/30705; G06F 3/04883
See application file for complete search history.

(56) References Cited

U.S. PATENT DOCUMENTS 5,850,477 A * 12/1998 Takada ................ G06F 3/04883
382/186
5,889,523 A 3/1999 Wilcox et al.
(Continued)

FOREIGN PATENT DOCUMENTS

| JP | 2010-170500 A | 8/2010 |
|---|---|---|
| JP | 2013-254496 A | 12/2013 |

(Continued)

OTHER PUBLICATIONS

"Handle Flags: Efficient and Flexible Selections for Inking Applications," Sep. 1, 2011 https://www.youtube.com/watch?v=snSJyih_49o.

(Continued)

*Primary Examiner* — Li P Sun
*Assistant Examiner* — Qi Wan
(74) *Attorney, Agent, or Firm* — Jefferson IP Law, LLP

(57) ABSTRACT

A device for providing handwritten content is provided. The device includes a controller configured to segment handwritten content into a plurality of objects by grouping strokes included in the handwritten content and process the respective segmented plurality of objects in a form of a selectable object, and a display configured to display the handwritten content including the processed plurality of objects.

28 Claims, 37 Drawing Sheets

(51) Int. Cl.
  *G06F 40/171* (2020.01)
  *G06K 9/62* (2006.01)

(56) References Cited

U.S. PATENT DOCUMENTS

| | | | |
|---|---|---|---|
| 6,320,601 B1 | 11/2001 | Takasu et al. | |
| 6,459,442 B1 | 10/2002 | Edwards et al. | |
| 6,600,834 B1 | 7/2003 | Su et al. | |
| 7,286,131 B2 * | 10/2007 | Brodie | G06T 11/206 345/418 |
| 7,739,622 B2 | 6/2010 | Deline et al. | |
| 8,281,250 B2 | 10/2012 | Carter et al. | |
| 8,601,393 B2 | 12/2013 | Carter et al. | |
| 9,082,064 B2 | 7/2015 | Song et al. | |
| 2002/0007309 A1 * | 1/2002 | Reynar | G06F 17/2785 705/14.23 |
| 2003/0038788 A1 * | 2/2003 | Demartines | G06F 3/0485 345/173 |
| 2003/0067497 A1 * | 4/2003 | Pichon | G06F 9/4443 715/853 |
| 2003/0215145 A1 * | 11/2003 | Shilman | G06F 3/04883 382/195 |
| 2004/0003350 A1 | 1/2004 | Simmons et al. | |
| 2004/0148577 A1 * | 7/2004 | Xu | G06F 3/04883 715/268 |
| 2005/0091203 A1 * | 4/2005 | Liu | G06F 17/30719 |
| 2007/0083487 A1 | 4/2007 | Wolfe et al. | |
| 2007/0085858 A1 * | 4/2007 | Takimoto | G06F 17/30864 345/619 |
| 2007/0140565 A1 * | 6/2007 | Lin | G06K 9/00416 382/203 |
| 2007/0140566 A1 * | 6/2007 | Lin | G06K 9/00416 382/203 |
| 2007/0174790 A1 * | 7/2007 | Jing | G06F 17/30265 715/838 |
| 2008/0069473 A1 | 3/2008 | Tojo | |
| 2008/0158201 A1 * | 7/2008 | Yoshida | G06F 3/04883 345/179 |
| 2008/0184157 A1 * | 7/2008 | Selig | G06F 17/243 715/781 |
| 2008/0231635 A1 | 9/2008 | Saund | |
| 2009/0007019 A1 * | 1/2009 | Kobayashi | G06F 17/3028 715/838 |
| 2009/0193350 A1 | 7/2009 | Carter et al. | |
| 2010/0004031 A1 * | 1/2010 | Kim | H04M 1/274525 455/566 |
| 2011/0083099 A1 | 4/2011 | Eun | |
| 2013/0159916 A1 * | 6/2013 | Wadayama | G06F 3/0488 715/776 |
| 2013/0305146 A1 | 11/2013 | Hashiba et al. | |
| 2013/0332831 A1 | 12/2013 | Birnkrant et al. | |
| 2014/0068517 A1 * | 3/2014 | Bae | G06F 3/04842 715/835 |
| 2014/0086489 A1 * | 3/2014 | Motoi | G06K 9/00402 382/187 |
| 2014/0119659 A1 * | 5/2014 | Sugiura | G06K 9/00416 382/189 |
| 2014/0297646 A1 * | 10/2014 | Bastiaens | G06F 17/30705 707/740 |
| 2014/0340333 A1 * | 11/2014 | Takasugi | G06F 3/04883 345/173 |
| 2014/0363074 A1 * | 12/2014 | Dolfing | G06K 9/00979 382/156 |
| 2015/0154442 A1 * | 6/2015 | Takahashi | G06K 9/222 345/156 |

FOREIGN PATENT DOCUMENTS

| | | |
|---|---|---|
| KR | 10-2010-0053186 A | 5/2010 |
| KR | 10-2011-0037040 A | 4/2011 |
| WO | 95/34047 A1 | 12/1995 |
| WO | 2014-025073 A2 | 2/2014 |

OTHER PUBLICATIONS

European Office Action dated Oct. 19, 2018, issued in a counterpart European application No. 15864223.1.

Mynatt et al., "Flatland: New Dimensions in Office Whiteboards", ACM CHI 1999; [CHI Conference Proceedings, Human Factors in Computing Systems], ACM, 2 Penn Plaza, Suite 701 New York NY 10121-0701 USA, May 15, 1999, pp. 346-353, XP000894239.

* cited by examiner

FIG. 6
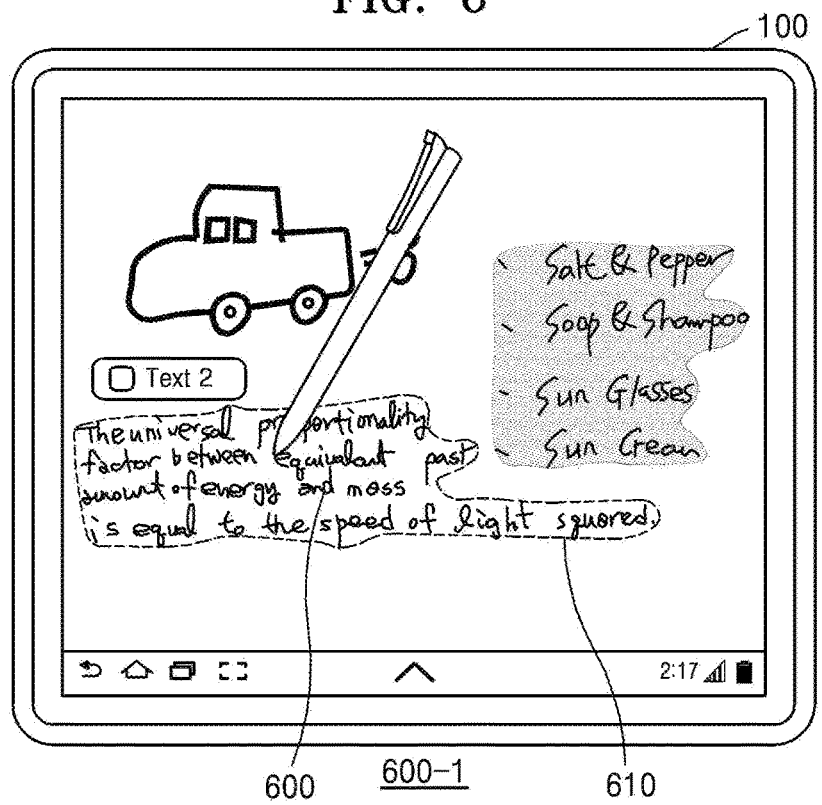
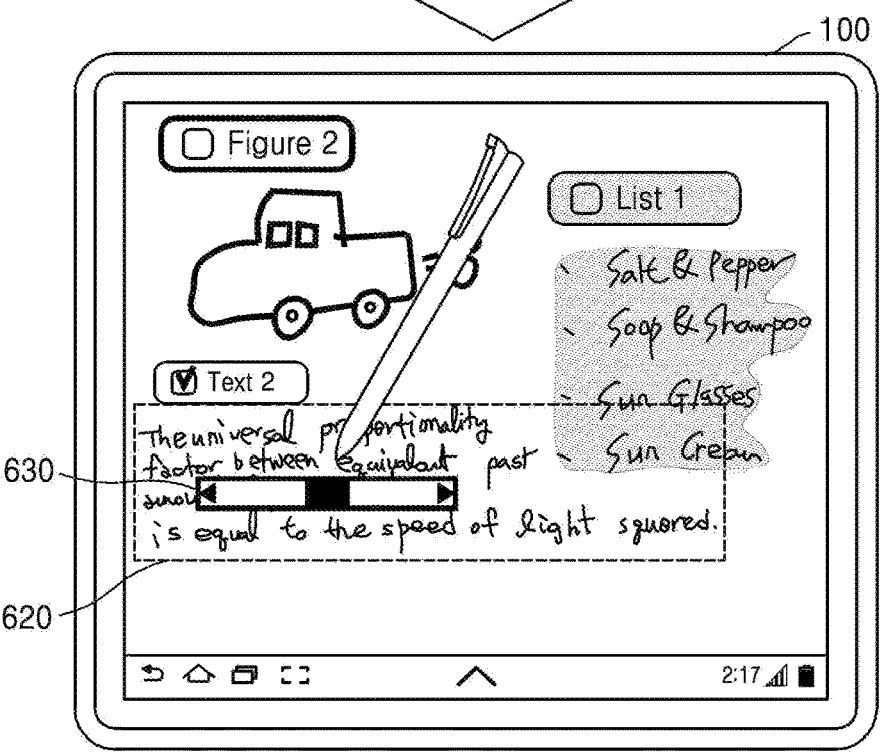

FIG. 8
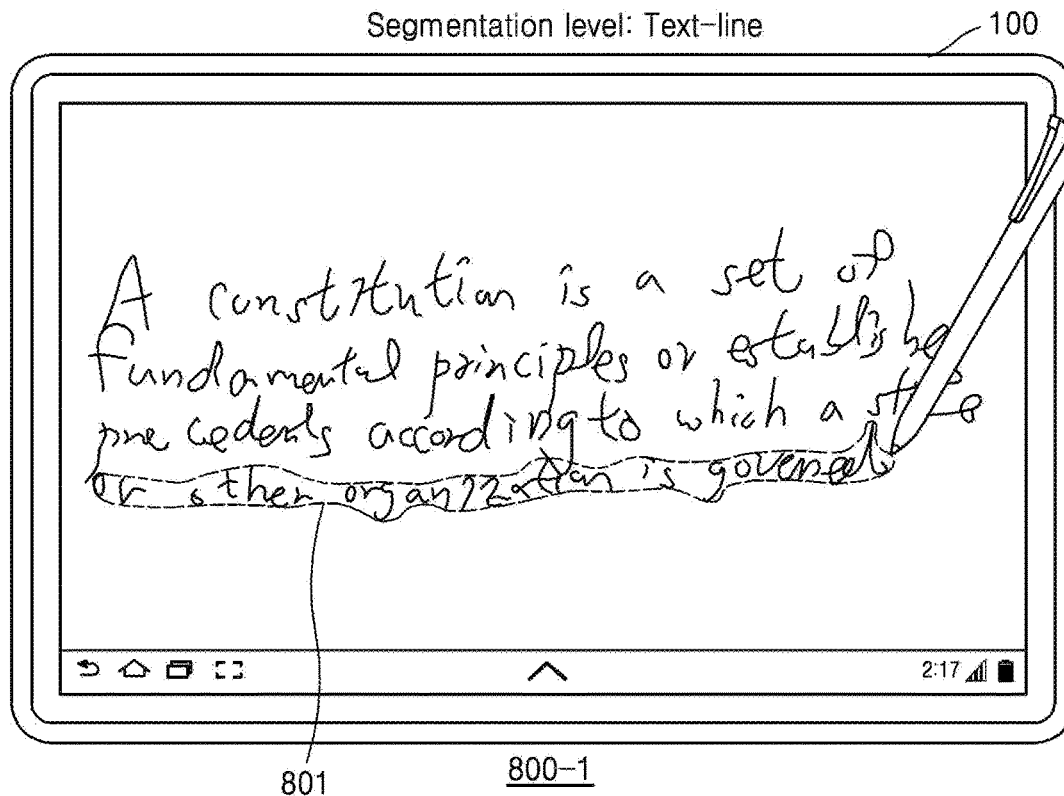
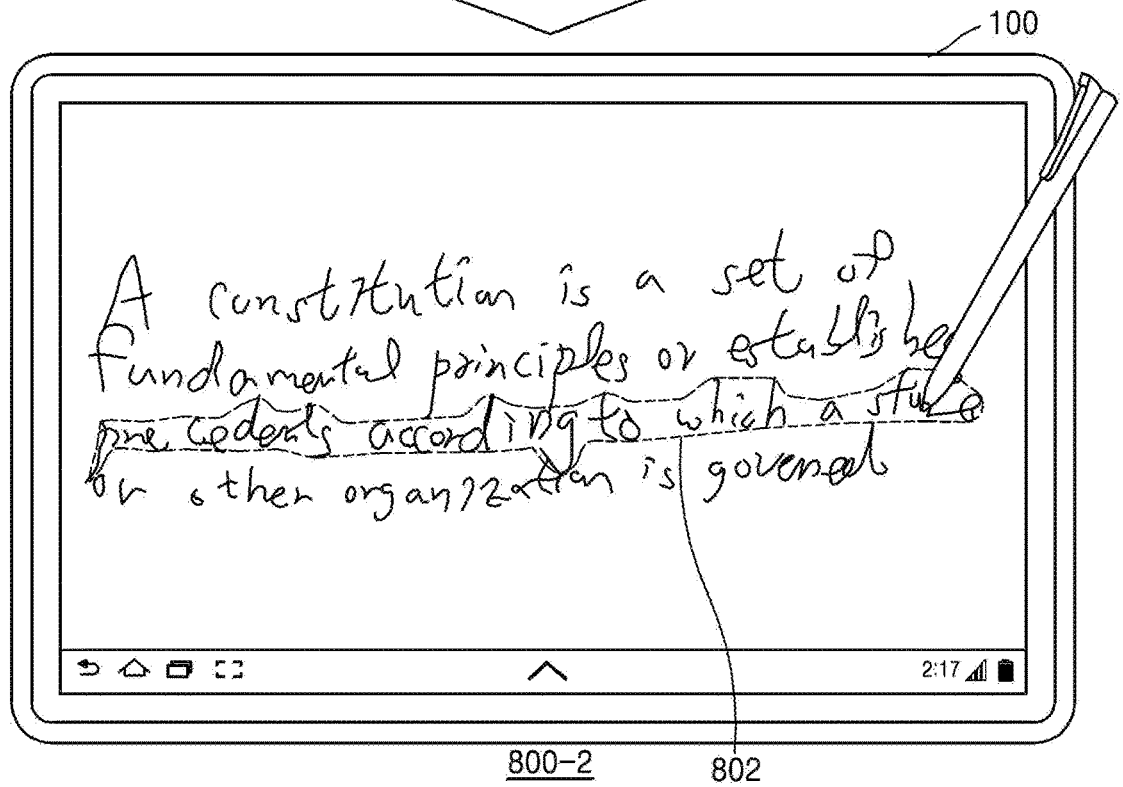

FIG. 10
Segmentation level: Text/non-text
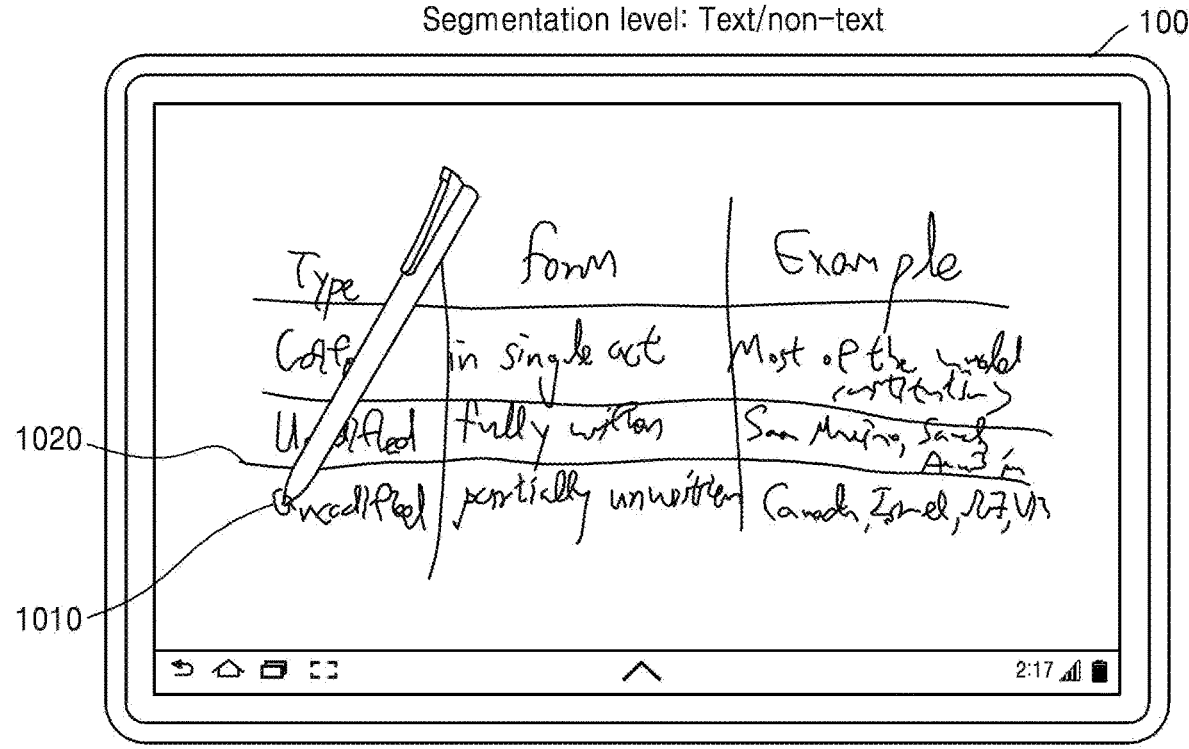
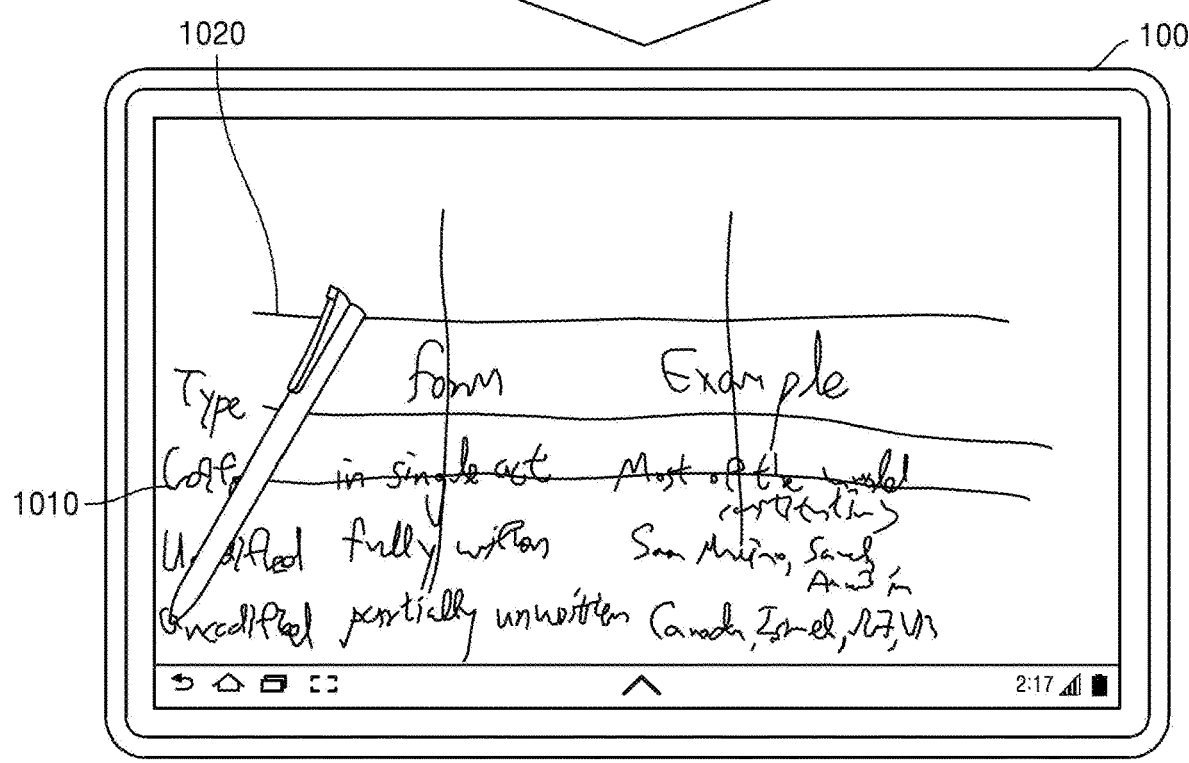

FIG. 12
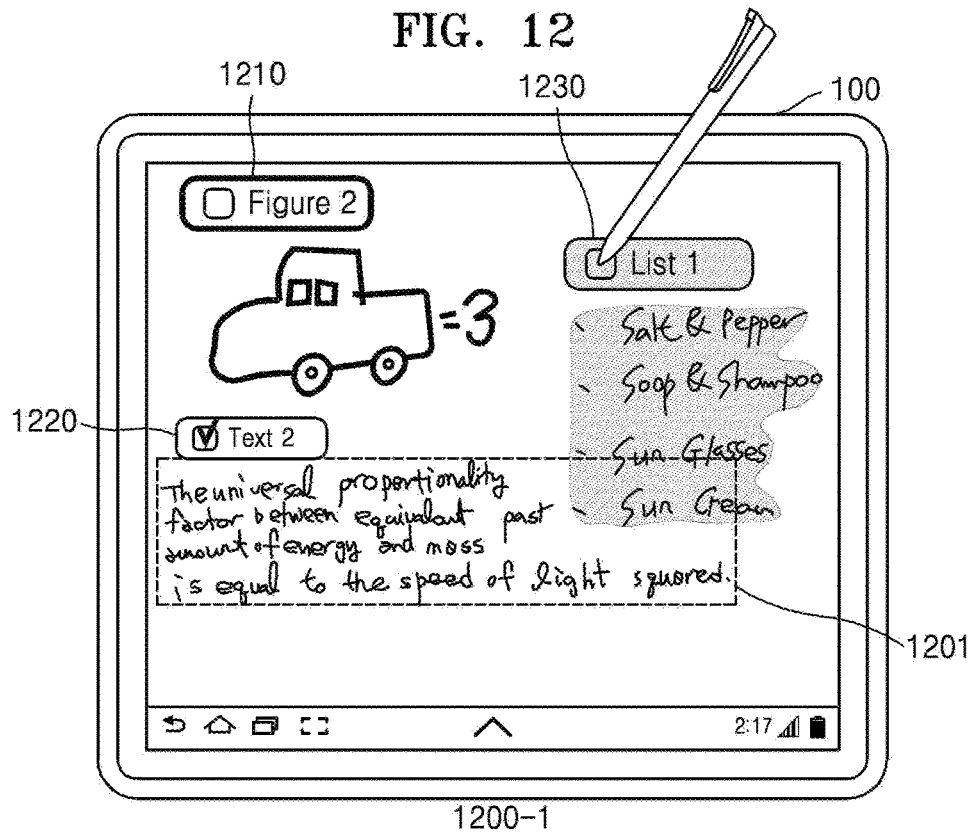
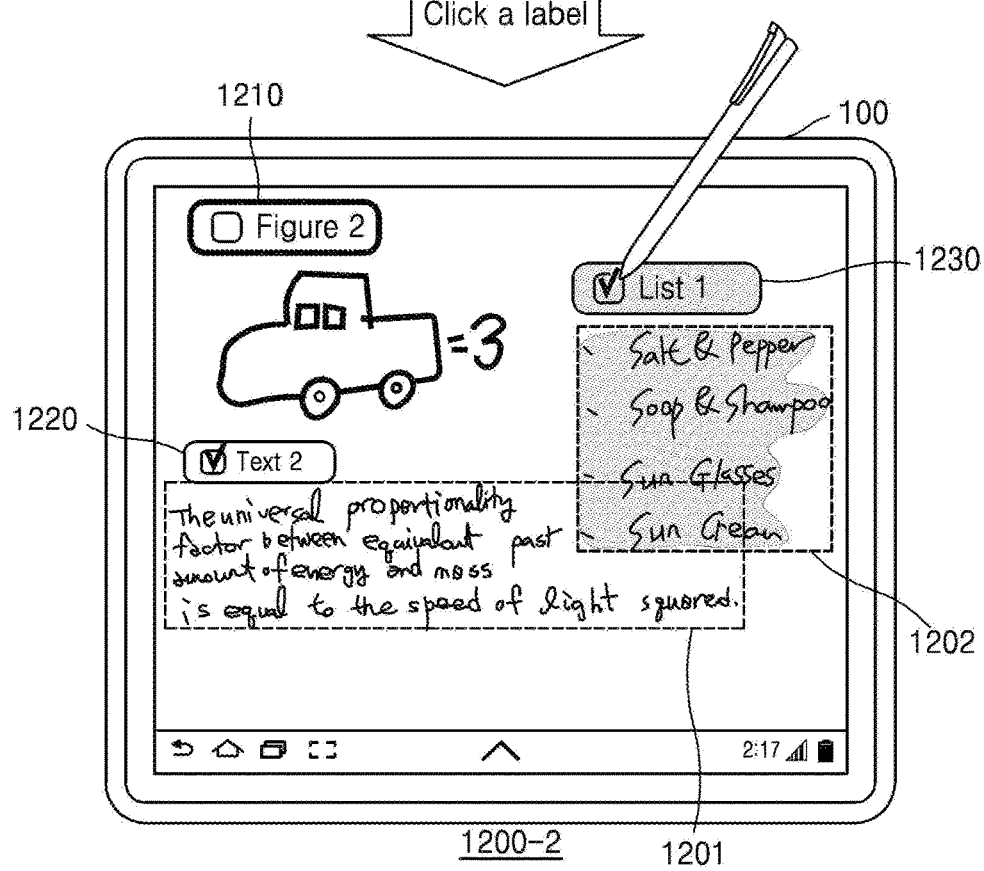

FIG. 13
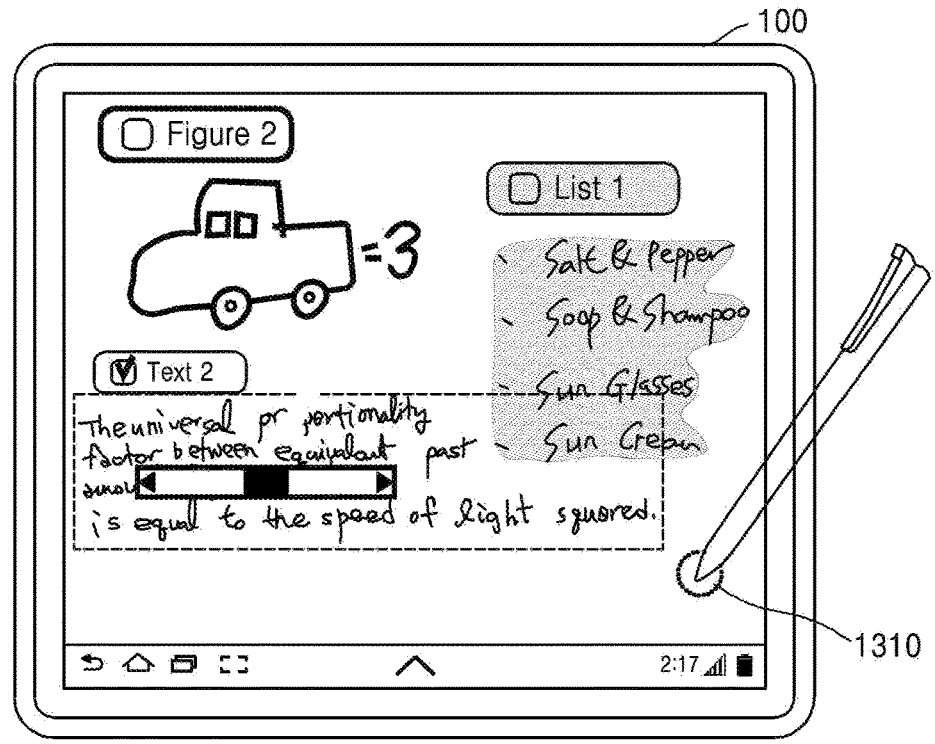
1300-1
Click
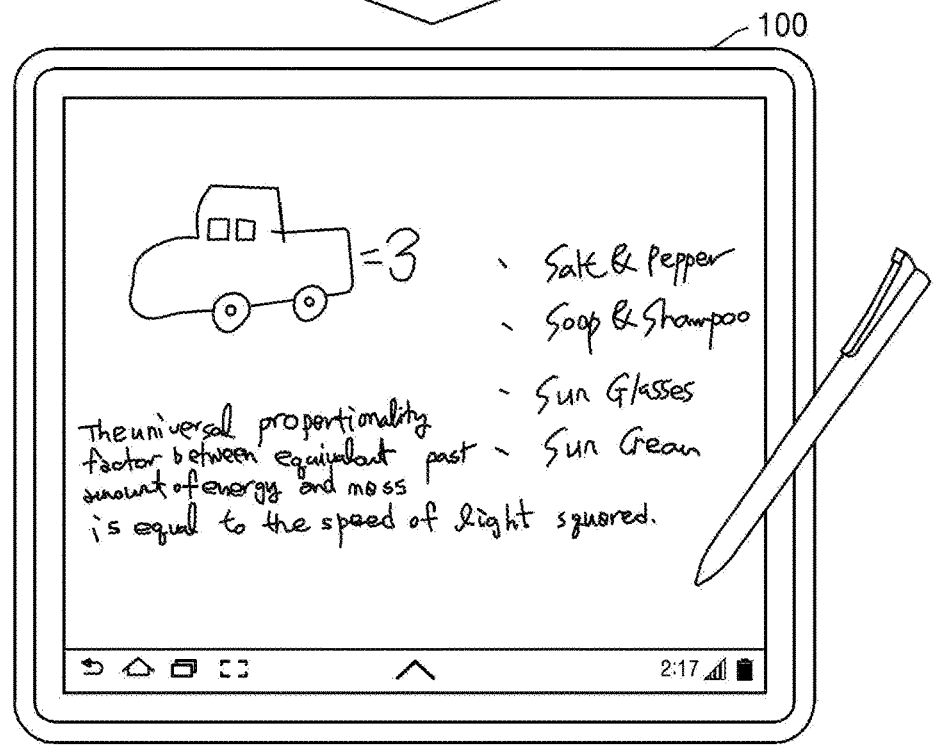
1300-2

FIG. 15
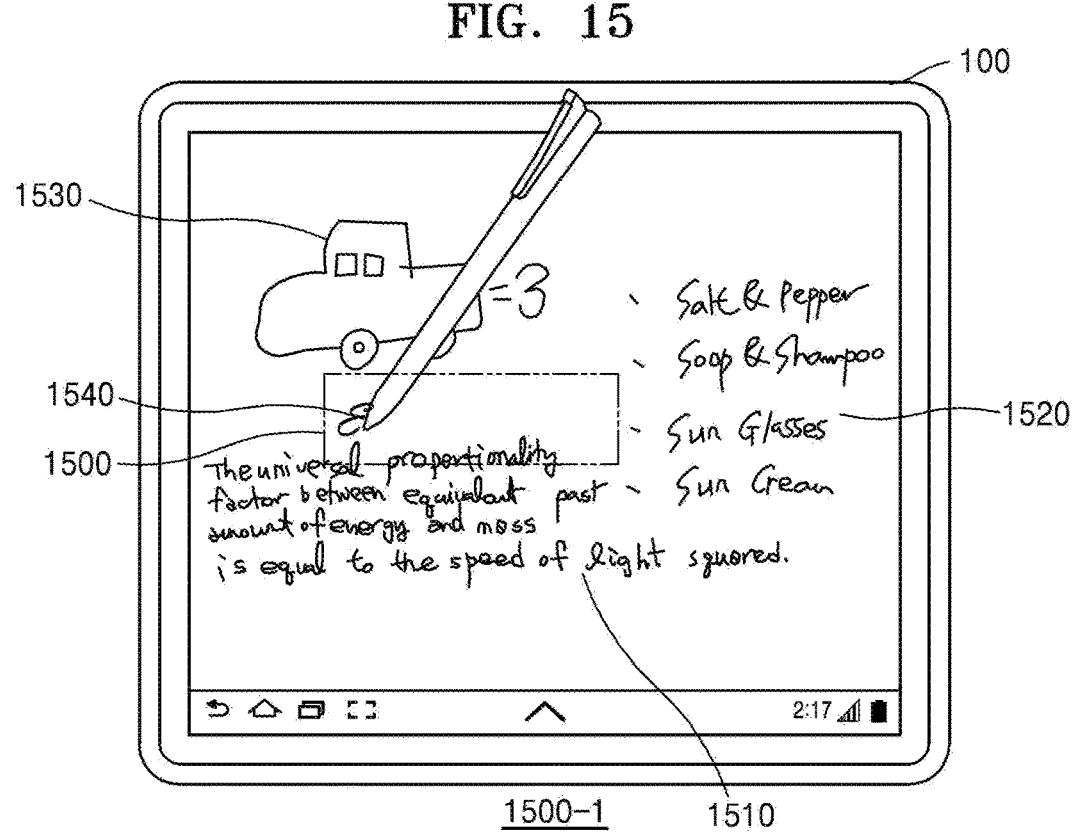
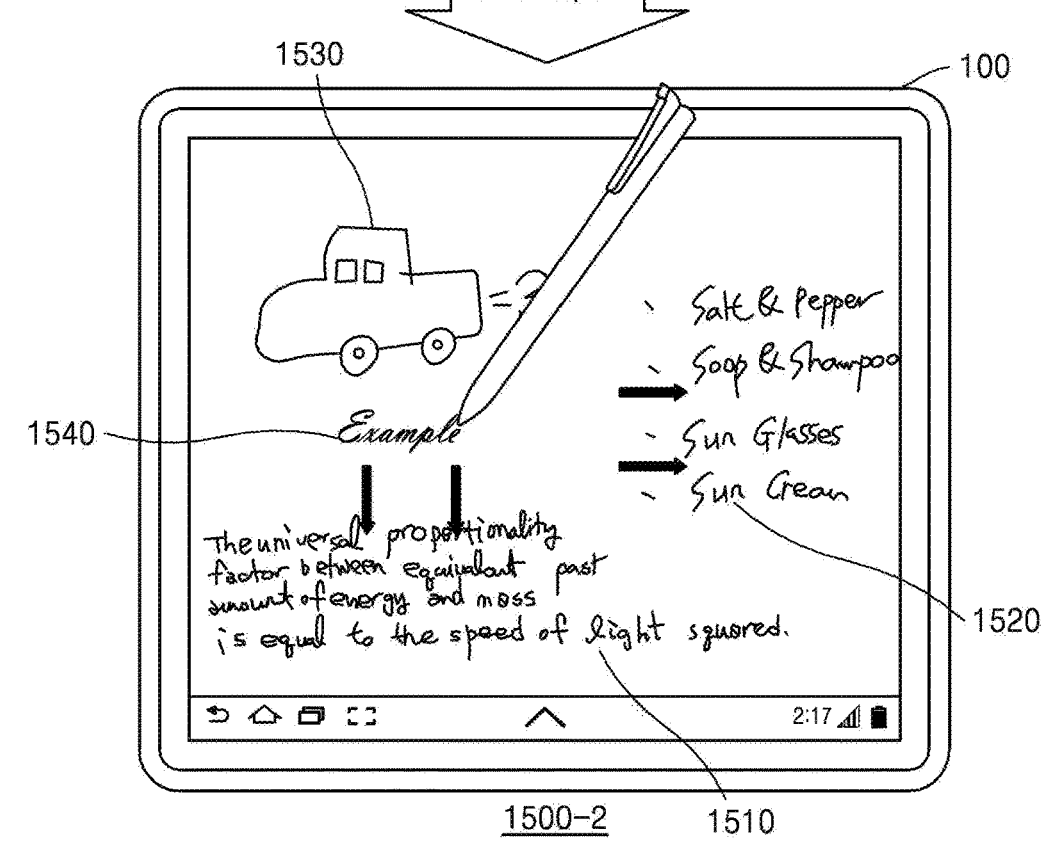

FIG. 17
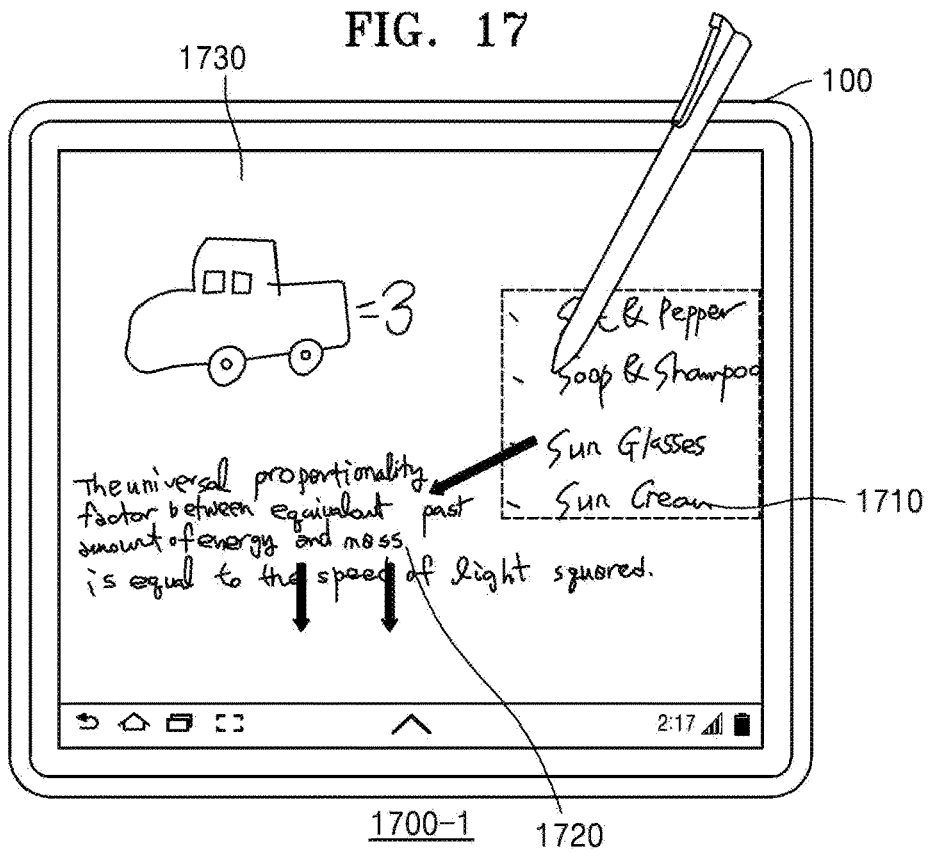
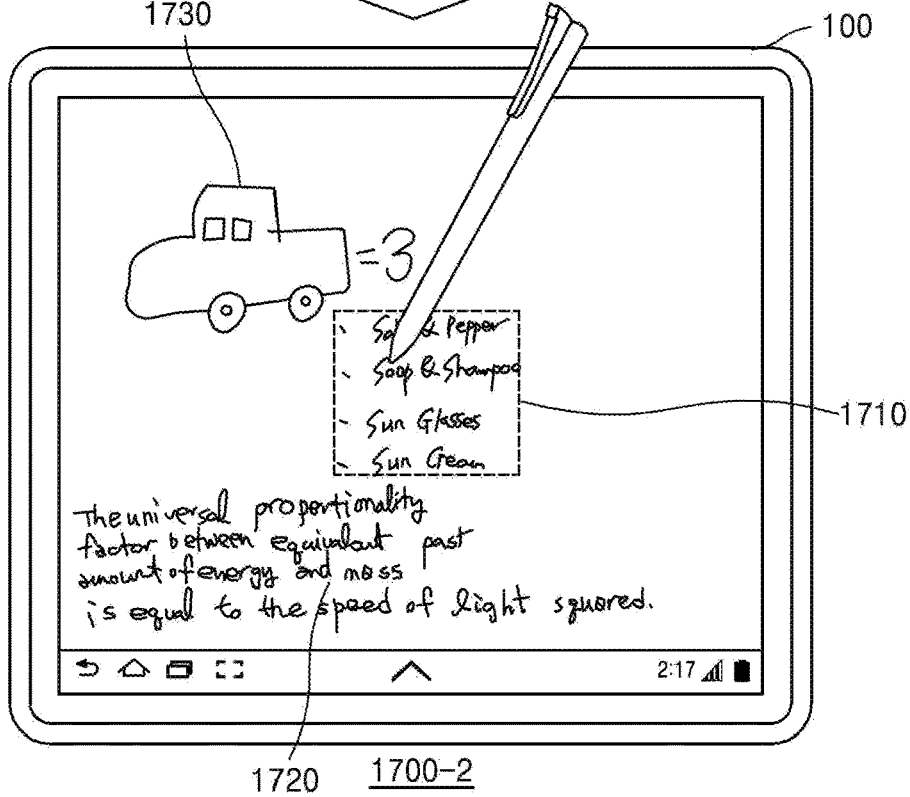

FIG. 26A

DEVICE AND METHOD OF PROVIDING HANDWRITTEN CONTENT IN THE SAME

CROSS-REFERENCE TO RELATED APPLICATION(S)

This application claims the benefit under 35 U.S.C. § 119(a) of a Korean patent application filed on Nov. 25, 2014 in the Korean Intellectual Property Office and assigned Serial number 10-2014-0165496, the entire disclosure of which is hereby incorporated by reference.

TECHNICAL FIELD

The present disclosure relates to a device for providing handwritten content including segmented objects and a method of providing handwritten content in the device.

BACKGROUND

A mobile terminal may be configured to perform a variety of functions. Examples of such a variety of functions are data and voice communication functions, a function of taking a picture or capturing a moving image through a camera, a voice storage function, a function of playing a music file through a speaker system, a function of displaying an image or a video, and the like.

In addition, a mobile terminal provides a memo application which enables a user to record information using an electronic pen, and the like. Through the memo application, the user may record and store information that he or she needs to remember. An increase in information recorded in a mobile terminal by a user leads to a demand for a system for efficiently managing information recorded by a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of providing handwritten content which is editable, retrievable, or sharable in units of objects segmented in the handwritten content.

Additional aspects will be set forth in part in the description which follows and, in part, will be apparent from the description, or may be learned by practice of the presented embodiments.

In accordance with an aspect of the present disclosure, a device is provided. The device includes a controller configured to segment handwritten content into a plurality of objects by grouping strokes included in the handwritten content, and process the respective plurality of objects in a form of a selectable object, and a display configured to display the handwritten content including the processed plurality of objects.

The plurality of objects according to an embodiment of the present disclosure may include at least one of a figure object, a text object, a list object, a table object, and a formula object.

The device according to an embodiment of the present disclosure may further include a user interface configured to receive an input for selecting at least one object from among the plurality of objects, and the display may display an image for identifying the at least one selected object on the handwritten content.

The display according to an embodiment of the present disclosure may be further configured to display labels indicating object types of the respective plurality of objects on the handwritten content.

The device according to an embodiment of the present disclosure may further include a user interface configured to receive an input for selecting at least one object from among the plurality of objects for a set time or longer, and the controller may be further configured to switch an operation mode to an edit mode for editing the at least one object based on the input.

In the edit mode, the controller according to an embodiment of the present disclosure may be further configured to provide a graphical user interface (GUI) for adjusting a segmentation level and change a segmentation level of the handwritten content according to a position of an adjustment button included in the GUI.

The user interface according to an embodiment of the present disclosure may be further configured to receive an input for moving a first object from among the plurality of objects in the edit mode, and the controller may be further configured to determine whether a second object from among the plurality of objects and the moved first object overlap, and displace the second object a certain distance apart from the first object when the second object and the moved first object overlap.

The device according to an embodiment of the present disclosure may further include a user interface configured to receive a new handwritten input on the handwritten content, and the controller according to an embodiment of the present disclosure may be further configured to determine whether an input area in which the new handwritten input is received overlaps the plurality of objects included in the handwritten content, and displace at least one object overlapping the input area a certain distance apart from the input area.

The controller according to an embodiment of the present disclosure may be further configured to change an arrangement of the plurality of objects included in the handwritten content based on a certain template.

The controller according to an embodiment of the present disclosure may be further configured to generate a plurality of pieces of thumbnail information corresponding to the plurality of objects, match up the plurality of pieces of thumbnail information and additional information of the plurality of objects, and store the matched thumbnail information and additional information in a memory.

The display according to an embodiment of the present disclosure may be further configured to display the handwritten content in a first area of a screen, and display a list of thumbnail information corresponding to the respective plurality of objects in a second area of the screen.

The device according to an embodiment of the present disclosure may further include a user interface configured to receive an input for selecting a plurality of pieces of handwritten content, and the display according to an embodiment of the present disclosure may be further configured to display a list of thumbnail information corresponding to objects included in the plurality of pieces of handwritten content.

The user interface according to an embodiment of the present disclosure may be further configured to receive an input for selecting first thumbnail information from the list, and the display according to an embodiment of the present disclosure may be further configured to display additional information of a first object corresponding to the first thumbnail information.

The user interface according to an embodiment of the present disclosure may be further configured to receive an input for selecting first thumbnail information from the list, and the controller according to an embodiment of the present disclosure may be further configured to retrieve a first piece of handwritten content including a first object corresponding to the selected first thumbnail information from among the plurality of pieces of handwritten content and control the display to display the retrieved first piece of handwritten content.

The user interface according to an embodiment of the present disclosure may be further configured to receive a retrieval condition, and the controller according to an embodiment of the present disclosure may be further configured to retrieve at least one object satisfying the retrieval condition and control the display to display a list of thumbnail information corresponding to the at least one retrieved object.

The controller according to an embodiment of the present disclosure may be further configured to determine access rights information for the respective plurality of objects included in the handwritten content and control the display to display some of the plurality of objects based on the access rights information.

In accordance with another aspect of the present disclosure, a method of providing handwritten content in a device is provided. The method includes segmenting handwritten content into a plurality of objects by grouping strokes included in the handwritten content, processing the respective plurality of objects in a form of a selectable object, and displaying the handwritten content including the processed plurality of objects on a screen.

The method of providing handwritten content according to an embodiment of the present disclosure may further include receiving an input for selecting at least one object from among the plurality of objects, and displaying an image for identifying the at least one selected object on the handwritten content.

The displaying of the handwritten content according to an embodiment of the present disclosure may include displaying labels indicating object types of the respective plurality of objects on the handwritten content.

The method of providing handwritten content according to an embodiment of the present disclosure may further include receiving an input for selecting at least one object from among the plurality of objects for a set time or longer, and switching an operation mode to an edit mode for editing the at least one object based on the input.

The switching of the operation mode to the edit mode according to an embodiment of the present disclosure may include providing a GUI for adjusting a segmentation level, and changing a segmentation level of the handwritten content according to a position of an adjustment button included in the GUI.

The switching of the operation mode to the edit mode according to an embodiment of the present disclosure may include receiving an input for moving a first object from among the plurality of objects, determining whether a second object from among the plurality of objects and the moved first object overlap, and displacing the second object a certain distance apart from the first object when the second object and the moved first object overlap.

The method of providing handwritten content according to an embodiment of the present disclosure may further include receiving a new handwritten input on the handwritten content, determining whether an input area in which the new handwritten input is received and the plurality of objects included in the handwritten content overlap, and displacing at least one object overlapping the input area a certain distance apart from the input area based on a result of the determining.

The displaying of the handwritten content according to an embodiment of the present disclosure may include changing an arrangement of the plurality of objects included in the handwritten content based on a certain template.

The processing of the respective plurality of objects according to an embodiment of the present disclosure may include generating a plurality of pieces of thumbnail information corresponding to the plurality of objects, and matching up the plurality of pieces of thumbnail information and additional information of the plurality of objects.

The displaying of the handwritten content according to an embodiment of the present disclosure may include displaying the handwritten content in a first area of the screen, and displaying a list of thumbnail information corresponding to the respective plurality of objects in a second area of the screen.

The method of providing handwritten content according to an embodiment of the present disclosure may further include receiving an input for selecting a plurality of pieces of handwritten content, and displaying a list of thumbnail information corresponding to objects included in the plurality of pieces of handwritten content.

The method of providing handwritten content according to an embodiment of the present disclosure may further include receiving an input for selecting first thumbnail information from the list, and displaying additional information of a first object corresponding to the first thumbnail information.

The method of providing handwritten content according to an embodiment of the present disclosure may further include receiving an input for selecting first thumbnail information from the list, retrieving a first piece of handwritten content including a first object corresponding to the selected first thumbnail information from among the plurality of pieces of handwritten content, and displaying the retrieved first piece of handwritten content.

The method of providing handwritten content according to an embodiment of the present disclosure may further include receiving a retrieval condition, retrieving at least one object satisfying the retrieval condition, and displaying a list of thumbnail information corresponding to the at least one retrieved object.

The displaying of the handwritten content according to an embodiment of the present disclosure may include determining access rights information for the respective plurality of objects included in the handwritten content, and displaying some of the plurality of objects based on the access rights information.

In accordance with another aspect of the present disclosure, a method of providing handwritten content in a device is provided. The method includes acquiring handwritten content including a plurality of objects segmented according to object type, extracting the plurality of objects from the handwritten content, and displaying the plurality of objects in a form of a selectable object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates changing an operation mode of a device to an edit mode according to an embodiment of the present disclosure;

FIG. 8 illustrates a case in which a segmentation level changed by a user is "text line" according to an embodiment of the present disclosure;

FIG. 10 illustrates moving an object in a device according to a user input according to an embodiment of the present disclosure;

FIG. 12 illustrates adding a target of editing in a device according to an embodiment of the present disclosure;

FIG. 13 illustrates changing an operation mode of a device to a pen mode according to an embodiment of the present disclosure;

FIG. 15 illustrates separating an object overlapping an input area in which a new handwritten input is received from the input area in a device according to an embodiment of the present disclosure;

FIG. 17 illustrates separating a second object from a first object in a device when the first object is moved according to an embodiment of the present disclosure;

FIGS. 26A to 26C illustrate displaying a list of thumbnail information retrieved under a retrieval condition in a device according to an embodiment of the present disclosure;

Throughout the drawings, like reference numerals will be understood to refer to like parts, components, and structures.

DETAILED DESCRIPTION

Figure 1:
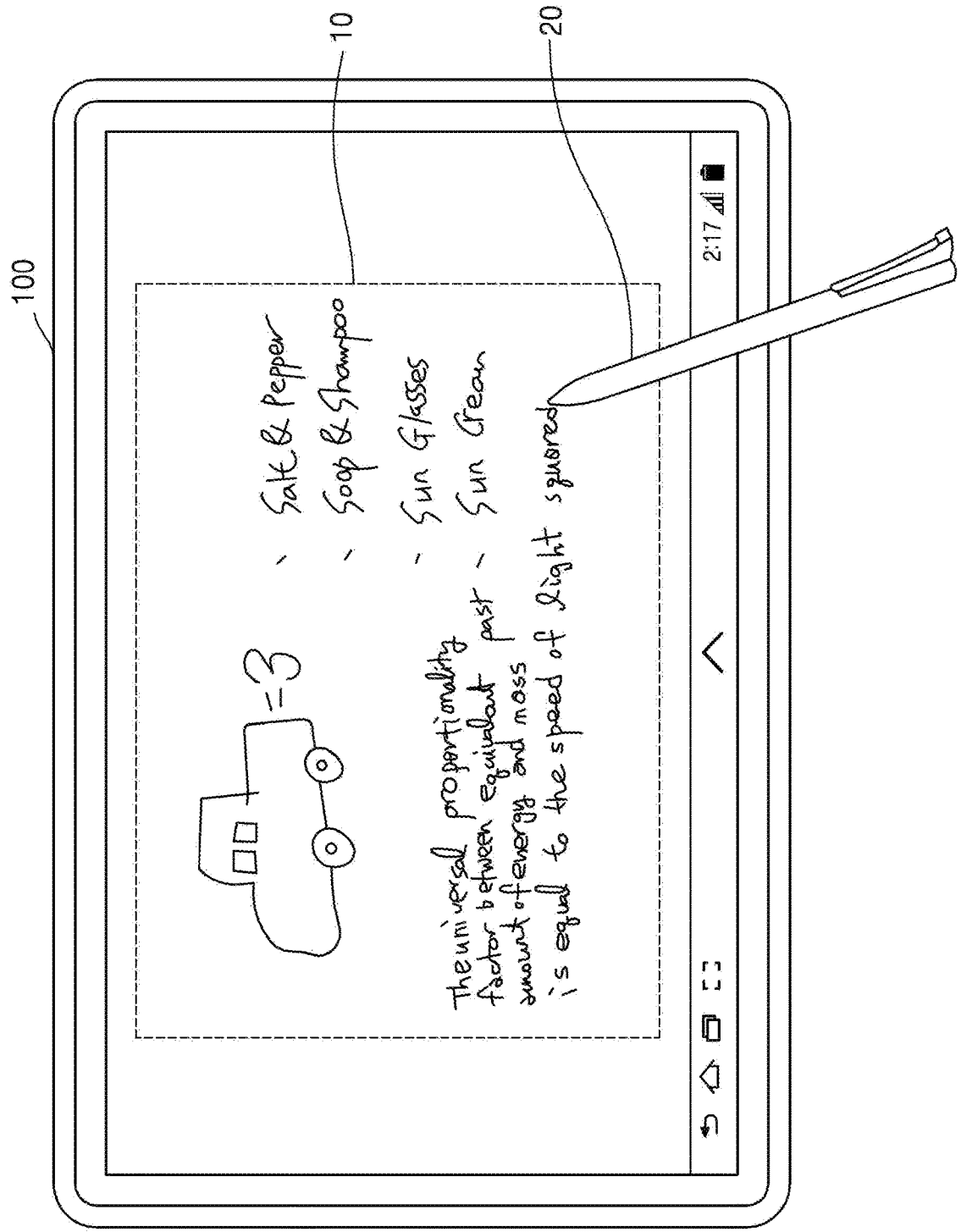
FIG. 1 is a diagram illustrating a device for providing handwritten content according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Throughout the specification, when a portion "includes" an element, unless otherwise described, another element may be further included, rather than the presence of other elements being excluded. In addition, terms, such as "unit" and "module", used herein indicate a unit for processing at least one function or operation, in which the unit and the block may be embodied as hardware or software or may be embodied as a combination of hardware and software.

Throughout the specification, "touch input" denotes a gesture, and the like, made on a touch screen by a user to control a device. For example, a touch input stated in this specification may be a tap, a touch and hold action, a double tap, dragging, panning, a flick, a drag and drop action, and the like.

"Tap" denotes the action of the user touching the screen with his or her finger or a touch tool (e.g., an electronic pen) and immediately lifting the finger or the touch tool from the screen without moving the finger or the touch tool.

"Touch and hold" denotes the action of the user touching the screen with his or her finger or a touch tool (e.g., an electronic pen) and maintaining the touch input for a threshold time (e.g., two seconds) or longer. For example, this is a case in which a difference between a touch-in time point and a touch-out time point is the threshold time (e.g., two seconds) or longer. To make the user recognize whether a touch input is a tap or a touch and hold action, a feedback signal may be provided in an auditory or tactile manner when the touch input is maintained for the threshold time or longer. The threshold time may be changed according to an implemented example.

"Double tap" denotes the action of the user touching the screen two times with his or her finger or a touch tool (e.g., an electronic pen).

"Dragging" denotes the action of the user touching the screen with his or her finger or a touch tool and moving the finger or the touch tool to another position in the screen while maintaining the touch. Due to a drag action, an object moves, or a panning action to be described below is performed.

"Panning" denotes the action of the user taking a drag action without selecting an object. Since a panning action does not select any object, no objects move in a page, and the page itself moves in the screen, or an object group moves in the page.

"Flick" denotes the action of the user taking a drag action at a threshold speed (e.g., 100 pixels/s) or faster using his or her finger or a touch tool. A drag (or panning) action and a flick action may be distinguished from each other based on whether a moving speed of the finger or the touch tool is the threshold speed (e.g., 100 pixels/s) or faster.

"Drag and drop" denotes the action of the user dragging an object to a position in the screen and dropping the object using his or her finger or a touch tool.

"Pinch" denotes the action of the user moving two fingers in different directions while touching the screen with the two fingers. A pinch may be a gesture for enlarging (pinch open) or reducing (pinch close) an object, and an enlargement value or a reduction value is determined according to the distance between the two fingers.

"Swipe" denotes the action of the user moving his or her finger or a touch tool in a horizontal or vertical direction by a distance while touching an object in the screen with the finger or the touch tool. A motion in a diagonal direction may not be recognized as a swipe action.

Reference will now be made to various embodiments of the present disclosure, examples of which are illustrated in the accompanying drawings, wherein like reference numerals refer to like elements throughout. In this regard, the present various embodiments of the present disclosure may have different forms and should not be construed as being limited to the descriptions set forth herein. Accordingly, the various embodiments of the present disclosure are merely described below, by referring to the figures, to explain aspects. As used herein, the term "and/or" includes any and all combinations of at least one of the associated listed items. Expressions, such as "at least one of," when preceding a list of elements, modify the entire list of elements and do not modify the individual elements of the list.

FIG. 1 is a diagram illustrating a device for providing handwritten content according to an embodiment of the present disclosure.

Referring to FIG. 1, a device 100 may be a display device which receives a handwritten input or displays handwritten content. For example, the device 100 may be a cellular phone, a smart phone, a laptop computer, a tablet personal computer (PC), an electronic (e)-book terminal, a digital broadcast terminal, a personal digital assistant (PDA), a portable multimedia player (PMP), a navigation device, a moving picture experts group (MPEG-1 or MPEG-2) audio layer 3 (MP3) player, a digital camera, a wearable device (e.g., glasses or a watch), and the like, but is not limited thereto.

Throughout the specification, "handwritten content" may denote content which is digital information converted from an analog handwritten input of a user. For example, handwritten content may include an image, text, a table, a list, a formula, and the like, drawn in digital equipment, but is not limited thereto.

Handwritten content 10 according to an embodiment of the present disclosure may be a set of strokes which are input in order of time. "Stroke" may denote one trace drawn by an input tool while touching the device 100 after coming in contact with the device 100. For example, when each of 3 and 6 in "3+6=?" is drawn by the user while touching the device 100, each of 3 and 6 may constitute one stroke. In the case of "+," the user draws "–" first and then "|," and each of "–" and "|" may constitute one stroke. According to an embodiment of the present disclosure, one stroke may constitute one character or sign, or a combination of a plurality of strokes may constitute one character or sign.

Meanwhile, each of the strokes included in the handwritten content 10 may be related to coordinate information and time information. Here, the time information of a stroke may correspond to a point in time at which the stroke is generated or changed. In addition, the time information of a stroke may be recorded in the form of a time stamp which indicates a certain time.

According to an embodiment of the present disclosure, the device 100 may receive a touch input for selecting a partial area of the handwritten content 10 through the input tool. For example, the user may select the partial area from the handwritten content 10 using a lasso selection tool. The partial area may be an area including an object (e.g., partial handwritten content or at least one stroke) in which the user is interested. However, it may be difficult for the user to select an area having a complex boundary using a lasso selection tool. Therefore, a method of enabling the user to easily select a partial area of handwritten content will be described below with reference to FIG. 2.

Meanwhile, according to an embodiment of the present disclosure, the input tool may be a tool for the user to input information to the device 100. For example, the input tool may be a finger, an electronic pen (e.g., a stylus pen), and the like, but is not limited thereto. For convenience of description, a case in which the input tool is an electronic pen 20 will be described below as an example.

Figure 2:
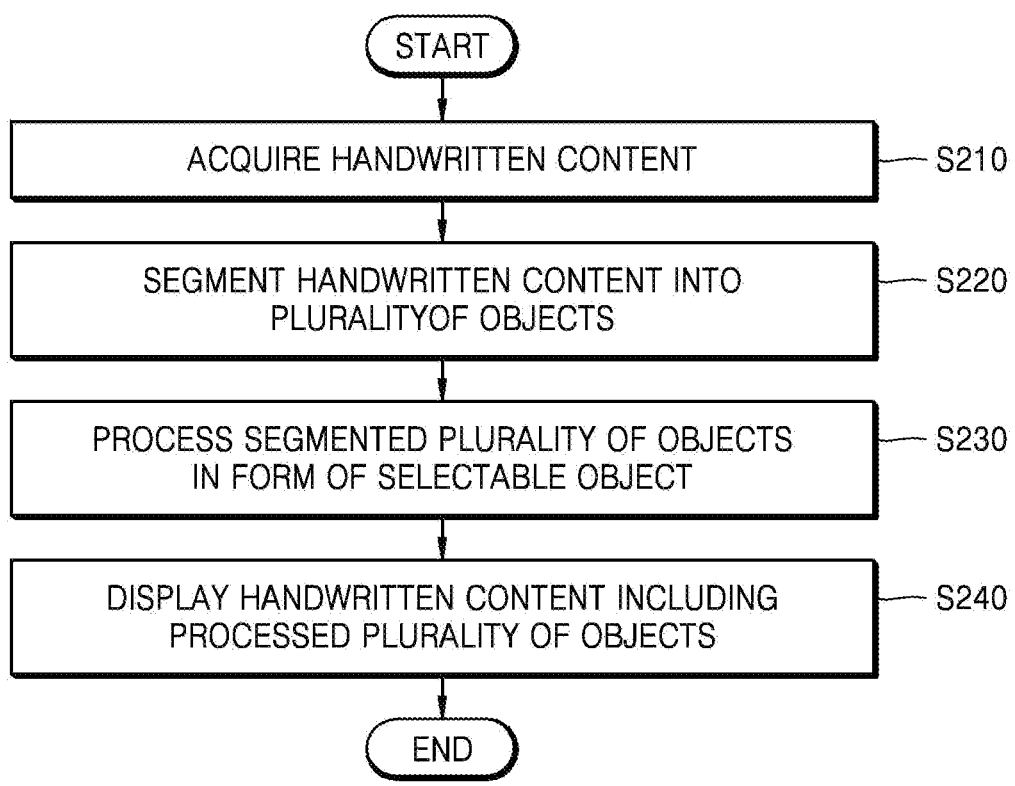
FIG. 2 is a flowchart illustrating a method of providing handwritten content in a device according to an embodiment of the present disclosure.

FIG. 2 is a flowchart illustrating a method of providing handwritten content in a device according to an embodiment of the present disclosure.

Referring to FIG. 2, in operation S210, the device 100 may acquire handwritten content. The handwritten content may be content which is generated in real time or has already been generated. Real-time generation of content may denote that handwritten content (e.g., a touch input or a pen input) currently received from the user is converted into digital handwritten data within a certain time (e.g., within 0.01 seconds).

According to an embodiment of the present disclosure, the device 100 may receive a handwritten input from the user and generate handwritten content by itself. In addition, the device 100 may extract or call handwritten content stored in a memory, or may receive (or download) handwritten content uploaded to a cloud server from the cloud server.

According to an embodiment of the present disclosure, the device 100 may receive handwritten content generated by an external device from the external device.

In operation S220, the device 100 may segment the handwritten content into a plurality of objects by grouping strokes included in the handwritten content. For example, the device 100 may group the strokes included in the handwritten content according to a certain reference.

According to an embodiment of the present disclosure, the device 100 may group the strokes included in the handwritten content using at least one of distances between the strokes and information on times at which the strokes have been input. A method of segmenting the handwritten content into a plurality of objects in the device 100 will be described below with reference to FIG. 3.

According to an embodiment of the present disclosure, the device 100 may group the strokes included in the handwritten content according to a certain segmentation level. Segmentation levels denote units (degrees) for segmenting handwritten content. Segmentation levels may be "document," "text/non-text," "text/figure/list/table," "paragraph," "text-line," "word," "character," "stroke," and the like, but are not limited thereto.

For example, when the certain segmentation level is "text/non-text," the device 100 may group the strokes included in the handwritten content into first strokes having text characteristics and second strokes having non-text characteristics. At this time, the device 100 may define the first strokes as text objects and the second strokes as non-text objects in the handwritten content.

When the segmentation level is "text line," the device 100 may group the strokes included in the handwritten content into first strokes forming characters of a first line, second strokes forming characters of a second line, and third strokes forming characters of a third line. At this time, the device 100 may define the first strokes as first text-line objects, the second strokes as second text-line objects, and the third strokes as third text-line objects.

In addition, the device 100 may segment the handwritten content into figure objects, text objects, list objects, table objects, formula objects, and the like, by grouping the strokes included in the handwritten content according to object type.

According to an embodiment of the present disclosure, the device 100 may adjust the certain segmentation level according to a user input. An operation of adjusting the segmentation level in the device 100 will be described below with reference to FIG. 7.

In operation S230, the device 100 may process the respective segmented plurality of objects in the form of a selectable object.

Here, processing of the respective segmented plurality of objects in the form of a selectable object may denote an operation of processing handwritten content so that strokes constituting an object are simultaneously selected when a cursor, a pointer, or a touch tool is positioned on the object. For example, by adding grouping information of the strokes grouped according to a segmentation level to the handwritten content, the device 100 may process the segmented plurality of objects in the form of a selectable object.

According to an embodiment of the present disclosure, the device 100 may process objects which are segmented while the handwritten content is received from the user in the form of a selectable object in real time.

According to an embodiment of the present disclosure, the device 100 may generate thumbnail information corresponding to the respective segmented plurality of objects. Thumbnail information may be information which briefly describes an object. For example, thumbnail information may include a label (e.g., "Figure," "Text," "List," "Table," and the like) indicating characteristics of an object, a thumbnail image of the object (e.g., an image obtained by capturing the object in a certain size), an index (e.g., first three words of a text object), and the like, but is not limited thereto.

According to an embodiment of the present disclosure, the device 100 may generate additional information corresponding to the respective segmented plurality of objects. Additional information may include type information of an object, information on the generation time of the object, information on a page including the object, the name of a document including the object, size information of the object, information on a relative position of the object in the handwritten content, a tag, and the like, but is not limited thereto.

According to an embodiment of the present disclosure, the device 100 may match up thumbnail information of the plurality of objects and additional information of the plurality of objects and store the matched thumbnail information and additional information. For example, the device 100 may match up thumbnail information of a first object and additional information of the first object with identification information of the first object, and store the matching information (e.g., a matching table).

In operation S240, the device 100 may display the handwritten content including the processed plurality of objects.

According to an embodiment of the present disclosure, the device 100 may differently express the plurality of objects. For example, the device 100 may express strokes included in the first object in blue, strokes included in a second object in yellow, and strokes included in a third object in red.

In addition, the device 100 may express strokes included in the first object with solid lines, strokes included in the second object with dotted lines, and strokes included in the third object with alternate long and short dashed lines.

According to an embodiment of the present disclosure, the device 100 may cause thicknesses, font types, shadings, or patterns of the respective plurality of objects to be different from each other or display boundary lines around the respective plurality of objects, but a method of differently expressing the plurality of objects is not limited thereto.

According to an embodiment of the present disclosure, the device 100 may display labels indicating the object types of the respective plurality of objects on the handwritten content. For example, when the type of the first object is determined to be text, the device 100 may display the label "Text 1" around the first object.

According to an embodiment of the present disclosure, the device 100 segments the handwritten content into the objects and provides the respective objects in the form of a selectable object, thereby enabling the user to easily select a desired object in the handwritten content without using a lasso selection tool. In addition, the device 100 may help the user with object identification by differently displaying the plurality of objects included in the handwritten content.

According to an embodiment of the present disclosure, the device 100 may receive an input for selecting at least one object from among the plurality of objects. Here, the device 100 may display an image for identifying the at least one selected object on the handwritten content. For example, the device 100 may change the color and the thickness of the at least one selected object, display a boundary line around the at least one selected object, or determine a box included in an object label.

Meanwhile, according to an embodiment of the present disclosure, the device 100 may switch an operation mode from a pen mode to an edit mode based on a set input. For example, when receiving an input for selecting at least one object from among the plurality of objects for a set time or longer, the device 100 may set the operation mode to the edit mode.

In this specification, the pen mode may denote a mode in which it is possible to receive a handwritten input and select an object or a partial area. In addition, the edit mode may denote a mode in which it is possible to edit (e.g., delete, move, adjust in size, and the like) a previously received handwritten input. According to an embodiment of the present disclosure, it may not be possible to receive a new handwritten input in the edit mode.

According to an embodiment of the present disclosure, the device 100 may display the handwritten content including the plurality of objects in a first area of the screen, and display a list of thumbnail information corresponding to the respective plurality of objects in a second area of the screen. An operation of displaying thumbnail information of an object in the device 100 will be described below with reference to FIGS. 21 to 26C.

Figure 3:
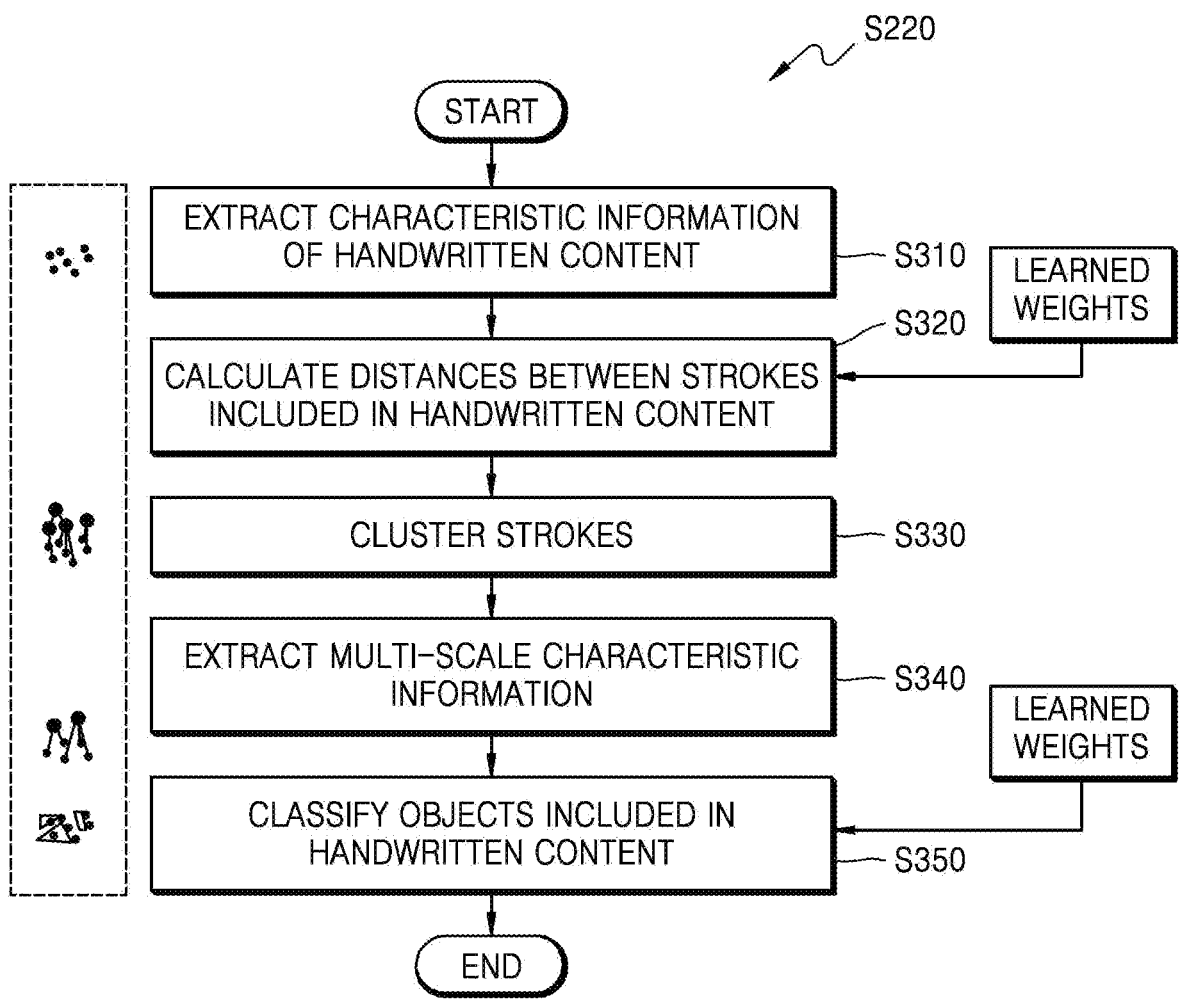
FIG. 3 is a flowchart illustrating a method of segmenting handwritten content according to an embodiment of the present disclosure.

FIG. 3 is a flowchart illustrating a method of segmenting handwritten content according to an embodiment of the present disclosure.

Referring to FIG. 3, in operation S310, the device 100 may acquire handwritten content and extract characteristic information of the acquired handwritten content.

According to an embodiment of the present disclosure, the device 100 may extract information related to strokes included in the handwritten content as characteristic information of the handwritten content. For example, as characteristic information of the handwritten content, the device 100 may extract distances or differences in length between areas (e.g., bounding boxes) including at least one stroke. In addition, as characteristic information of the handwritten content, the device 100 may extract differences in generation time between the strokes, the number of other strokes generated between strokes, differences in identification number (e.g., an index value) between the strokes, and the like. Here, the characteristic information of the handwritten content may be used to calculate distances between the strokes.

In operation S320, the device 100 may calculate the distances between the strokes included in the handwritten content. According to an embodiment of the present disclosure, the device 100 may calculate distances between strokes which have a time difference of a threshold value (e.g., one second) or less based on time information and coordinate information of the strokes.

For example, when the user draws a first stroke and then a second stroke, the device 100 may calculate the distance between the first stroke and the second stroke using coordinate values of the end point of the first stroke and coordinate values of the start point of the second stroke.

Meanwhile, the device 100 may calculate the distances between the strokes to reflect learned weights.

In operation S330, the device 100 may cluster the strokes based on the distances between the strokes. For example, when "smile" is written after a smile image is drawn, the device 100 may separately cluster strokes constituting the smile image and strokes constituting "smile." Here, clustering of strokes may denote grouping of the strokes.

In addition, when the user writes text in three lines, the device 100 may separately cluster strokes constituting the first line, strokes constituting the second line, and strokes constituting the third line.

In operation S340, the device 100 may extract multi-scale characteristic information.

Here, the multi-scale characteristic information may denote characteristic information extracted from blocks which have been segmented at a respective plurality of higher segmentation levels. For example, as multi-scale characteristic information of a first stroke included in the handwritten content, the device 100 may extract characteristic information of blocks related to the first stroke from blocks segmented at higher segmentation levels than a stroke-based segmentation level.

In other words, the device 100 may extract first characteristic information of a block including the first stroke among first blocks obtained by segmenting the handwritten content at a first segmentation level (e.g., an object-based segmentation level), second characteristic information of a block including the first stroke among second blocks obtained by segmenting the handwritten content at a second segmentation level (e.g., a text line-based segmentation level), and third characteristic information of a block including the first stroke among third blocks obtained by segmenting the handwritten content at a third segmentation level (e.g., a word-based segmentation level).

Then, the device 100 may extract multi-scale characteristic information of the first stroke by combining the first characteristic information, the second characteristic information, and the third characteristic information with characteristic information of the first stroke extracted in operation S310.

In operation S350, the device 100 may classify the objects included in the handwritten content using the multi-scale characteristic information. In addition, the device 100 may analyze types of objects included in the handwritten content.

For example, the device 100 may cluster first strokes constituting a first line in one paragraph as a first group, and cluster second strokes constituting a second line as a second group. Here, when the first strokes included in the first group and the second strokes included in the second group have characteristics of a text line and y-axis distances between the first strokes included in the first group and the second strokes included in the second group are a threshold value or less, the device 100 may determine that the first strokes and the second strokes constitute one paragraph.

In addition, the device 100 may classify a third group as a list object when strokes included in the third group follow a pattern used in a list (e.g., when the first strokes of respective lines are "−" and x-axis values of the first strokes of the respective lines are similar to each other), and may classify a fourth group as a figure object when characteristic information of strokes included in the fourth group follow a pattern shown in figures.

According to an embodiment of the present disclosure, the device 100 may implement operation S310 to operation S350 through a machine learning algorithm. Meanwhile, FIG. 3 illustrates an example of segmenting handwritten content into objects, and segmentation of handwritten content is not limited to the machine learning algorithm. A variety of algorithms for segmenting handwritten content into objects may be used.

Figure 4:
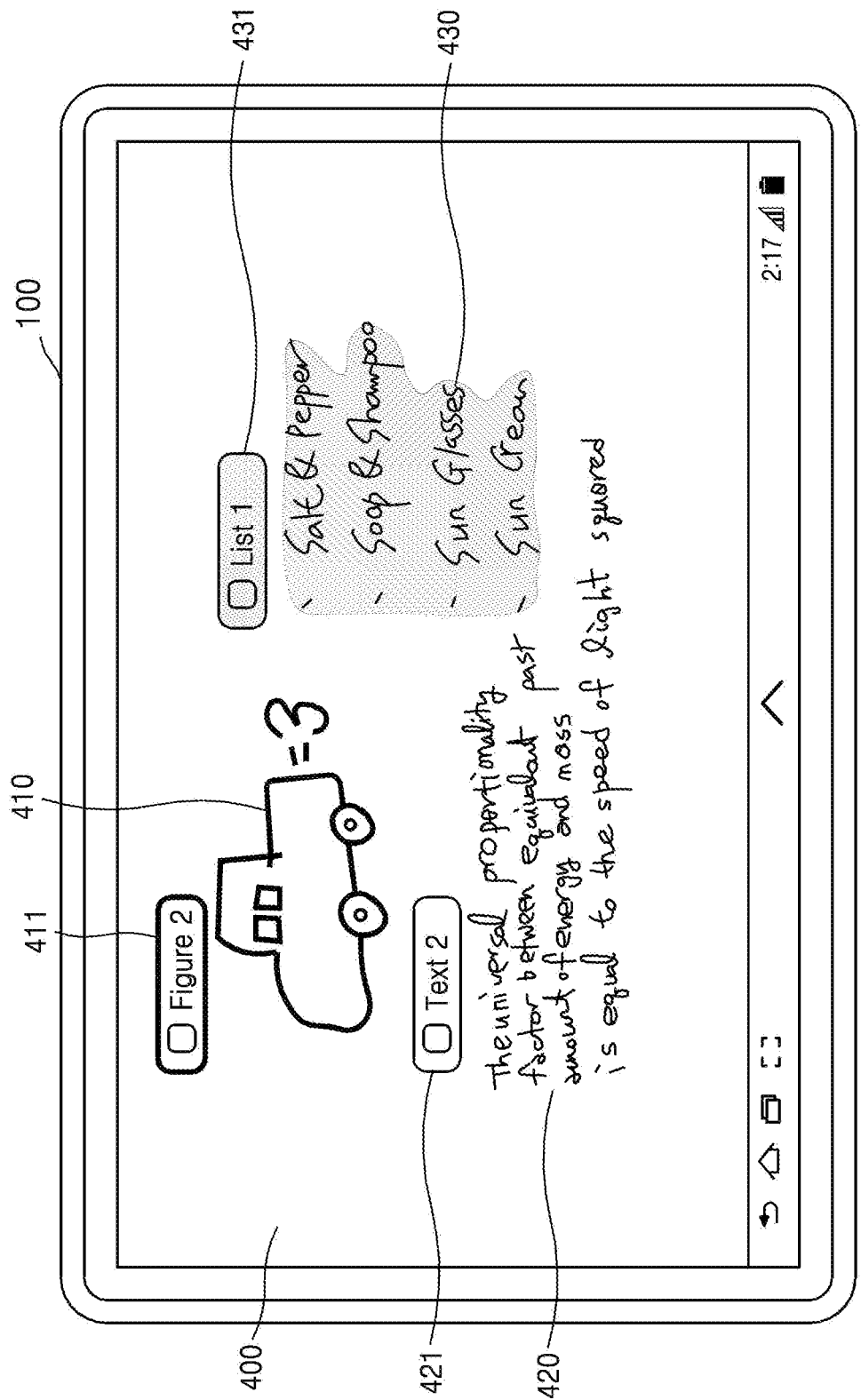
FIG. 4 is a diagram illustrating a device for providing handwritten content including segmented objects according to an embodiment of the present disclosure.

FIG. 4 is a diagram illustrating a device for providing handwritten content including segmented objects according to an embodiment of the present disclosure.

Referring to FIG. 4, the device 100 may acquire handwritten content 400 including an automobile image, a paragraph (e.g., "The universal proportionality factor between equivalent past amount of energy and mass is equal to the speed of light squared"), and a list (e.g.,-Salt & Pepper/-Soap & Shampoo/-Sun Glasses/-Sun Cream).

According to an embodiment of the present disclosure, the device 100 may group strokes included in the handwritten content 400 or analyze characteristics of the strokes through operation S310 to operation S350 of FIG. 3. For example, the device 100 may group the strokes included in the handwritten content 400 as first strokes constituting the automobile image, second strokes constituting text, and third strokes constituting the list.

In addition, the device 100 may analyze characteristics of each set of the first strokes, the second strokes, and the third strokes included in the handwritten content 400. Since analysis results indicate that the first strokes have figure characteristics, the second strokes have text characteristics, and the third strokes have list characteristics, the device 100 may define the first strokes as a figure object 410, the second strokes as a text object 420, and the third strokes as a list object 430. In other words, the device 100 may segment the handwritten content 400 into the figure object 410, the text object 420, and the list object 430.

According to an embodiment of the present disclosure, the device 100 may express the figure object 410, the text object 420, and the list object 430 in different forms. For example, the device 100 may express the figure object 410 in blue, the text object 420 in orange, and the list object 430 in green, but expressions of the objects 410 to 430 are not limited thereto. The device 100 may cause respective sets of strokes included in the figure object 410, the text object 420, and the list object 430 to be different in thickness. In addition, the device 100 may express backgrounds of the figure object 410, the text object 420, and the list object 430 in different patterns.

According to an embodiment of the present disclosure, the device 100 may provide each of the figure object 410, the text object 420, and the list object 430 in the form of a selectable object. For example, when the user places the touch tool on the figure object 410, the device 100 may select the figure object 410. In this specification, "selection of an object" may denote simultaneous selection of strokes constituting the object or selection of an area in which strokes constituting the object are displayed.

According to an embodiment of the present disclosure, the device 100 may display labels indicating object types of the respective plurality of objects 410 to 430 on the handwritten content 400. For example, the device 100 may display a label "FIG. 2" 411 near the figure object 410, a label "Text 2" 421 near the text object 420, and a label "List 1" 431 near the list object 430. According to an embodiment of the present disclosure, by clicking a determine box in a label, the user may select the corresponding object.

An operation of editing handwritten content in units of segmented objects in the device 100 will be described below.

Figure 5:
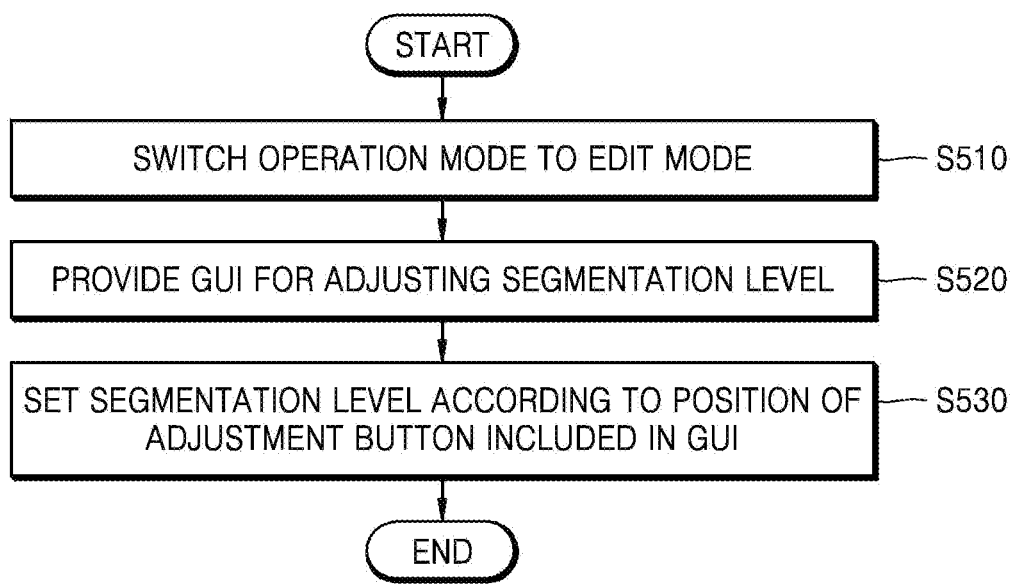
FIG. 5 is a flowchart illustrating a method of adjusting a segmentation level in a device according to an embodiment of the present disclosure.

FIG. 5 is a flowchart illustrating a method of adjusting a segmentation level in a device according to an embodiment of the present disclosure.

Referring to FIG. 5, in operation S510, the device 100 may switch the operation mode to the edit mode.

According to an embodiment of the present disclosure, the device 100 may receive a user input for requesting a switch to the edit mode, and switch the operation mode to the edit mode according to the user input. The user input for requesting a switch to the edit mode may be diverse.

For example, the device 100 may recognize an input for selecting at least one object from among a plurality of objects included in handwritten content for a set time or longer as a request for a switch to the edit mode. Here, the input of selecting at least one object may be an input of touching the at least one object (e.g., a double tap input or a touch and hold input), a hovering input for the at least one object, and the like, but is not limited thereto.

The hovering input may denote an input event in which a touch tool (e.g., a finger or the electronic pen) approaches a touch screen within a certain separation distance. For example, the hovering input may denote an event in which the touch tool approaches the touch screen as close as the device 100 may detect the position of the touch tool (e.g., the electronic pen). In addition, the hovering input may include an input of the user making the touch tool approach the touch screen while pressing a button included in the touch tool (e.g., the electronic pen).

According to an embodiment of the present disclosure, based on an input for selecting a button for a mode switch, the device 100 may switch the operation mode to the edit mode. Here, the button for a mode switch may be a physical button attached to the device 100 or a virtual graphical user interface (GUI) button.

In operation S520, when the operation mode is switched to the edit mode, the device 100 may provide a GUI for adjusting a segmentation level.

A segmentation level denotes units (degrees) for segmenting handwritten content. Segmentation levels may be "document," "text/non-text," "text/figure/list/table," "paragraph," "text-line," "word," "character," "stroke," and the like, but are not limited thereto.

According to an embodiment of the present disclosure, the device 100 may display the GUI for adjusting a segmentation level on handwritten content. In addition, the device 100 may display the GUI for adjusting a segmentation level in an area which does not overlap an area in which the handwritten content is displayed.

According to an embodiment of the present disclosure, the GUI for adjusting a segmentation level may include an adjustment button. The adjustment button may be a button on a scroll bar, +/− buttons, or directional key (▲/▼) buttons, but is not limited thereto.

In operation S530, the device 100 may set a segmentation level according to the position of the adjustment button included in the GUI. For example, the device 100 may receive an input for moving the position of the adjustment button included in the GUI, and set a level corresponding to the final position of the adjustment button as a segmentation level.

When the level corresponding to the final position of the adjustment button is "text/non-text," the device 100 may set the segmentation level to "text/non-text." Here, the handwritten content may be segmented into text objects having text characteristics and non-text objects having non-text characteristics.

FIG. 6 illustrates changing an operation mode of a device to the edit mode according to an embodiment of the present disclosure.

Referring to 600-1 of FIG. 6, the device 100 may display handwritten content which has been segmented into a first object (automobile image), a second object (text) 600, and a third object (list) according to object types on the screen.

According to an embodiment of the present disclosure, the user may select an object in the handwritten content through a hovering input. For example, when the user places the touch tool (e.g., the electronic pen) at a certain height from an area in which the second object 600 is displayed, the device 100 may determine that a hovering input for selecting the second object 600 has been made. Based on the hovering input, the device 100 may select the second object 600.

The device 100 may display an image (e.g., a boundary line) for identifying the selected second object 600 around the second object 600. For example, the device 100 may display a boundary line including strokes constituting the second object 600 in the form of a spline 610. In addition, the device 100 may change the color or the thickness of the strokes constituting the selected second object 600. According to an embodiment of the present disclosure, the device 100 may display a label (e.g., "Text 2") indicating the type of the selected second object 600 near the second object 600.

Meanwhile, the device 100 may receive a long-hovering input of making a proximity touch above the area in which the second object 600 is displayed with the touch tool for a set time or longer. For example, the user may keep the electronic pen above the second object 600 for two seconds or longer while pressing a certain button of the electronic pen. In this case, the device 100 may detect a long-hovering input for the second object 600, and recognize the long-hovering input as an input for switching to the edit mode.

Referring to 600-2 of FIG. 6, the device 100 may switch the operation mode from the pen mode to the edit mode. At this time, the device 100 may display an image indicating the edit mode on the handwritten content. For example, the device 100 may display a boundary line including the strokes constituting the second object 600 in the form of a rectangle 620.

According to an embodiment of the present disclosure, the device 100 may provide an editing function for at least one object in the edit mode. The editing function may include at least one of a change of the size of an object, a change of the position of an object, deletion of the whole/a part of an object, undo/redo, a change of the color of an object, a change of a label, and a change of the transparency of an object, but is not limited thereto. Meanwhile, editing of an object may include editing of strokes constituting the object.

In general, to edit a part of handwritten content while the user inputs handwriting on the touch screen using a writing instrument in the pen mode, the user should inconveniently set the operation mode to the edit mode by pressing a button on the touch screen. On the other hand, according to an embodiment of the present disclosure, the user may easily enter the edit mode through a simple touch input (e.g., a long-hovering input) while inputting handwriting.

Meanwhile, according to an embodiment of the present disclosure, the device 100 may display a GUI 630 for adjusting a segmentation level in the edit mode. The GUI 630 for adjusting the segmentation level may be in the form of a scroll bar. In this case, the user may adjust the segmentation level by dragging an adjustment button on the scroll bar to the left or right or touching a left/right direction key on the scroll bar. An operation of adjusting the segmentation level in the device 100 will be described with reference to FIG. 7.

Figure 7:
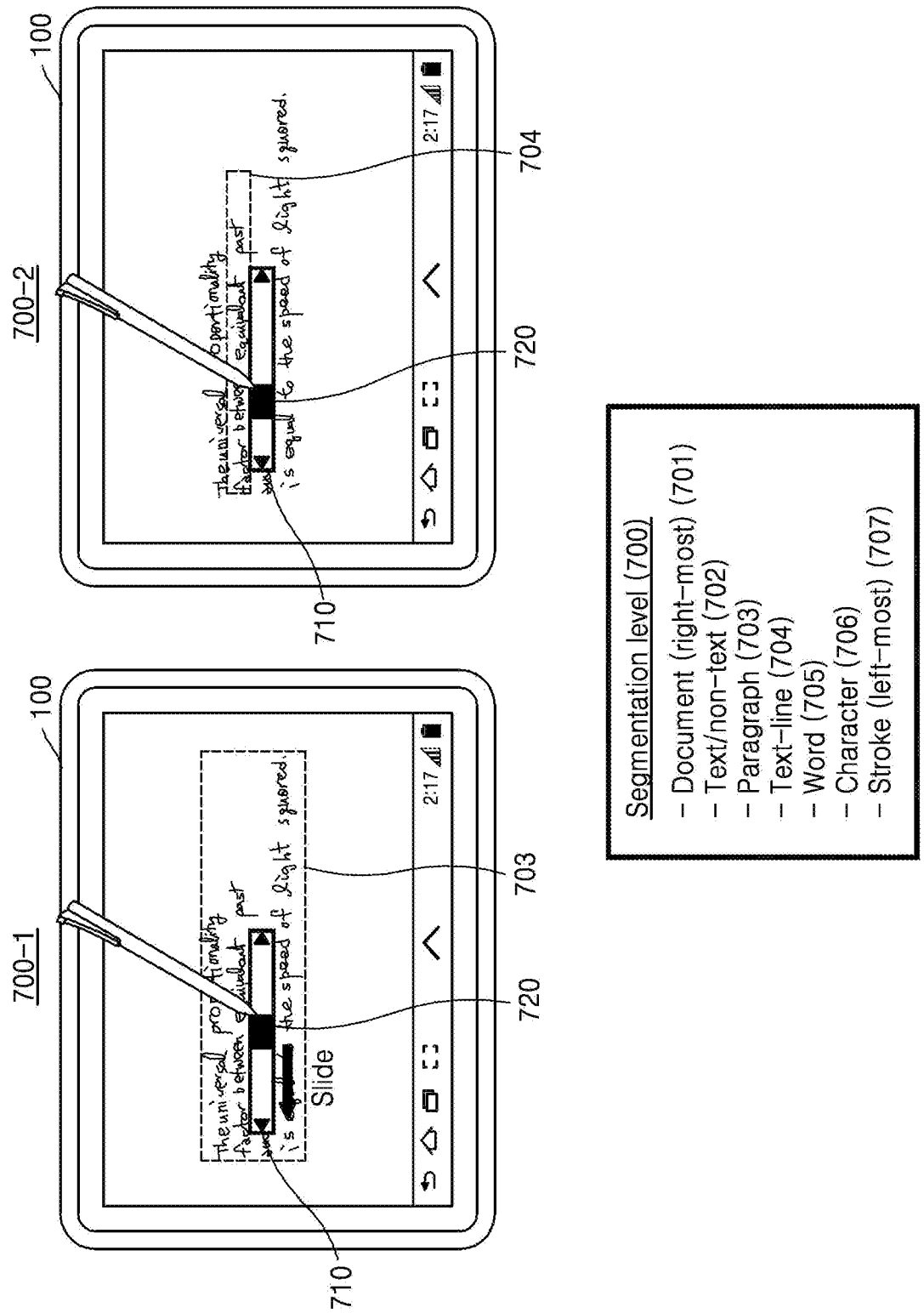
FIG. 7 illustrates adjusting a segmentation level through a graphical user interface (GUI) according to an embodiment of the present disclosure.

FIG. 7 illustrates adjusting a segmentation level through a GUI according to an embodiment of the present disclosure.

Referring to FIG. 7, a case in which an object included in handwritten content is a text object will be described as an example.

According to an embodiment of the present disclosure, a segmentation level 700 may be classified as "document" 701, "text/non-text" 702, "paragraph" 703, "text-line" 704, "word" 705, "character" 706, or "stroke" 707.

When an adjustment button 720 on a scroll bar 710 is at the rightmost position, the segmentation level 700 may be "document" 701, and when the adjustment button 720 on the scroll bar 710 is at the leftmost position, the segmentation level 700 may be "stroke" 707.

Referring to 700-1 of FIG. 7, the device 100 may provide the scroll bar 710 for adjusting the segmentation level 700 in the edit mode. Here, an initially set segmentation level may be "paragraph" 703, and the device 100 may display the adjustment button 720 at a position corresponding to the initially set segmentation level.

The user may change the segmentation level 700 by moving the adjustment button 720 to the left or right on the scroll bar 710. For example, the user may slide the adjustment button 720 to the left by one slot.

Referring to 700-2 of FIG. 7, the device 100 may receive an input of sliding the adjustment button 720 by one slot to the left on the scroll bar 710. In this case, the device 100 may change the segmentation level 700 according to the changed position of the adjustment button 720. For example, the device 100 may change the segmentation level 700 from "paragraph" 703 to "text-line" 704.

When the segmentation level 700 is "text-line" 704, the device 100 may segment handwritten content in units of text lines. For example, since a text object shown in the drawing has four lines, the device 100 may segment the handwritten content into a first text-line object (e.g., "The universal . . . "), a second text-line object (e.g., "factor between . . . "), a third text-line object (e.g., "amount of energy"), and a fourth text-line object (e.g., "is equal to . . . ").

In an embodiment of the present disclosure, according to a user input, the device 100 may change a segmentation level in the edit mode and return to the pen mode. An operation of selecting an object in the device 100 according to a changed segmentation level will be described with reference to FIG. 8.

FIG. 8 illustrates a case in which a segmentation level changed by a user is "text line" according to an embodiment of the present disclosure.

Referring to 800-1 of FIG. 8, when the user places the touch tool (e.g., the electronic pen) at a certain height from a fourth text-line object (e.g., "or other organization is governed"), the device 100 may detect a hovering input for selecting the fourth text-line object (e.g., "or other organization is governed").

Based on the hovering input, the device 100 may select the fourth text-line object, and display a boundary line 801 for distinguishing the selected fourth text-line object from other line objects near the fourth text-line object.

Referring to 800-2 of FIG. 8, the user may place the touch tool (e.g., the electronic pen) at a certain height close to a third text-line object (e.g., "precedents according to which a state") by moving the touch tool (e.g., the electronic pen). In this case, the device 100 may select the third text-line object (e.g., "precedents according to which a state") and display a boundary line 802 for distinguishing the selected third text-line object from other line objects near the third text-line object.

According to an embodiment of the present disclosure, the device 100 provides a function for selecting handwritten content in units of segmented objects to the user, thereby enabling the user to easily select an area having a complex boundary. More particularly, when the segmentation level is set to "text-line," the device 100 may help the user to easily select a text line by automatically separating text lines which overlap each other and are difficult to be separated from each other.

Figure 9:
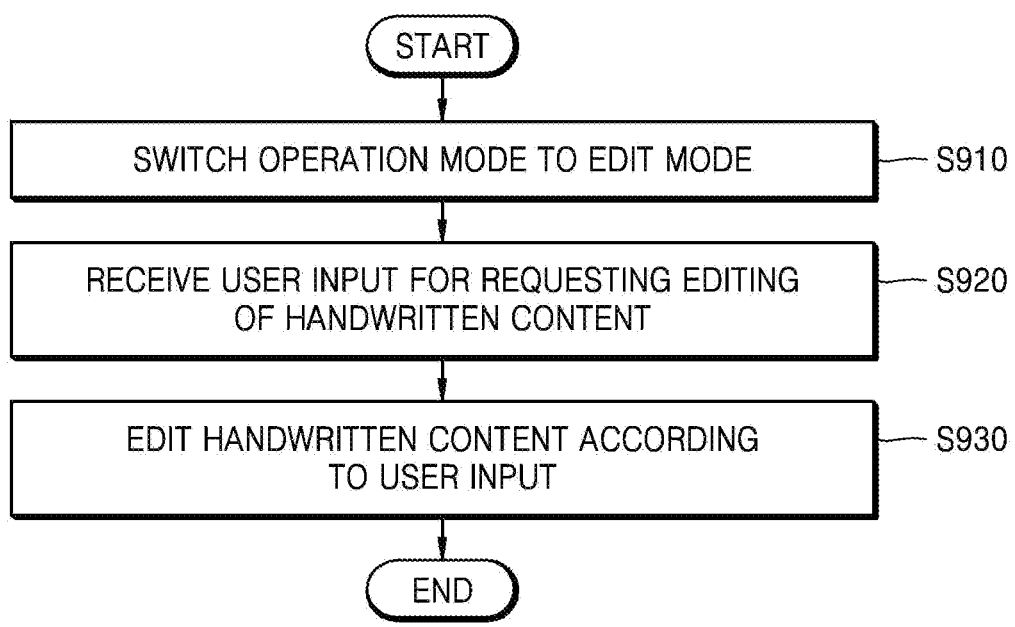
FIG. 9 is a flowchart illustrating a method of editing handwritten content in a device according to an embodiment of the present disclosure.

FIG. 9 is a flowchart illustrating a method of editing handwritten content in a device according to an embodiment of the present disclosure.

Referring to FIG. 9, in operation S910, the device 100 may switch the operation mode to the edit mode. In an embodiment of the present disclosure, the device 100 may receive a user input for requesting a switch to the edit mode, and switch the operation mode to the edit mode according to the user input. The user input for requesting a switch to the edit mode may be diverse. Since operation S910 corresponds to operation S510 of FIG. 5, the detailed description thereof will be omitted.

In operation S920, the device 100 may receive a user input for requesting editing of handwritten content in the edit mode.

According to an embodiment of the present disclosure, the device 100 may receive an input for requesting editing of an object included in the handwritten content. For example, the device 100 may receive an input (e.g., a touch and drag input) for changing the position of the object, an input for changing the size of the object, an input for deleting the object, an input for changing the color or the transparency of the object, an input for modifying the content of a label corresponding to the object, and the like.

Meanwhile, the user input for requesting editing of the handwritten content may be implemented in a variety of forms. For example, the user input for requesting editing of the handwritten content may be at least one of a touch input, a voice input, and a motion input, but is not limited thereto.

In operation S930, the device 100 may edit the handwritten content according to the user input.

According to an embodiment of the present disclosure, the device 100 may change the size of an object selected by the user according to the user input. In addition, according to the user input, the device 100 may change the position of the object selected by the user, delete the whole or a part of the object, or change the color or the transparency of the object. According to the user input, the device 100 may also modify the content of a label corresponding to the object selected by the user.

An example in which the device 100 provides the editing function will be described with reference to FIGS. 10 to 13.

FIG. 10 illustrates moving an object in a device according to a user input according to an embodiment of the present disclosure.

Referring to FIG. 10, a case in which a segmentation level is "text/non-text" will be described as an example.

Referring to 1000-1 of FIG. 10, the device 100 may display handwritten content that is a table (4×3) in which words are written. Since the segmentation level is "text/non-text," the device 100 may segment the handwritten content into text objects (e.g., the words in the table) 1010 having text characteristics and non-text objects (e.g., lines of the table) 1020 having non-text characteristics.

Referring to 1000-2 of FIG. 10, the device 100 may receive a drag input of dragging a stroke constituting the text object (e.g., the words in the table) 1010 while touching the stroke. In this case, the device 100 may move the whole text object (e.g., the words in the table) 1010 according to the drag input.

For example, when the user drags a stroke (e.g., "Uncodified") constituting the text object 1010 to the lower left, the device 100 may move the text object (e.g., the words in the table) 1010 to the lower left. At this time, while the text object (e.g., the words in the table) 1010 moves, the non-text object (e.g., lines of the table) 1020 may not move.

According to an embodiment of the present disclosure, when the segmentation level is "text/non-text," the user may easily separate lines of a table and characters in the table through a drag input.

Figure 11:
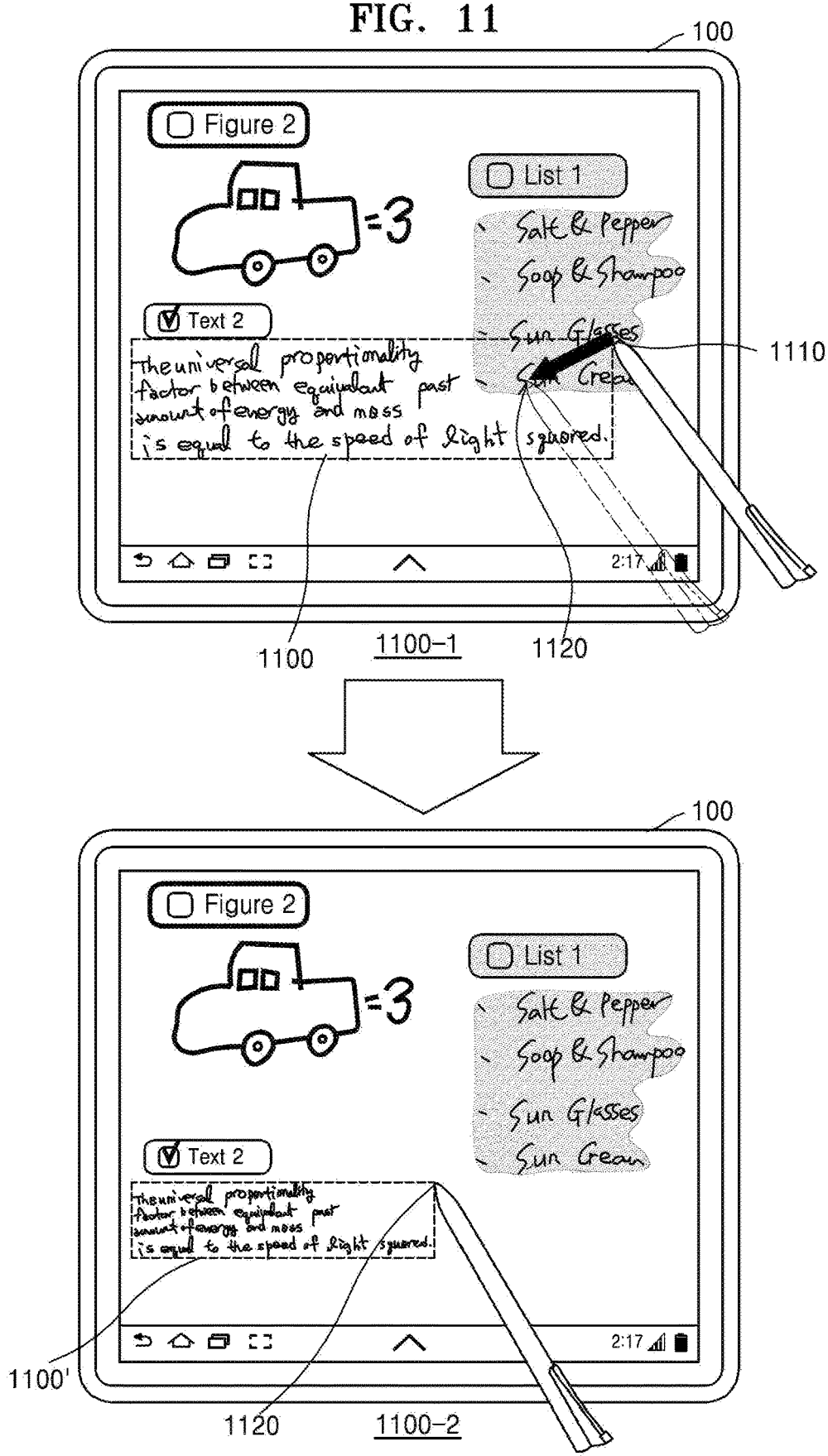
FIG. 11 illustrates changing a size of an object in a device according to a user input according to an embodiment of the present disclosure.

FIG. 11 illustrates changing a size of an object in a device according to a user input according to an embodiment of the present disclosure.

Referring to 1100-1 of FIG. 11, the device 100 may display handwritten content which has been segmented into a first object (automobile image), a second object (text), and a third object (list) according to object type on the screen.

In the edit mode, the device 100 may receive an input for changing the size of the second object (text). For example, the device 100 may receive a drag input of dragging a first point 1110 of an area 1100 including the second object (text) to a second point 1120 while touching the first point 1110.

Referring to 1100-2 of FIG. 11, the device 100 may reduce the size of the second object (text) at a ratio. For example, the device 100 may reduce sizes of strokes constituting the second object (text) at the ratio.

Meanwhile, when the user drags a corner (i.e., the second point 1120) of an area 1100' including the reduced second object (text) to the first point 1110 while touching the corner (i.e., the second point 1120), the device 100 may enlarge the reduced second object at a ratio.

FIG. 12 illustrates adding a target of editing in a device according to an embodiment of the present disclosure.

Referring to 1200-1 of FIG. 12, the device 100 may display handwritten content which has been segmented into a first object (automobile image), a second object (text), and a third object (list) according to object type on the screen. At this time, the device 100 may display a first label (e.g., "FIG. 2") 1210 corresponding to the first object, a second label (e.g., "Text 2") 1220 corresponding to the second object, and a third label (e.g., "List 1") 1230 corresponding to the third object on the handwritten content.

When the user clicks a determine box in the second label 1220 corresponding to the second object, the device 100 may designate the second object as a target of editing. At this time, the device 100 may display an image (e.g., a rectangle) 1201 which indicates that the second object is a target of editing.

Referring to 1200-2 of FIG. 12, the device 100 may add a target of editing based on a user input. For example, when the user clicks a determine box in the third label 1230, the device 100 may designate the third object also as a target of editing. At this time, the device 100 may display an image (e.g., a rectangle) 1202 which indicates that the third object is a target of editing.

FIG. 13 illustrates changing an operation mode of a device to a pen mode according to an embodiment of the present disclosure.

Referring to 1300-1 of FIG. 13, the device 100 may receive an input for finishing the edit mode. For example, in the edit mode, the device 100 may receive an input of touching (or clicking) an empty space 1310 in which no stroke is displayed.

Referring to 1300-2 of FIG. 13, the device 100 may change the operation mode from the edit mode to the pen mode according to the input of touching (or clicking) the empty space 1310. According to an embodiment of the present disclosure, the user may input new handwritten content in the pen mode.

Figure 14:
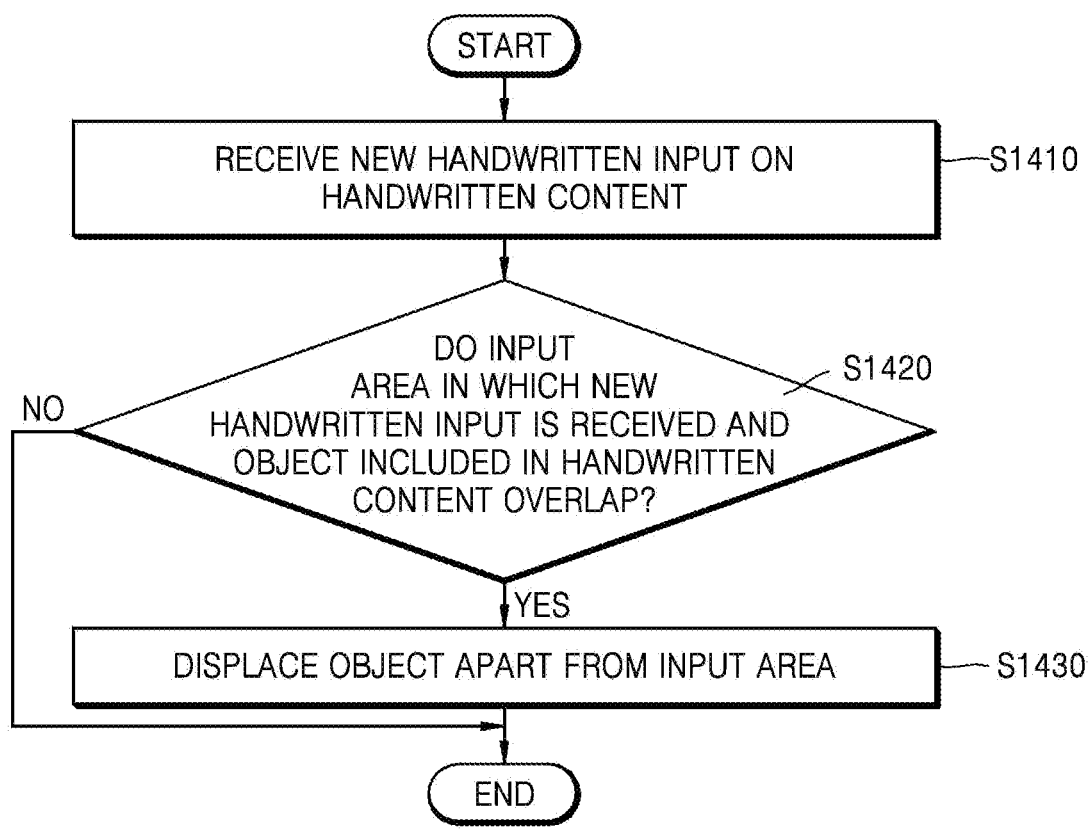
FIG. 14 is a flowchart illustrating a method of separating an object overlapping an input area in which a new handwritten input is received from the input area in a device according to an embodiment of the present disclosure.

FIG. 14 is a flowchart illustrating a method of separating an object overlapping an input area in which a new handwritten input is received from the input area in a device according to an embodiment of the present disclosure.

Referring to FIG. 14, in operation S1410, the device 100 may receive a new handwritten input on handwritten content. At this time, the handwritten content may have been segmented into a plurality of objects according to a segmentation level.

In operation S1420, the device 100 may determine whether an input area in which the new handwritten input is received and the plurality of objects included in the handwritten content overlap. For example, the device 100 may compare coordinate values of the input area in which the new handwritten input is received with coordinate values of the plurality of objects included in the handwritten content. According to comparison results, the device 100 may extract at least one object which overlaps the input area in which the new handwritten input is received.

In operation S1430, the device 100 may separate the at least one object overlapping the input area from the input area by a certain distance or more. For example, the device 100 may determine a separation direction and/or a separation distance based on a direction in which the new handwritten input is received and the size of the input area. According to an embodiment of the present disclosure, as the input area increases in size, the separation distance of the at least one object overlapping the input area may also increase.

FIG. 15 illustrates separating an object overlapping an input area in which a new handwritten input is received from the input area in a device according to an embodiment of the present disclosure.

Referring to 1500-1 of FIG. 15, the device 100 may display handwritten content which has been segmented into a first object (text object) 1510, a second object (list object) 1520, and a third object (figure object) 1530 on the screen. At this time, the device 100 may receive a new handwritten input 1540 in an area 1500 among the first object 1510, the second object 1520, and the third object 1530.

Referring to 1500-2 of FIG. 15, the device 100 may extract at least one object overlapping the area 1500 in which the new handwritten input 1540 is received. For example, the device 100 may extract the first object 1510 and the second object 1520 overlapping the area 1500 in which the new handwritten input 1540 is received.

Then, the device 100 may move the first object 1510 and the second object 1520 so as not to overlap the area 1500 in which the new handwritten input 1540 is received. For example, from the area 1500 in which the new handwritten input 1540 is received, the device 100 may separate the first object 1510 downward and the second object 1520 to the right.

According to an embodiment of the present disclosure, the device 100 may push an object out of a position at which new handwriting is started so that the object does not hinder handwriting.

Figure 16:
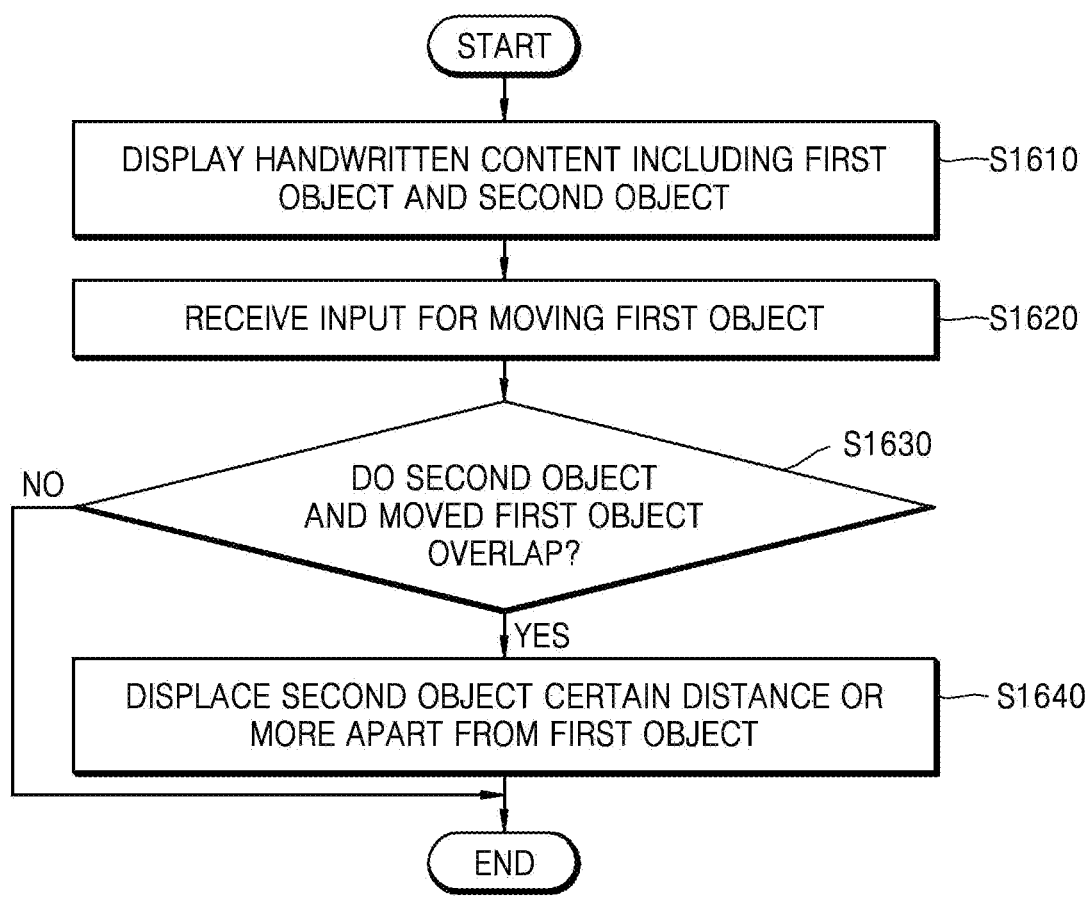
FIG. 16 is a flowchart illustrating a method of separating a second object from a first object in a device when the first object is moved according to an embodiment of the present disclosure.

FIG. 16 is a flowchart illustrating a method of separating a second object from a first object in a device when the first object is moved according to an embodiment of the present disclosure.

Referring to FIG. 16, in operation S1610, the device 100 may display handwritten content including a first object and a second object. The first object and the second object may be objects which have been segmented in the handwritten content according to a segmentation level.

In operation S1620, the device 100 may receive an input for moving the first object. For example, the device 100 may receive a drag input of dragging the first object while touching (or clicking) the first object.

In operation S1630, when the first object is moved, the device 100 may determine whether the second object and the moved first object overlap. For example, the device 100 may compare coordinate values of strokes included in the moved first object with coordinate values of strokes included in the second object. When coordinate values of a stroke included in the moved first object are the same as coordinate values of a stroke included in the second object or differences between coordinate values of a stroke included in the moved first object and coordinate values of a stroke included in the second object are less than a threshold value, the device 100 may determine that the first object and the second object overlap.

In operation S1640, when the second object and the moved first object overlap, the device 100 may displace the second object a certain distance apart from the moved first object. For example, the device 100 may determine a separation direction and a separation distance of the second object based on a moved direction and a moved distance of the first object.

According to an embodiment of the present disclosure, the device 100 may push a second object present near a moving first object so that the second object does not hinder editing of handwritten content.

FIG. 17 illustrates separating a second object from a first object in a device when the first object is moved according to an embodiment of the present disclosure.

Referring to 1700-1 of FIG. 17, the device 100 may display handwritten content which has been segmented into a first object (list object) 1710, a second object (text object) 1720, and a third object (figure object) 1730 on the screen. Here, the device 100 may receive an input of dragging the selected first object 1710 in a diagonal direction, that is, to the lower left, while touching the first object 1710.

Referring to 1700-2 of FIG. 17, the device 100 may move the first object 1710 to the lower left according to the input of dragging the first object 1710. At this time, since the second object 1720 positioned on the lower left side and the moved first object 1710 may overlap, the device 100 may push the second object 1720 downward so that the moved first object 1710 and the second object 1720 do not overlap.

Figure 18:
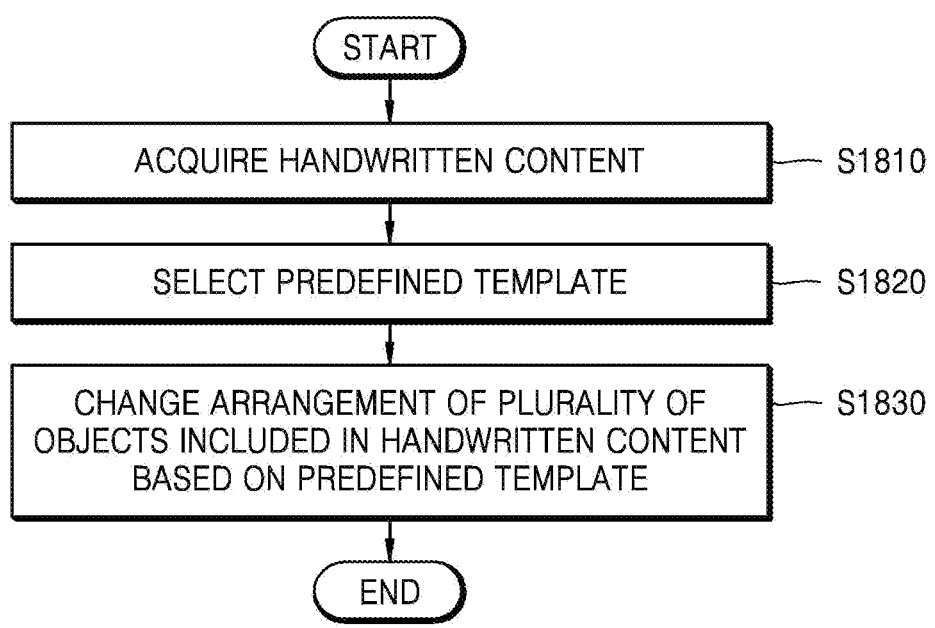
FIG. 18 is a flowchart illustrating a method of changing an arrangement of a plurality of objects in a device based on a certain template according to an embodiment of the present disclosure.

FIG. 18 is a flowchart illustrating a method of changing an arrangement of a plurality of objects in a device based on a certain template according to an embodiment of the present disclosure.

Referring to FIG. 18, in operation S1810, the device 100 may acquire handwritten content. Since operation S1810 corresponds to operation S210 of FIG. 2, the detailed description thereof will be omitted.

In operation S1820, the device 100 may select a certain template. In a template, the arrangement of segmented objects may be defined. According to an embodiment of the present disclosure, when there is one certain template, selection of the certain template may include selection of whether to apply the certain template.

According to an embodiment of the present disclosure, when there are a plurality of certain templates, the device 100 may provide a template list including the plurality of templates. In addition, the device 100 may receive a user input for selecting one template from the template list.

In operation S1830, the device 100 may change the arrangement of a plurality of objects included in the handwritten content based on the certain template. For example, while a text object is on the left and a figure object is on the right in the acquired handwritten content, a figure object may be on the left and a text object may be on the right in the certain template. In this case, the device 100 may exchange the positions of the text object and the figure object included in the acquired handwritten content.

An operation of changing the arrangement of a plurality of objects in the device 100 will be described with reference to FIGS. 19 and 20.

Figure 19:
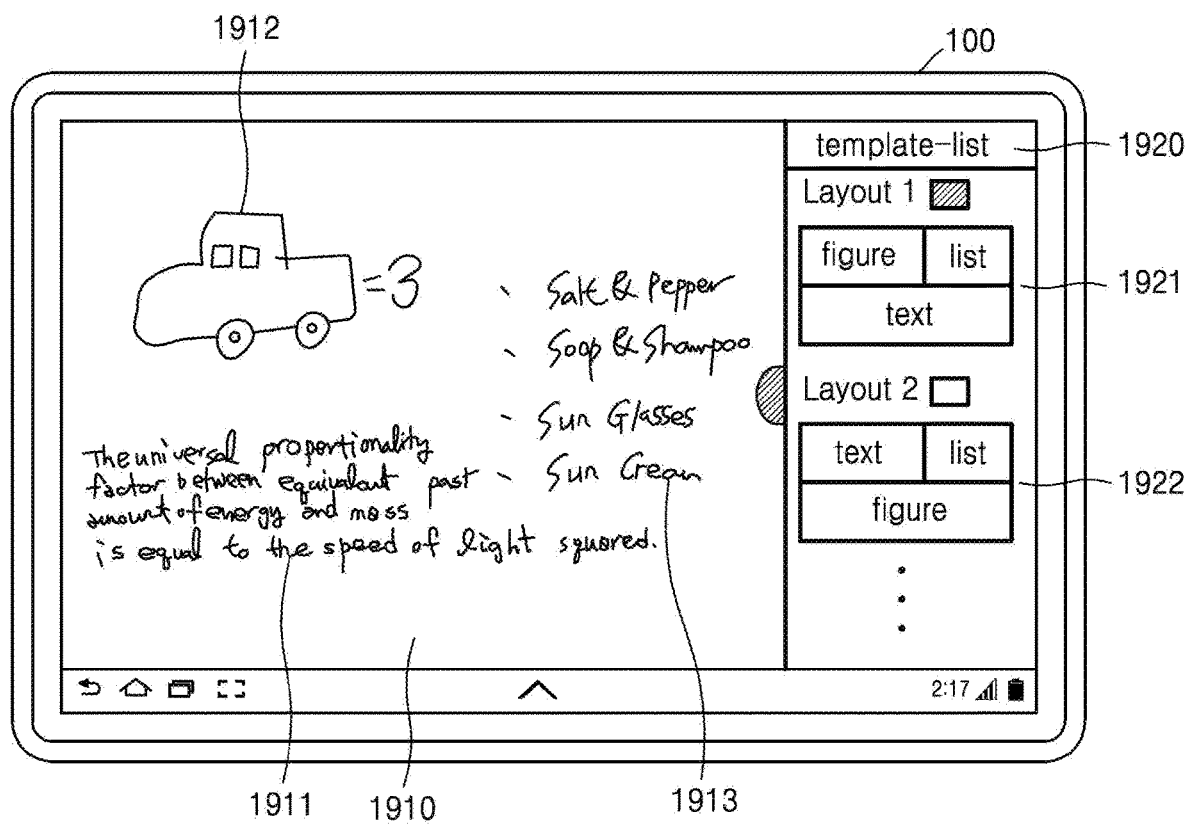
FIG. 19 illustrates providing a template list in a device according to an embodiment of the present disclosure.

FIG. 19 illustrates providing a template list in a device according to an embodiment of the present disclosure.

Referring to FIG. 19, the device 100 may receive a user input for requesting a template list 1920. At this time, the device 100 may provide the template list 1920 including at least one certain template.

According to an embodiment of the present disclosure, the device 100 may extract certain templates based on type information of objects included in handwritten content 1910. For example, when the handwritten content 1910 is segmented into a text object 1911, a figure object 1912, and a list object 1913, the device 100 may extract a first template 1921 and a second template 1922 including arrangement information of text, a figure, and a list.

Meanwhile, when the request for the template list 1920 is received while the device 100 displays the handwritten content 1910, the device 100 may display the handwritten content 1910 in a first area and the template list 1920 in a second area. In addition, when the request for the template list 1920 is received while the device 100 displays the handwritten content 1910, the device 100 may display the template list 1920 on the handwritten content 1910 in the form of a popup window.

According to an embodiment of the present disclosure, the device 100 may receive a user input for selecting one template from the template list 1920. For example, the device 100 may receive an input for selecting the first template 1921. In this case, the device 100 may change the arrangement of the objects 1911, 1912, and 1913 included in the handwritten content 1910 according to the first template 1921. With reference to FIG. 20, an arrangement change of objects will be further described.

Figure 20:
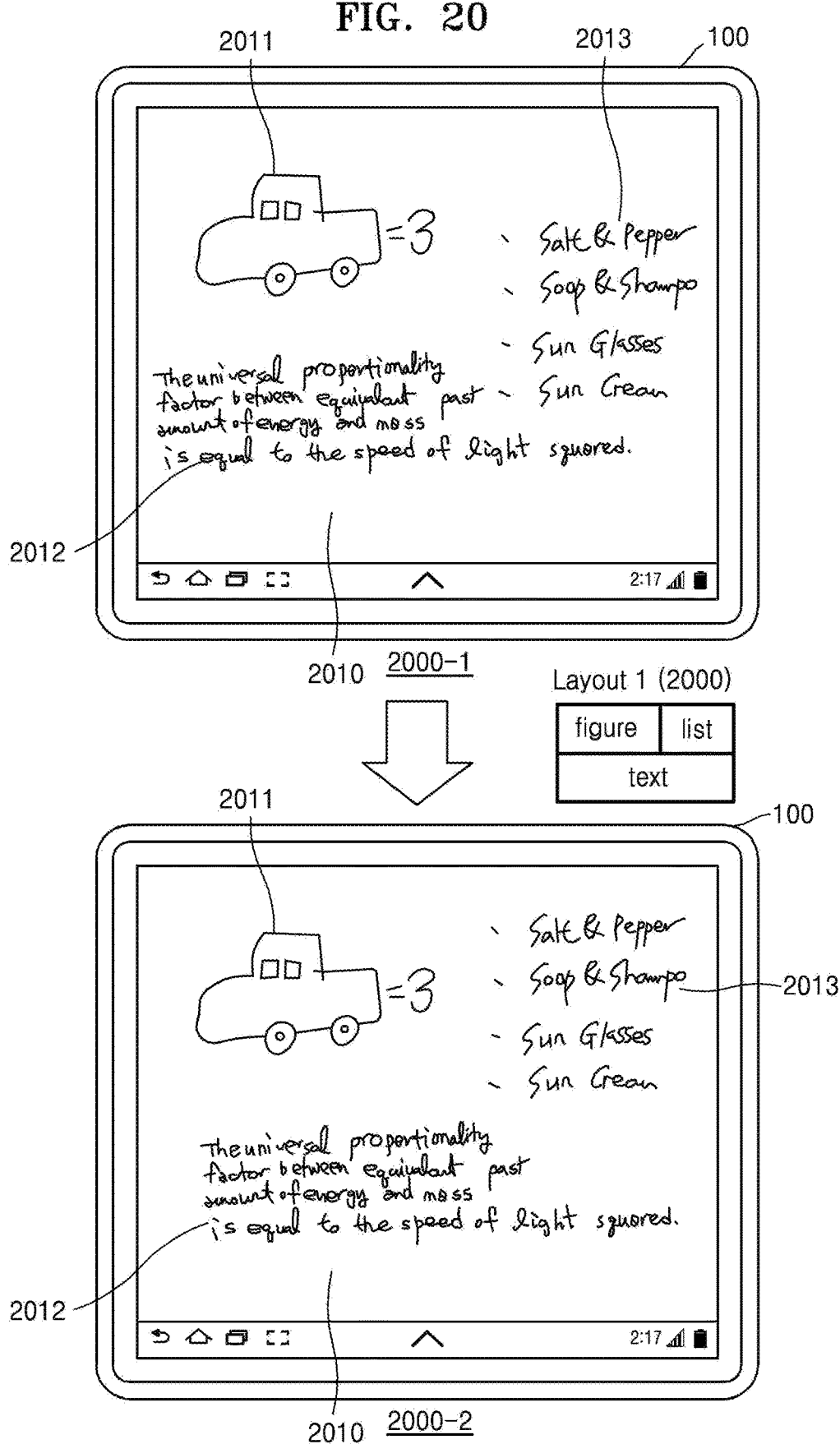
FIG. 20 illustrates changing an arrangement of a plurality of objects in a device based on a certain template according to an embodiment of the present disclosure.

FIG. 20 illustrates changing an arrangement of a plurality of objects in a device based on a certain template according to an embodiment of the present disclosure.

Referring to 2000-1 of FIG. 20, the device 100 may display handwritten content 2010 segmented into a figure object (automobile image) 2011, a text object 2012, and a list object 2013 on the screen.

According to an embodiment of the present disclosure, the device 100 may change the arrangement of the segmented objects 2011, 2012, and 2013 in the handwritten content 2010 based on a certain first template 2000. The first template 2000 may be a template selected by the user, a template initially set in the device 100, or a template recommended by the device 100, but is not limited thereto.

Referring to 2000-2 of FIG. 20, according to the certain first template 2000, the device 100 may dispose the figure object 2011 on the upper left side, the list object 2013 on the upper right side, and the text object 2012 on the lower side.

According to an embodiment of the present disclosure, the device 100 enables the user to freely change the arrangement of segmented objects in handwritten content using a template.

Figure 21:
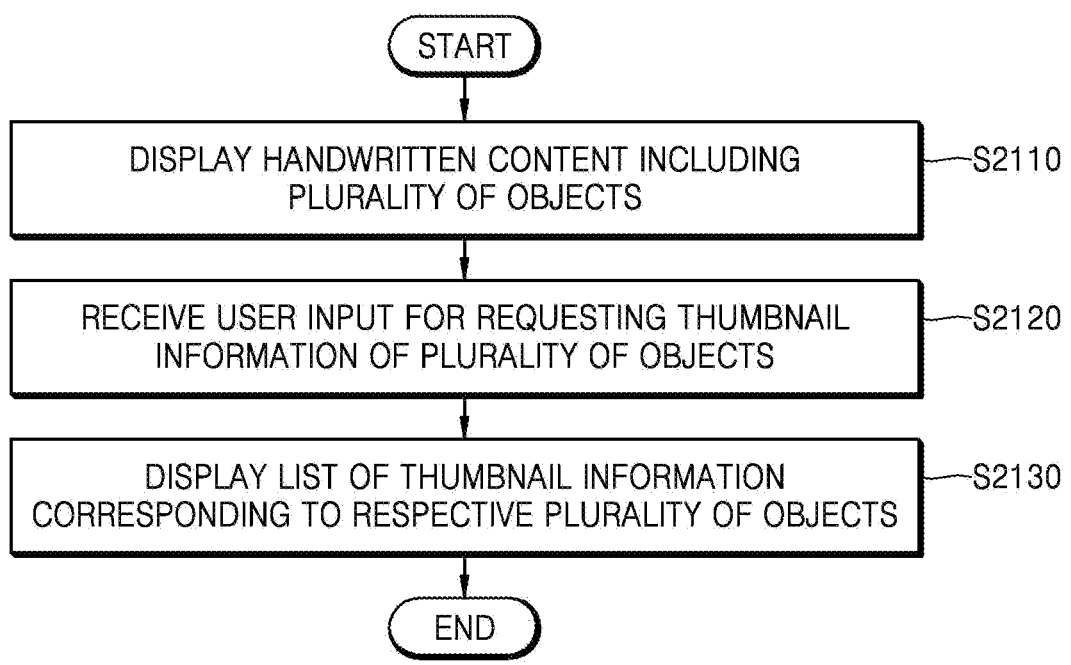
FIG. 21 is a flowchart illustrating a method of displaying a list of thumbnail information in a device according to an embodiment of the present disclosure.

FIG. 21 is a flowchart illustrating a method of displaying a list of thumbnail information in a device according to an embodiment of the present disclosure.

Referring to FIG. 21, in operation S2110, the device 100 may display handwritten content including a plurality of objects. Here, the plurality of objects may be objects segmented in the handwritten content according to a certain segmentation level.

In operation S2120, the device 100 may receive a user input for requesting thumbnail information of the plurality of objects included in the handwritten content. Here, thumbnail information may be information which briefly describes an object. For example, thumbnail information may include a label (e.g., "Figure," "Text," "List," "Table," etc.) indicating characteristics of an object, a thumbnail image of the object (e.g., an image obtained by capturing the object in a certain size), an index (e.g., first three words of a text object), and the like, but is not limited thereto.

According to an embodiment of the present disclosure, the user input for requesting thumbnail information may be diverse. The user input for requesting thumbnail information may be a touch input, a voice input, a key input, a motion input, a bending input, and the like, but is not limited thereto.

For example, the device 100 may receive an input for selecting a button corresponding to the thumbnail information request. Here, the button may be a hardware button attached to the device 100, or a virtual GUI button. In addition, the device 100 may receive a sound corresponding to the thumbnail information request. When the device 100 includes a flexible display, the device 100 may receive a bending input of bending an area corresponding to the thumbnail information request. The device 100 may detect a motion (e.g., a three-dimensional (3D) motion) for requesting thumbnail information.

In operation S2130, the device 100 may display a list of thumbnail information corresponding to the respective plurality of objects.

According to an embodiment of the present disclosure, the device 100 may display the handwritten content including the plurality of objects and the list of thumbnail information together. For example, the device 100 may display the handwritten content in a first area of the screen, and display the list of thumbnail information corresponding to the respective plurality of objects included in the handwritten content in a second area of the screen.

According to another embodiment of the present disclosure, the device 100 may not display the handwritten content any more but may display the list of thumbnail information corresponding to the respective plurality of objects included in the handwritten content.

According to an embodiment of the present disclosure, the device 100 may display the list of thumbnail information based on coordinate values of the respective plurality of objects. For example, the list of thumbnail information may be displayed in order from higher to lower display positions of objects in the handwritten content.

According to an embodiment of the present disclosure, the device 100 may display the list of thumbnail information in a sequence previously defined according to object type. For example, the device 100 may display the list of thumbnail information in order of thumbnail information of a figure object, thumbnail information of a text object, and thumbnail information of a list object.

According to an embodiment of the present disclosure, the device 100 may display the list of thumbnail information according to a ratio of an area occupied by an object to the area of the handwritten content. For example, the device 100 may dispose thumbnail information of a first figure object which occupies the largest area in the handwritten content at the uppermost position in the list of thumbnail information.

According to an embodiment of the present disclosure, the device 100 provides thumbnail information of a respective plurality of objects included in handwritten content, thereby enabling the user to easily recognize constituents of a complex document. In addition, the user may select a plurality of objects to be edited at one time from a list of thumbnail information.

Figure 22:
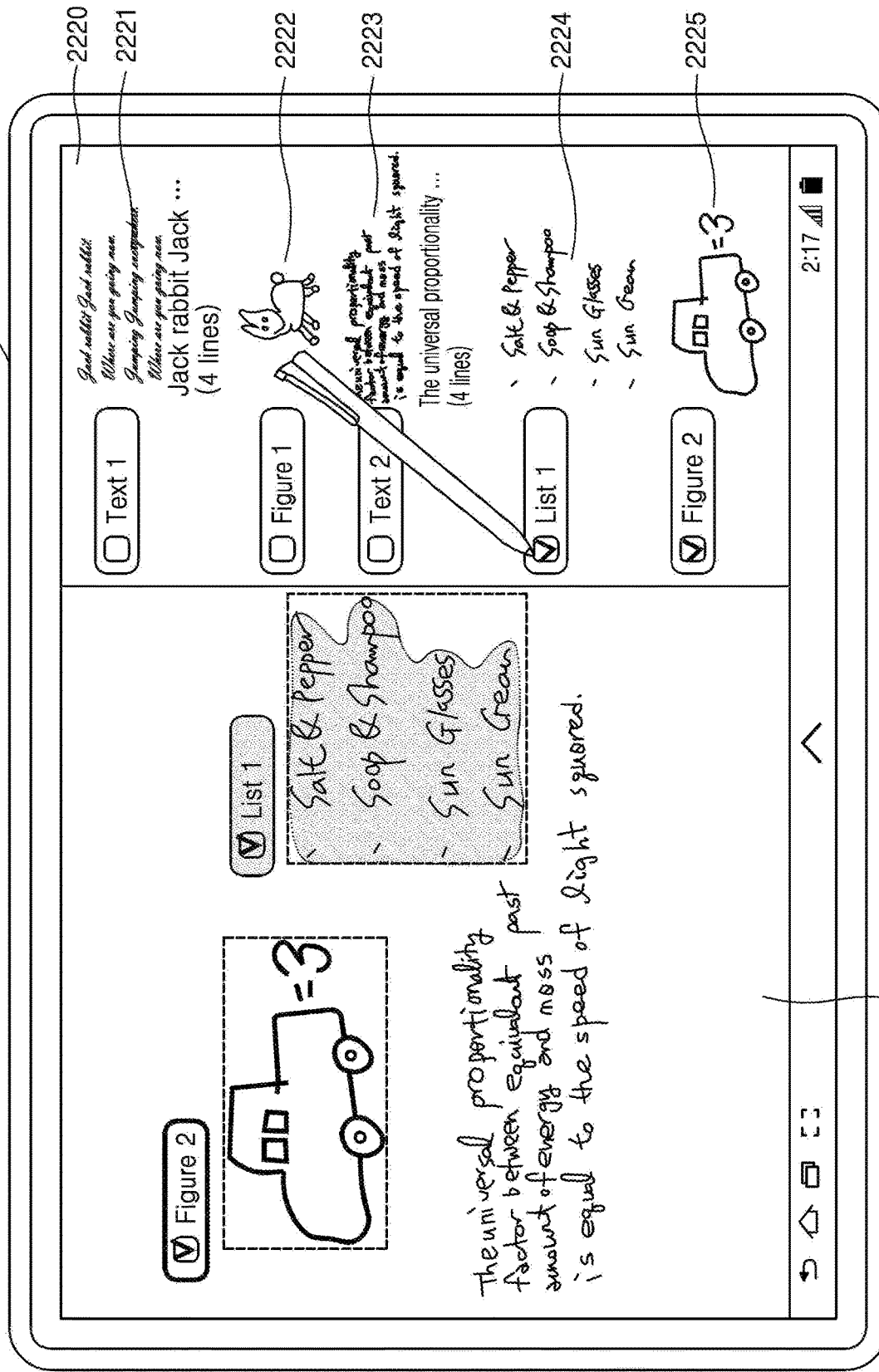
FIG. 22 illustrates displaying a list of thumbnail information in a device according to an embodiment of the present disclosure.

FIG. 22 illustrates displaying a list of thumbnail information in a device according to an embodiment of the present disclosure.

Referring to FIG. 22, the device 100 may display first handwritten content 2210 in a first area, and display a thumbnail information list 2220 corresponding to the first handwritten content 2210 in a second area.

According to an embodiment of the present disclosure, in response to a user input for requesting thumbnail information of the first handwritten content 2210, the device 100 may display the thumbnail information list 2220.

In addition, according to an embodiment of the present disclosure, even when there is no request by the user, the device 100 may display the thumbnail information list 2220 corresponding to the first handwritten content 2210 in the second area. For example, when reading the first handwritten content 2210, the device 100 may also read the thumbnail information list 2220 corresponding to the first handwritten content 2210 together.

According to an embodiment of the present disclosure, the device 100 may display thumbnail information of objects included in the first handwritten content 2210 in the thumbnail information list 2220. According to another embodiment of the present disclosure, the device 100 may also display thumbnail information of objects included in handwritten content other than the first handwritten content 2210 together in the thumbnail information list 2220.

For example, in the thumbnail information list 2220, first text object thumbnail information 2221, first figure object thumbnail information 2222, second text object thumbnail information 2223, first list object thumbnail information 2224, and second figure object thumbnail information 2225 may be displayed.

The first text object thumbnail information 2221 may include a label (e.g., "Text 1") indicating characteristics of the first text object, a thumbnail image of the first text object, first three words (e.g., Jack rabbit Jack) of the first text object, the number of lines (e.g., four lines) of the first text object, and the like. Here, the first three words (e.g., Jack rabbit Jack) of the first text object may be generated based on a character recognition result of the first text object. Although not shown in the drawing, the first figure object thumbnail information 2222 may include a summary of first text generated through natural language processing for the first text object.

The first figure object thumbnail information 2222 may include a label (e.g., "FIG. 1") indicating characteristics of the first figure object, a thumbnail image of the first figure object, and the like.

The second text object thumbnail information 2223 may include a label (e.g., "Text 2") indicating characteristics of the second text object, a thumbnail image of the second text object, first three words (e.g., The universal proportionality) of the second text object, the number of lines (e.g., four lines) of the second text object, and the like. Here, the first three words (e.g., The universal proportionality) of the second text object may be generated based on a character recognition result of the second text object. Although not shown in the drawing, the second text object thumbnail information 2223 may include a summary of second text generated through natural language processing for the second text object.

The first list object thumbnail information 2224 may include a label (e.g., "List 1") indicating characteristics of the first list object, a thumbnail image of the first list object, an index (e.g., a first word) of the first list object, and the like.

The second figure object thumbnail information 2225 may include a label (e.g., "FIG. 2") indicating characteristics of the second figure object, a thumbnail image of the second figure object, and the like.

Meanwhile, according to an embodiment of the present disclosure, the device 100 may receive an input for selecting a target of editing from the thumbnail information list 2220. For example, by clicking a determine box included in the thumbnail information list 2220, the user may select the corresponding object. At this time, the device 100 may display an image for identifying the selected object on the first handwritten content 2210 displayed in the first area.

For example, the user may click a determine box of the first list object and a determine box of the second figure object in the thumbnail information list 2220. In this case, the device 100 may display identification images (dotted boundaries) around the first list object and the second figure object included in the first handwritten content 2210. In addition, the device 100 may display the corresponding labels near the first list object and the second figure object included in the first handwritten content 2210.

Figure 23:
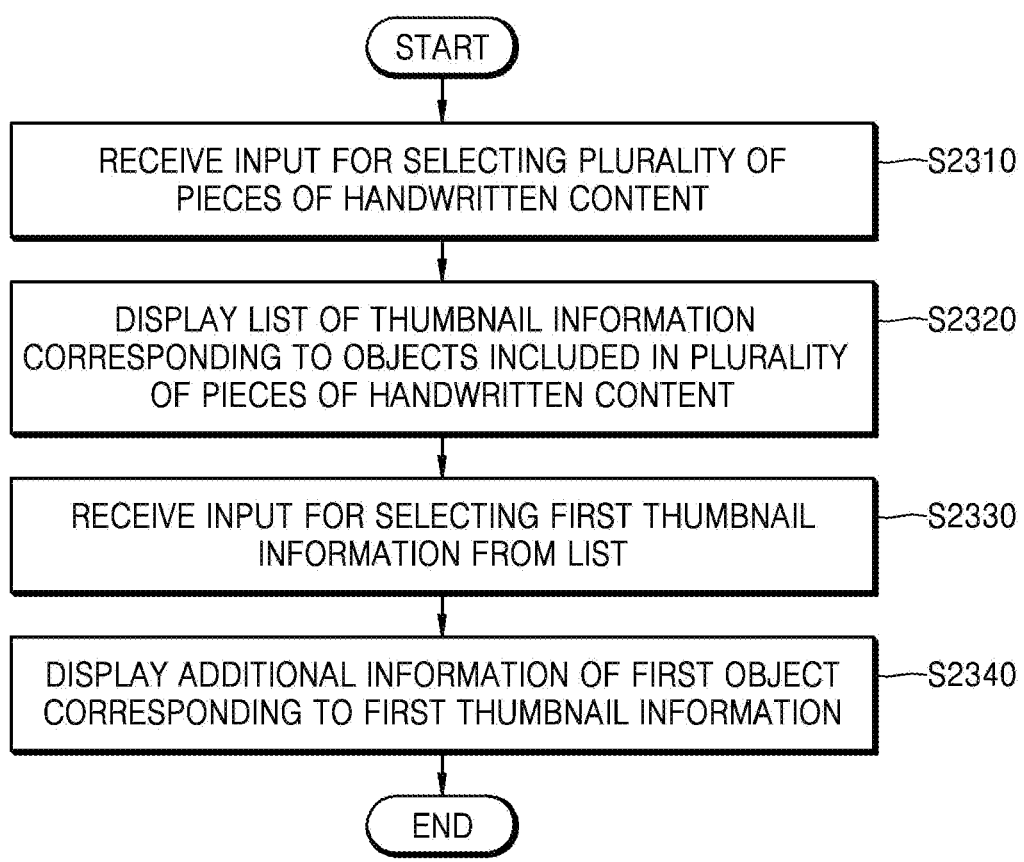
FIG. 23 is a flowchart illustrating a method of displaying additional information of objects included in handwritten content in a device according to an embodiment of the present disclosure.

FIG. 23 is a flowchart illustrating a method of displaying additional information of objects included in handwritten content in a device according to an embodiment of the present disclosure.

Referring to FIG. 23, in operation S2310, the device 100 may receive an input for selecting a plurality of pieces of handwritten content. The plurality of pieces of handwritten content may be content which has been generated based on an analog handwritten input of the user. The plurality of pieces of handwritten content may have been segmented according to a certain segmentation level (e.g., in units of objects).

According to an embodiment of the present disclosure, the device 100 may receive an input for selecting some content or all content from a handwritten content list including previously stored handwritten content.

In operation S2320, the device 100 may display a list of thumbnail information corresponding to objects included in the plurality of pieces of handwritten content. The objects included in the plurality of pieces of handwritten content may be objects segmented in the respective plurality of pieces of handwritten content according to the certain segmentation level.

The device 100 may display the list of thumbnail information corresponding to the objects included in the plurality of pieces of handwritten content in various ways. For example, based on at least one of object type, object generation time, and object size, the device 100 may arrange the thumbnail information of the objects included in the list of thumbnail information.

In operation S2330, the device 100 may receive an input for selecting first thumbnail information from the list. The input for selecting the first thumbnail information may be diverse. For example, the input for selecting the first thumbnail information may be an input of touching the first thumbnail information (e.g., a double tap input or a touch and hold input), a hovering input for the first thumbnail information, a motion input for the first thumbnail information, a voice input for the first thumbnail information, and the like, but is not limited thereto.

In operation S2340, the device 100 may display additional information of a first object corresponding to the first thumbnail information. The additional information may include type information of the object, generation time information of the object, information on a page including the object, the name of a document including the object, size information of the object, information on a relative position of the object in the corresponding handwritten content, a tag, and the like, but is not limited thereto.

Figure 24:
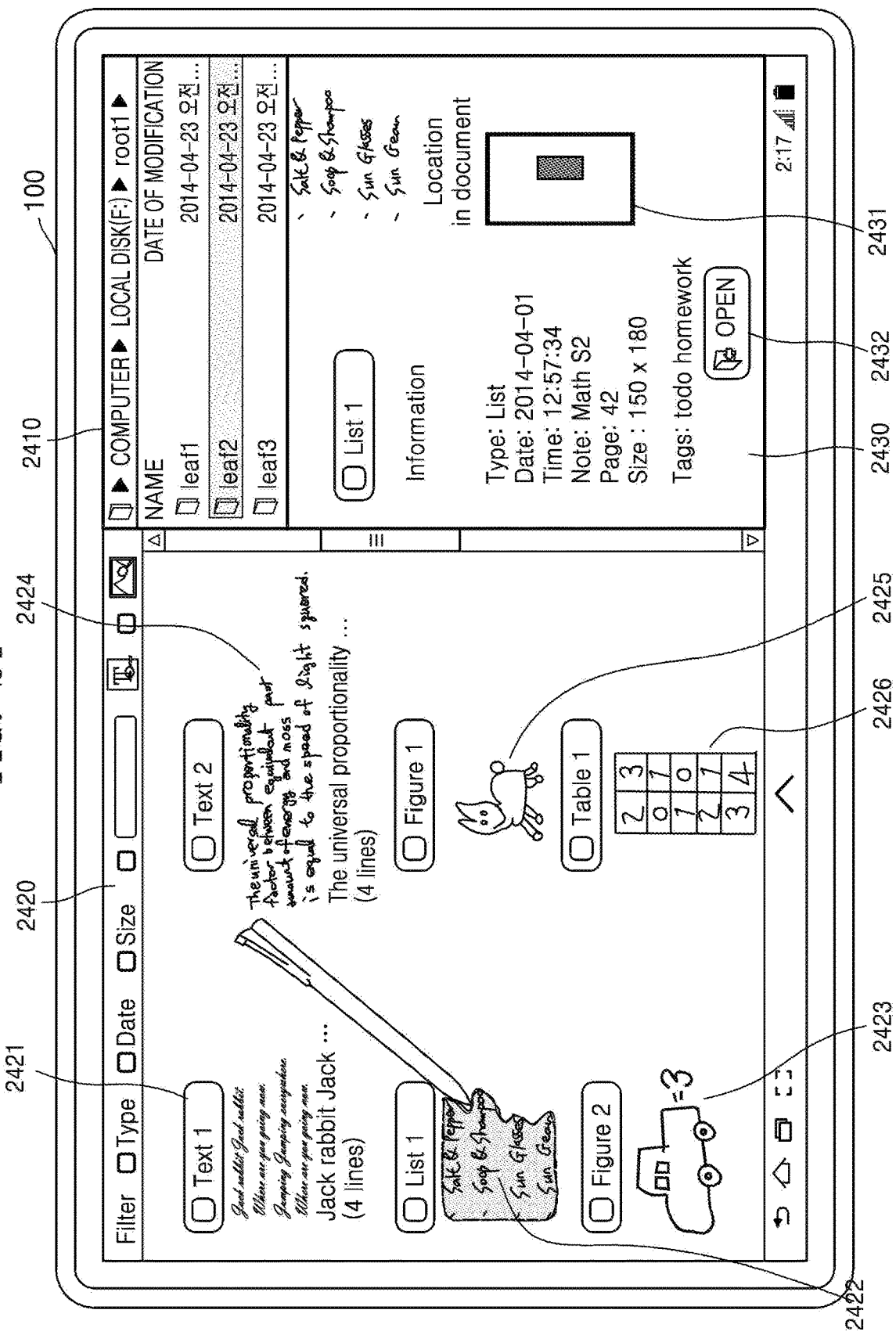
FIG. 24 illustrates displaying additional information of objects included in handwritten content in a device according to an embodiment of the present disclosure.

According to an embodiment of the present disclosure, the device 100 may display the additional information of the first object corresponding to the first thumbnail information near the first thumbnail information. In addition, the device 100 may display the additional information of the first object corresponding to the first thumbnail information in an area not overlapping an area in which the list of thumbnail information is displayed. With reference to FIG. 24, an operation of providing additional information of segmented objects in the device 100 will be described.

FIG. 24 illustrates displaying additional information of objects included in handwritten content in a device according to an embodiment of the present disclosure.

Referring to FIG. 24, the device 100 may display a folder list 2410 related to previously stored handwritten content. The device 100 may receive an input for selecting at least one folder from the folder list 2410. For example, the device 100 may receive an input for selecting a second folder. In this case, the device 100 may read handwritten content stored in the second folder. For example, the device 100 may read first handwritten content and second handwritten content stored in the second folder.

The device 100 may display a thumbnail information list 2420 of objects included in the respective read handwritten content on the screen. For example, the first handwritten content may include a first text object Text 1, a first list object List 1, and a second figure object FIG. 2, and the second handwritten content may include a second text object Text 2, a first figure object FIG. 1, and a first table object Table 1. In this case, the device 100 may display first thumbnail information 2421 corresponding to the first text object Text 1, second thumbnail information 2422 corresponding to the first list object List 1, third thumbnail information 2423 corresponding to the second figure object FIG. 2, fourth thumbnail information 2424 corresponding to the second text object Text 2, fifth thumbnail information 2425 corresponding to the first figure object FIG. 1, and sixth thumbnail information 2426 corresponding to the first table object Table 1 on the screen.

Meanwhile, the device 100 may receive an input for selecting the second thumbnail information 2422 from the thumbnail information list 2420. In this case, the device 100 may display additional information 2430 of the first list object List 1 corresponding to the second thumbnail information 2422 on the screen. For example, as the additional information 2430 of the first list object List 1, the device 100 may display type information (e.g., "Type: List") of the first list object List 1, generation time information (e.g., "Date: 2014 Apr. 1, Time: 12:57:34") of the first list object List 1, information (e.g., "Page: 42") on a page including the first list object List 1, the name (e.g., "Note: Math S2") of a document including the first list object List 1, size information (e.g., "Size: 150×180) of the first list object List 1, relative position information 2431 of the first list object List 1 in the first handwritten content, a tag (e.g., "Tags: to do homework").

The device 100 may also display an icon 2432 for reading the first handwritten content including the first list object List 1. According to an embodiment of the present disclosure, when the user selects (e.g., touches) the icon 2432, the device 100 may display the first handwritten content including the first list object List 1 on the screen.

According to an embodiment of the present disclosure, the device 100 provides a GUI including a list of thumbnail information and additional information of objects, thereby enabling the user to easily determine additional information of objects segmented in handwritten content.

Figure 25:
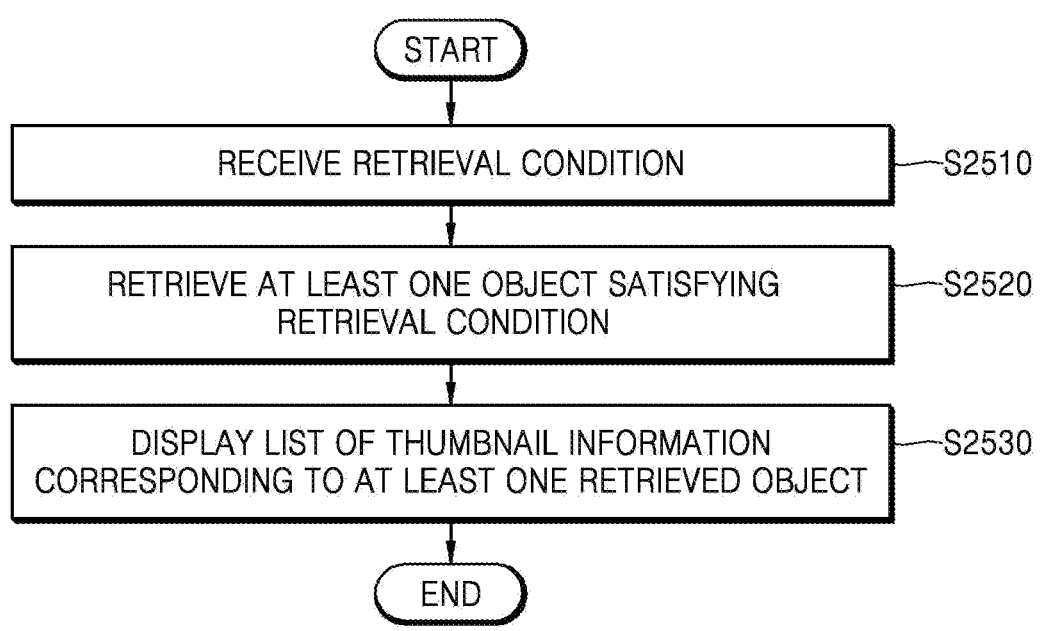
FIG. 25 is a flowchart illustrating a method of displaying a list of thumbnail information retrieved under a retrieval condition in a device according to an embodiment of the present disclosure.

FIG. 25 is a flowchart illustrating a method of displaying a list of thumbnail information retrieved under a retrieval condition in a device according to an embodiment of the present disclosure.

Referring to FIG. 25, in operation S2510, the device 100 may receive a retrieval condition for retrieving at least one piece of thumbnail information. For example, the device 100 may receive an input for selecting a category from among retrieval categories (e.g., an object type, an object generation date, an object size, and the like). The device 100 may also receive a retrieval word for limiting a retrieval range. The device 100 may also receive an input for selecting certain handwritten content.

In operation S2520, the device 100 may retrieve at least one object satisfying the retrieval condition.

According to an embodiment of the present disclosure, in response to an input for selecting a category from among retrieval categories, the device 100 may retrieve objects corresponding to the category. For example, the device 100 may receive an input for selecting an object generation date (e.g., "May 2014") from among retrieval categories. In this case, the device 100 may retrieve objects generated on May 2014.

According to an embodiment of the present disclosure, when a retrieval word for limiting a retrieval range is received, the device 100 may retrieve objects corresponding to the retrieval word. For example, when the retrieval word "automobile" is received, the device 100 may retrieve objects which include "automobile" in indexes, tags, document names, and the like.

According to an embodiment of the present disclosure, when an input for selecting certain handwritten content is received, the device 100 may retrieve objects segmented in the certain handwritten content.

Figure 26A:
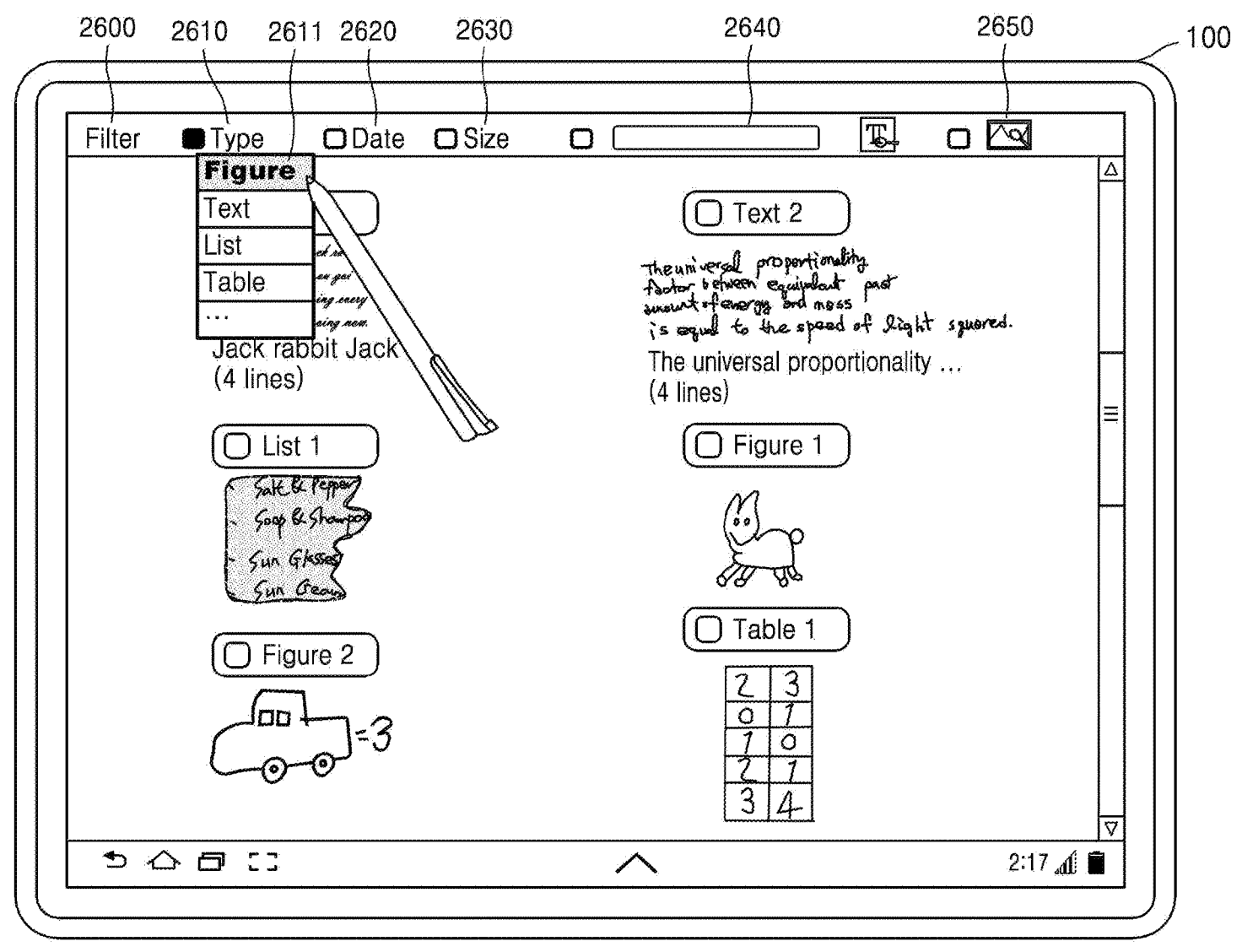
Figure 26B:
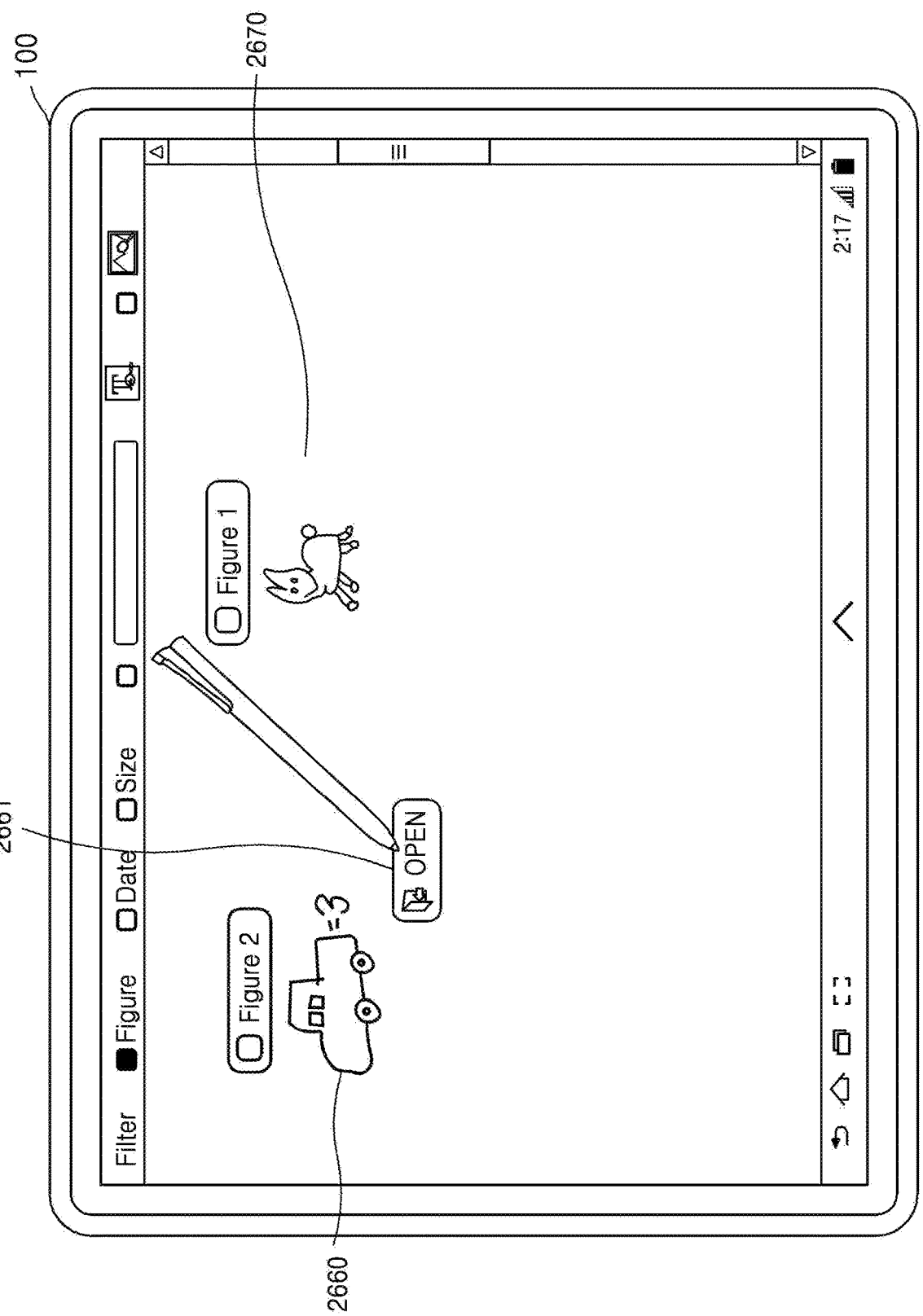
Figure 26C:
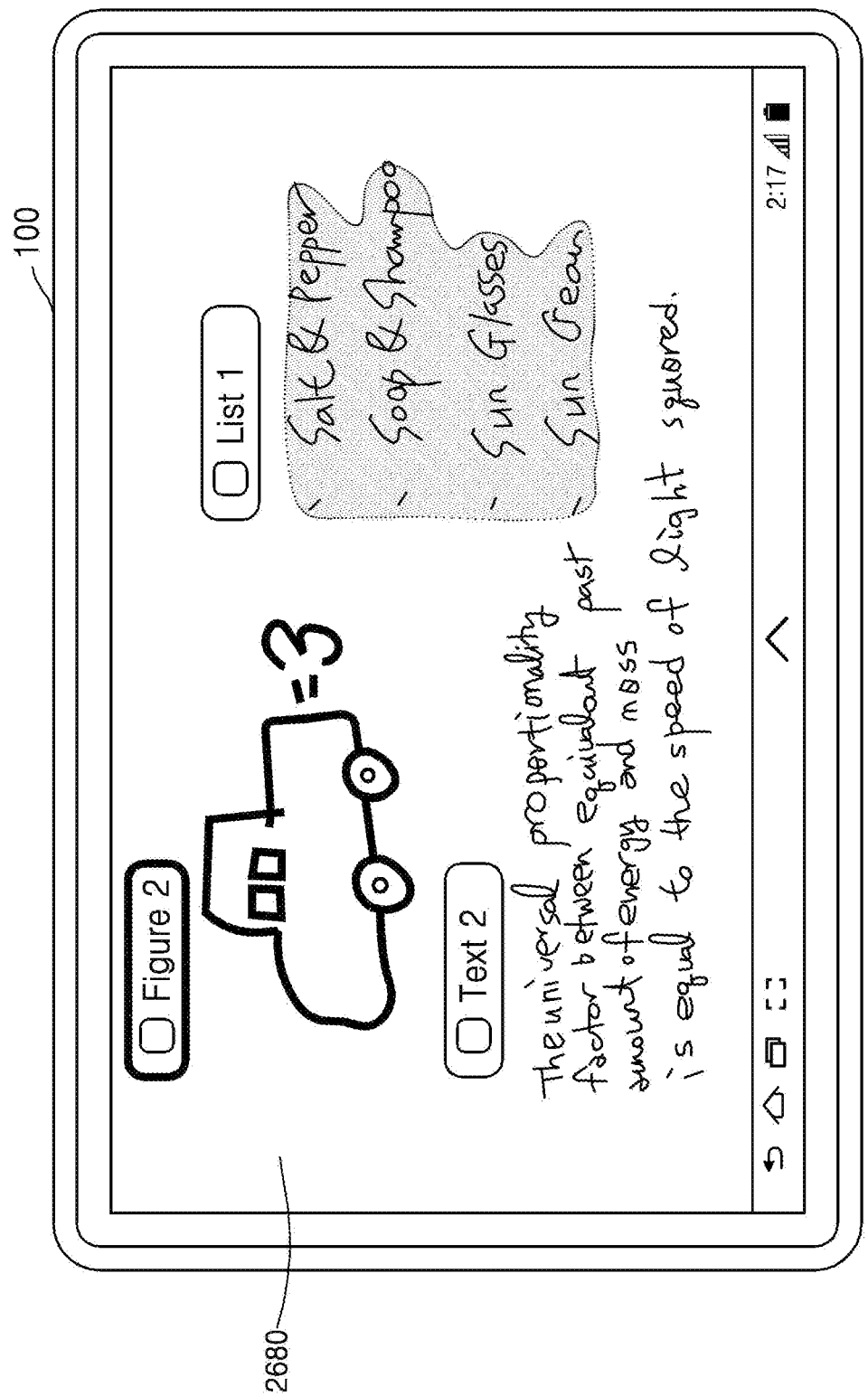

In operation S2530, the device 100 may display a list of thumbnail information corresponding to the at least one retrieved object. The device 100 may display the list of thumbnail information in a variety of forms. For example, the device 100 may arrange thumbnail information of objects included in the list of thumbnail information based on at least one of object type, object generation time, and object size. With reference to FIGS. 26A to 26C, an operation of displaying a list of thumbnail information retrieved under a retrieval condition in the device 100 will be further described below.

FIGS. 26A to 26C illustrate displaying a list of thumbnail information retrieved under a retrieval condition in a device according to an embodiment of the present disclosure.

Referring to FIG. 26A, the device 100 may provide a filter 2600 for selecting a retrieval condition. The filter 2600 may include a retrieval category including an object type 2610, an object generation date 2620, an object size 2630, and the like, an input window 2640 for inputting a retrieval word, and an icon 2650 for retrieving handwritten content, but is not limited thereto.

The device 100 may receive an input for selecting the object type 2610 in the filter 2600. At this time, the device 100 may display a list of types (e.g., Figure, Text, List, Table, and the like). The device 100 may receive an input for selecting "Figure" 2611 from the list of types. In this case, the device 100 may retrieve objects whose types are "Figure" 2611 among a plurality of objects.

Referring to FIG. 26B, the device 100 may retrieve a first figure object 2670 and a second figure object 2660 whose types are "Figure" 2611. At this time, the device 100 may display thumbnail information of the first figure object 2670 and thumbnail information of the second figure object 2660.

According to an embodiment of the present disclosure, the device 100 may also display an icon 2661 for opening handwritten content including the second figure object 2660. Here, the device 100 may receive an input of touching the icon 2661.

Referring to FIG. 26C, in response to the input of touching the icon 2661, the device 100 may read handwritten content 2680 including the second figure object 2660 and display the handwritten content 2680 on the screen.

Figure 27:
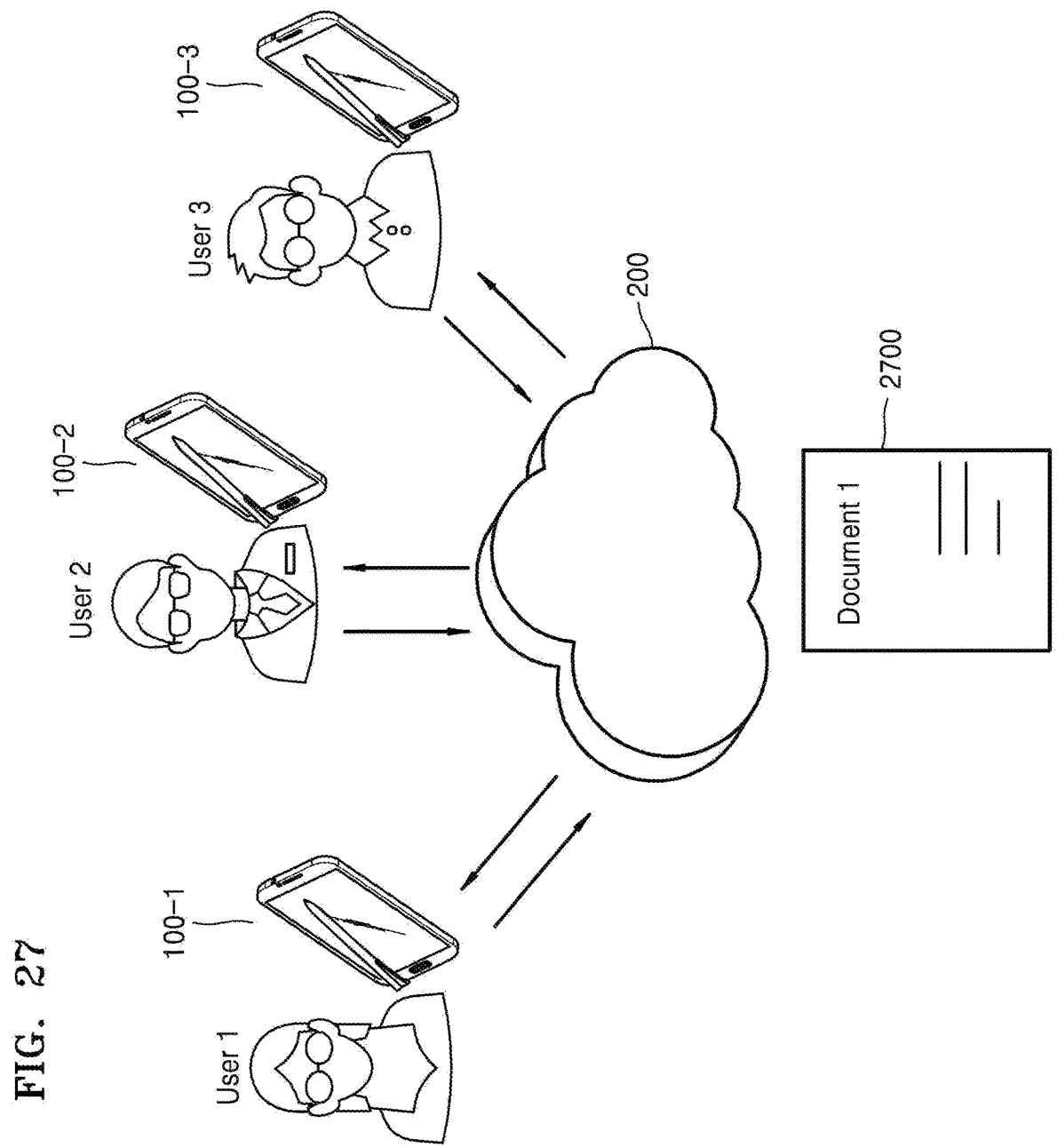
FIG. 27 is a diagram illustrating a system for sharing handwritten content according to an embodiment of the present disclosure.

FIG. 27 is a diagram illustrating a system for sharing handwritten content according to an embodiment of the present disclosure.

Referring to FIG. 27, a system for sharing handwritten content according to an embodiment of the present disclosure may include a plurality of devices (e.g., a first device 100-1, a second device 100-2, and a third device 100-3) and a server 200.

The respective plurality of devices (e.g., the first device 100-1, the second device 100-2, and the third device 100-3) may share handwritten content through the server 200. For example, the first device 100-1 may upload first handwritten content 2700 generated in the first device 100-1 to the server 200. At this time, according to an embodiment of the present disclosure, thumbnail information and/or additional information of objects segmented in the first handwritten content 2700 may also be uploaded to the server 200 together with the first handwritten content 2700. The second device 100-2 may access the server 200 and display information of the first handwritten content 2700. In addition, the second device 100-2 may download the first handwritten content 2700 from the server 200 according to a user request. At this time, together with the first handwritten content 2700, the second device 100-2 may also download the thumbnail information and/or the additional information of the objects segmented in the first handwritten content 2700.

The server 200 may manage handwritten content received from the respective plurality of devices (e.g., the first device 100-1, the second device 100-2, and the third device 100-3) according to the devices. At this time, the server 200 may match up handwritten content with thumbnail information and/or additional information of objects segmented in the handwritten content and manage the handwritten content together with the thumbnail information and/or the additional information.

According to an embodiment of the present disclosure, the server 200 may receive the thumbnail information and/or the additional information of objects segmented in handwritten content from the respective plurality of devices (e.g., the first device 100-1, the second device 100-2, and the third device 100-3), or may generate thumbnail information and/or additional information of the object by itself. For example, the server 200 may segment handwritten content in units of objects according to a certain segmentation level. Then, the server 200 may generate thumbnail information and additional information of objects segmented in the handwritten content.

Meanwhile, according to an embodiment of the present disclosure, access rights to handwritten content uploaded to the server 200 may be defined. For example, a first user of the first device 100-1 may grant access rights to a second user of the second device 100-2 while uploading the first handwritten content 2700 to the server 200. Here, when the second user accesses the server 200 through the second device 100-2, the second user may determine the first handwritten content 2700. However, a third user may not determine the first handwritten content 2700 even when accessing the server 200 through the third device 100-3. Handwritten content whose access rights are defined will be described below with reference to FIG. 28.

Figure 28:
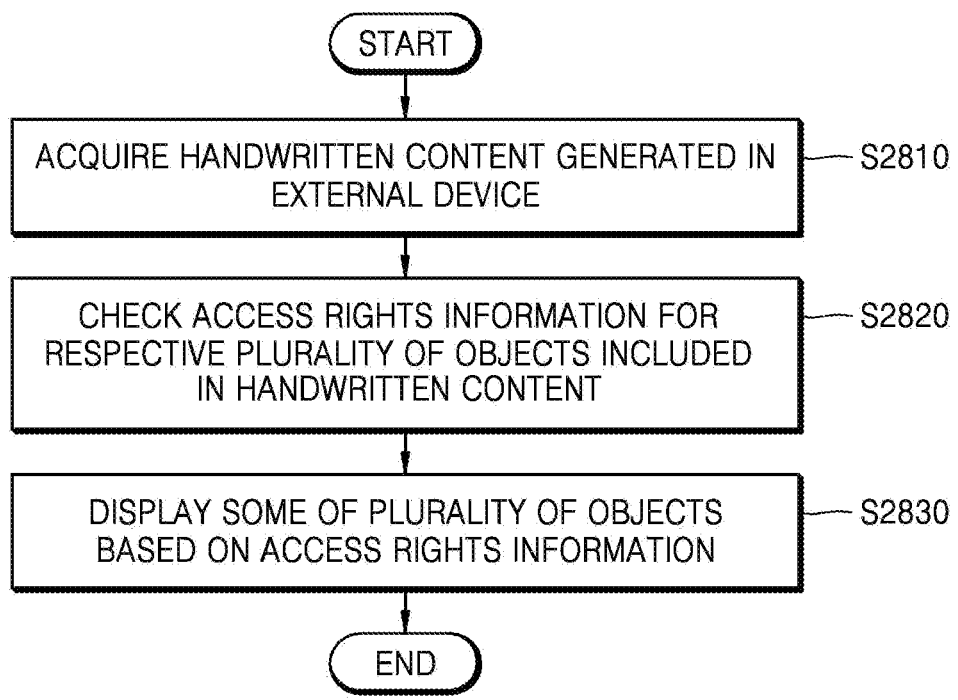
FIG. 28 is a flowchart illustrating a method of displaying some objects in a device based on access rights information according to an embodiment of the present disclosure.

FIG. 28 is a flowchart illustrating a method of displaying some objects in a device based on access rights information according to an embodiment of the present disclosure.

Referring to FIG. 28, in operation S2810, the device 100 may acquire handwritten content generated in an external device. For example, the device 100 may receive handwritten content generated in the external device through the server 200. In addition, the device 100 may receive handwritten content generated in the external device directly from the external device.

According to an embodiment of the present disclosure, the handwritten content generated in the external device may have been segmented into a plurality of objects (or a plurality of components) according to a certain segmentation level. At this time, according to an embodiment of the present disclosure, the device 100 may also acquire thumbnail information and/or additional information of the objects which have been segmented in the handwritten content generated in the external device.

In addition, according to an embodiment of the present disclosure, the device 100 may acquire access rights information for the handwritten content generated in the external device. The access rights information may be information in which access rights to the handwritten content or the respective objects segmented in the handwritten content are defined. For example, the access rights information may include identification information of a user or a device allowed to access the handwritten content (or the objects segmented in the handwritten content), and the like.

In operation S2820, the device 100 may determine access rights information for the respective plurality of objects included in the handwritten content. Here, the access rights information may be received from the external device or the server 200.

For example, the device 100 may determine whether identification information of the device 100 is included in a first list of devices allowed to access a first object included in the handwritten content. In addition, the device 100 may determine whether the identification information of the device 100 is included in a second list of devices allowed to access a second object included in the handwritten content.

Figure 29:
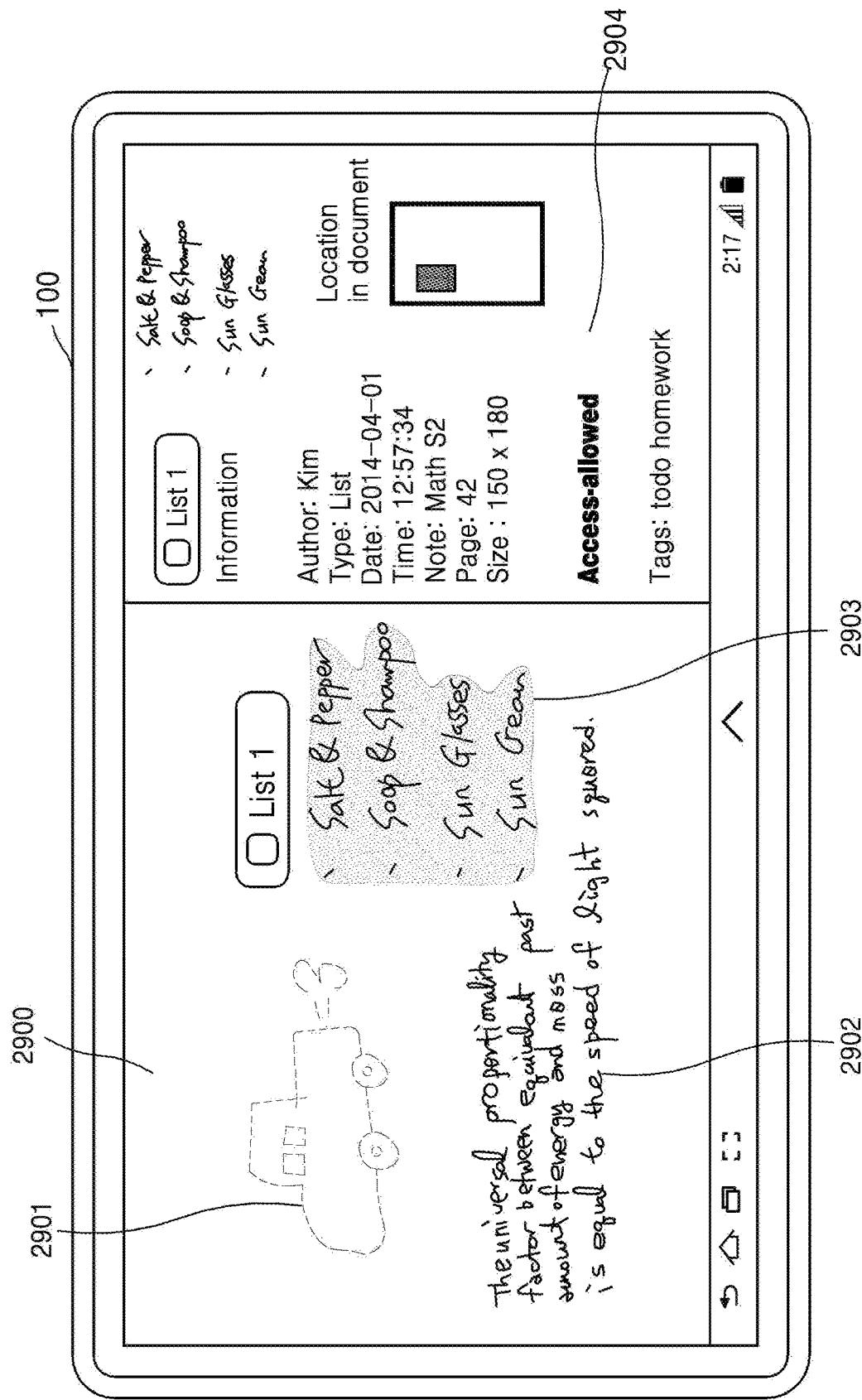
FIG. 29 illustrates displaying some objects in a device based on access rights information according to an embodiment of the present disclosure.

In operation S2830, the device 100 may display some of the plurality of objects based on the access rights information. For example, when results of determining the access rights information indicate that the device 100 has access rights to the first object and the second object among the plurality of objects and no access rights to a third object, the device 100 may display the first object and the second object on the screen, and may not display the third object on the screen. With reference to FIG. 29, an operation of displaying handwritten content whose access rights have been defined in the device 100 will be described.

FIG. 29 illustrates displaying some objects in a device based on access rights information according to an embodiment of the present disclosure.

Referring to FIG. 29, the device 100 may acquire handwritten content 2900 including a first object 2901, a second object 2902, and a third object 2903. At this time, the first object 2901 may have been set to "non-public," and the second object 2902 and the third object 2903 may have been set to "public."

The device 100 may determine access rights information for each of the first object 2901, the second object 2902, and the third object 2903 included in the handwritten content 2900. When results of determining the access rights information for the first object 2901 indicate that the device 100 has no access rights to the first object 2901, the device 100 may not display the first object 2901 on the screen. On the other hand, when results of determining the access rights information for the second object 2902 and the third object 2903 indicate that the device 100 has access rights to the second object 2902 and the third object 2903, the device 100 may display the second object 2902 and the third object 2903 on the screen.

Meanwhile, when the user selects (e.g., touches) the third object 2903 displayed on the screen, the device 100 may display additional information of the third object 2903 on the screen. At this time, the device 100 may display access rights information (e.g., "Access-allowed: Public") 2904 for the third object 2903 as well.

Figure 30:
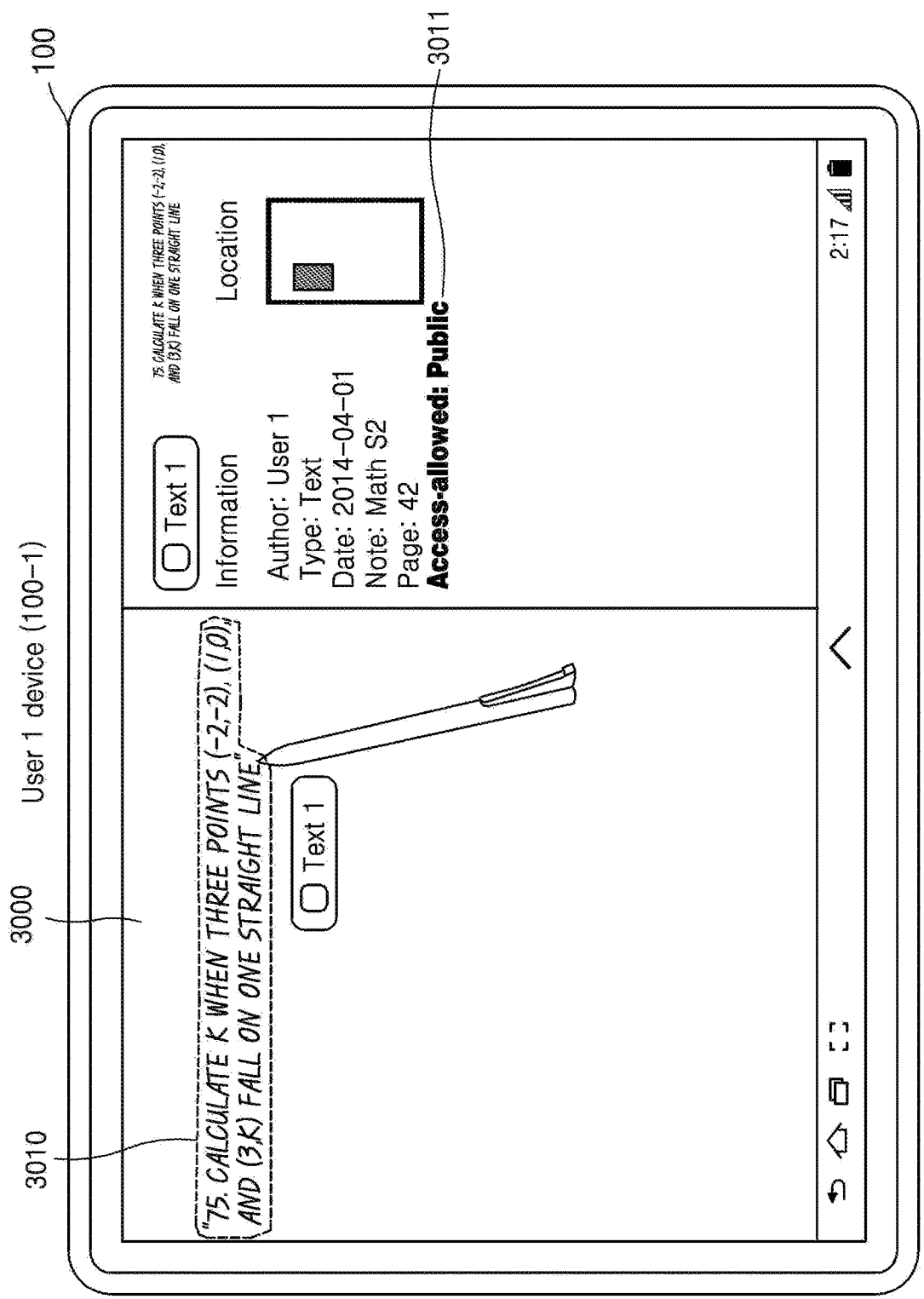
FIGS. 30 and 31 illustrate setting access rights to an object in a device according to an embodiment of the present disclosure.
Figure 31:
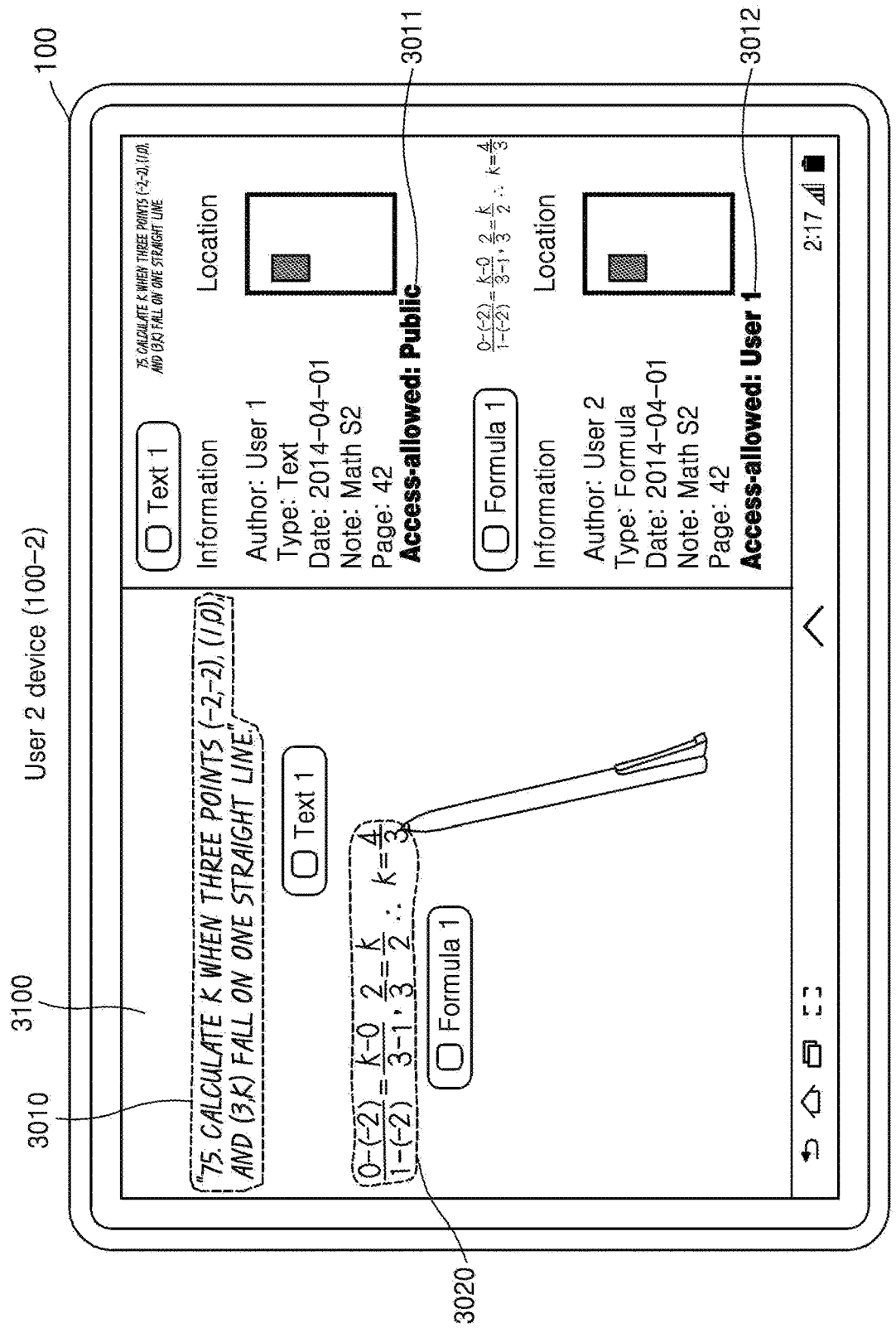
Figure 32:
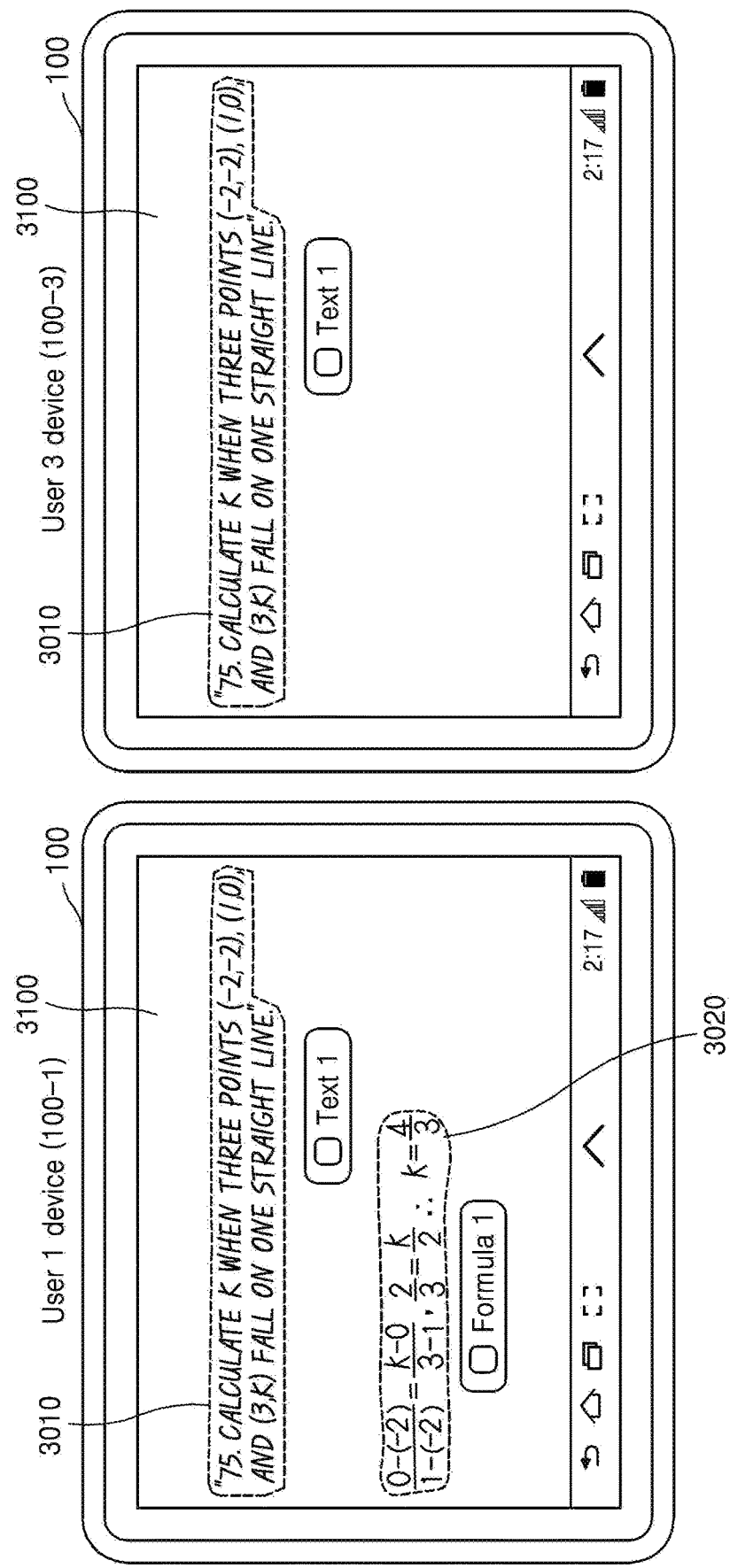
FIG. 32 illustrates displaying some objects in a first device and a third device based on access rights information according to an embodiment of the present disclosure.

FIGS. 30 and 31 illustrate setting access rights to an object in a device according to an embodiment of the present disclosure. FIG. 32 illustrates displaying some objects in a first device and a third device based on access rights information according to an embodiment of the present disclosure.

Referring to FIGS. 30 to 32, a case in which the first device 100-1 is a teacher's device, and the second device 100-2 and the third device 100-3 are students' devices will be described as an example.

Referring to FIG. 30, the first device 100-1 may generate first handwritten content 3000 including a first object (e.g., a mathematical problem) 3010 based on an analog handwritten input of the first user. Then, the first device 100-1 may receive an input for defining access rights 3011 to the first object 3010 from the first user. For example, the first user may make a setting (e.g., "Access-allowed: Public") so that all devices may access the first object 3010. In addition, the first device 100-1 may generate first thumbnail information and first additional information of the first object 3010. At this time, the first device 100-1 may match up the first object 3010 with the first thumbnail information and the first additional information.

The first device 100-1 may transmit (upload) the first handwritten content 3000 including the first object 3010 to the server 200. At this time, the first device 100-1 may transmit information in which the access rights 3011 to the first object 3010 have been defined, the first thumbnail information of the first object 3010, and the first additional information of the first object 3010 to the server 200 together with the first handwritten content 3000.

Referring to FIG. 31, the second user (student) may determine the first handwritten content 3000 uploaded to the server 200 by the first device 100-1, and download the first handwritten content 3000 to the second device 100-2. In this case, the second device 100-2 may receive the first handwritten content 3000 from the server 200. Then, the second device 100-2 may display the first handwritten content 3000 on the screen based on access rights information for the first object 3010 included in the first handwritten content 3000.

For example, since results of determining the access rights 3011 to the first object 3010 included in the first handwritten content 3000 by the second device 100-2 indicate that the first object 3010 is accessible by all devices, the second device 100-2 may display the first handwritten content 3000 including the first object 3010 on the screen.

Meanwhile, the second device 100-2 may receive a handwritten input for adding a second object (e.g., a solution to the mathematical problem) 3020 to the first handwritten content 3000 from the second user (student). The second device 100-2 may also receive an input for setting access rights 3012 to the second object 3020. For example, the second user may set the access rights 3012 to the second object 3020 so that the second object 3020 is determined in the first device 100-1 of the first user (teacher). At this time, the access rights 3012 to the second object 3020 may be defined as "Access-allowed: User 1."

The second device 100-2 may generate second handwritten content 3100 by adding the second object 3020 to the first handwritten content 3000 generated in the first device 100-1. Then, the second device 100-2 may upload the second handwritten content 3100 to the server 200. The second device 100-2 may also transmit information in which the access rights 3012 to the second object 3020 have been defined, second thumbnail information of the second object 3020, and second additional information of the second object 3020 to the server 200.

According to an embodiment of the present disclosure, the second device 100-2 may transmit notification information indicating that the second handwritten content 3100 obtained by modifying the first handwritten content 3000 has been uploaded to the server 200 to the first device 100-1. In addition, the server 200 may transmit notification information indicating that the second handwritten content 3100 obtained by modifying the first handwritten content 3000 has been uploaded to the first device 100-1.

Referring to FIG. 32, the first device 100-1 may receive the second handwritten content 3100 which has been uploaded to the server 200. Then, the first device 100-1 may display the second handwritten content 3100 on the screen based on access rights information for the first object 3010 and the second object 3020 included in the second handwritten content 3100.

When the first object 3010 is accessible by all devices (Access-allowed: Public) and the second object 3020 is accessible by the first device 100-1 (Access-allowed: User 1), the first device 100-1 may display the first object 3010 and the second object 3020 on the screen.

Meanwhile, the third device 100-3 may also receive the second handwritten content 3100 which has been uploaded to the server 200. Then, the third device 100-3 may also display the second handwritten content 3100 on the screen based on the access rights information for the first object 3010 and the second object 3020 included in the second handwritten content 3100.

When the first object 3010 is accessible by all devices (Access-allowed: Public) and the second object 3020 is accessible by the first device 100-1 (Access-allowed: User 1), the third device 100-3 may not display the second object 3020 and may display the first object 3010 on the screen.

Figure 33:
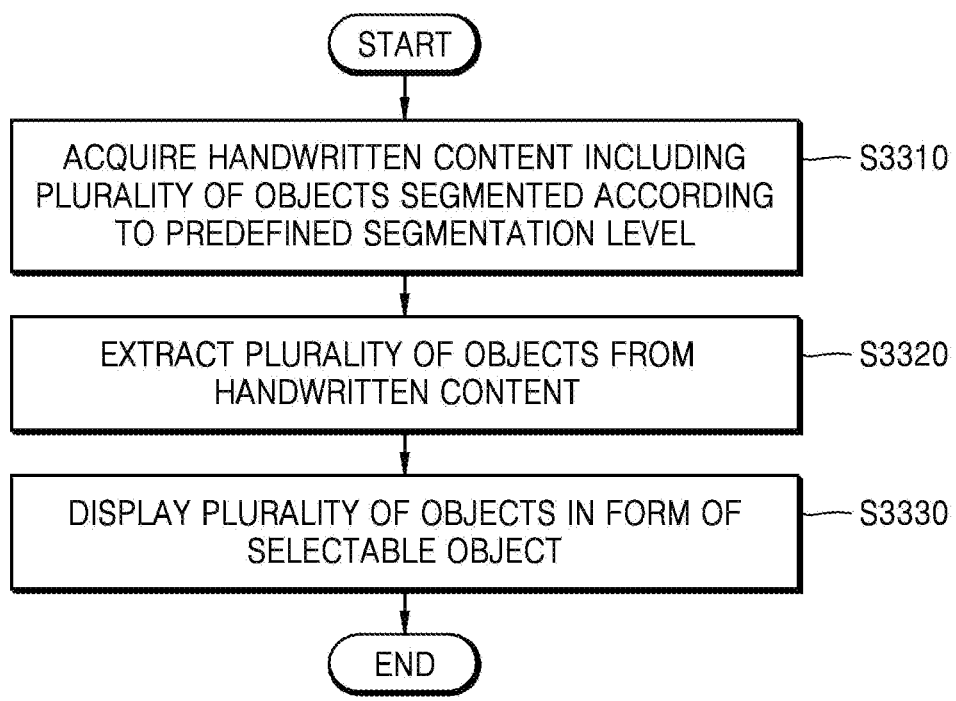
FIG. 33 is a flowchart illustrating a method of providing handwritten content in a device according to an embodiment of the present disclosure.

FIG. 33 is a flowchart illustrating a method of providing handwritten content in a device according to an embodiment of the present disclosure.

Referring to FIG. 33, in operation S3310, the device 100 may acquire handwritten content including a plurality of objects which have been segmented according to a certain segmentation level. Segmentation levels denote units (degrees) for segmenting handwritten content, and the certain segmentation level may be "document," "text/non-text," "text/figure/list/table," "paragraph," "text-line," "word," "character," "stroke," and the like, but is not limited thereto.

According to an embodiment of the present disclosure, the device 100 may acquire information on the respective plurality of objects which have been segmented according to the certain segmentation level. Information on the respective segmented plurality of objects may include at least one of identification information, thumbnail information, and additional information, but is not limited thereto.

In operation S3320, the device may extract the plurality of objects from the handwritten content. For example, the device 100 may extract the plurality of objects from the handwritten content. For example, the device 100 may extract the plurality of objects from the handwritten content based on at least one of identification information, additional information, and thumbnail information of the respective segmented plurality of objects.

In operation S3330, the device 100 may display the plurality of objects in the form of a selectable object. For example, when the user places a cursor, a pointer, or the touch tool on a first object, the device 100 may display handwritten content so that strokes constituting the first object are simultaneously selected.

According to an embodiment of the present disclosure, the device 100 may express the plurality of objects in different ways. For example, the device 100 may express strokes included in the first object in blue, strokes included in a second object in yellow, and strokes included in a third object in red.

In addition, the device 100 may express the strokes included in the first object with solid lines, the strokes included in the second object with dotted lines, and the strokes included in the third object with alternate long and short dashed lines.

According to an embodiment of the present disclosure, the device 100 may cause thicknesses, font types, shadings, or patterns of the respective plurality of objects to be different from each other or display boundary lines around the respective plurality of objects, but a method of differently expressing the plurality of objects is not limited thereto.

According to an embodiment of the present disclosure, the device 100 may display labels indicating the object types of the respective plurality of objects on the handwritten content. For example, when the type of the first object is determined to be text, the device 100 may display the label "Text 1" near the first object.

According to an embodiment of the present disclosure, the device 100 may receive an input for selecting at least one object from among the plurality of objects. At this time, the device 100 may display an image for identifying the at least one selected object on the handwritten content. For example, the device 100 may change the color or the thickness of the at least one selected object, display a boundary line around the at least one selected object, or determine a box included in an object label.

Meanwhile, according to an embodiment of the present disclosure, the device 100 may switch the operation mode from the pen mode to the edit mode based on a set input. For example, when an input for selecting at least one object from among the plurality of objects for a set time or longer is received, the device 100 may set the operation mode to the edit mode.

Meanwhile, according to an embodiment of the present disclosure, the device 100 may display the handwritten content including the plurality of objects in a first area of the screen, and display a list of thumbnail information corresponding to the respective plurality of objects in a second area of the screen.

Figure 34:
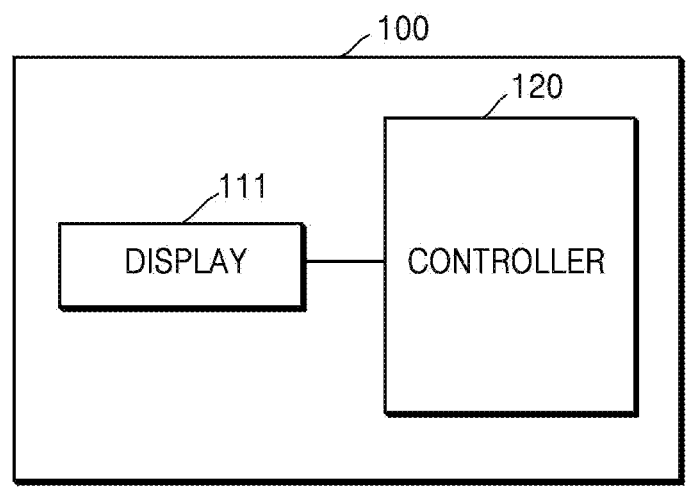
FIGS. 34 and 35 are block diagrams illustrating a constitution of a device according to an embodiment of the present disclosure.
Figure 35:
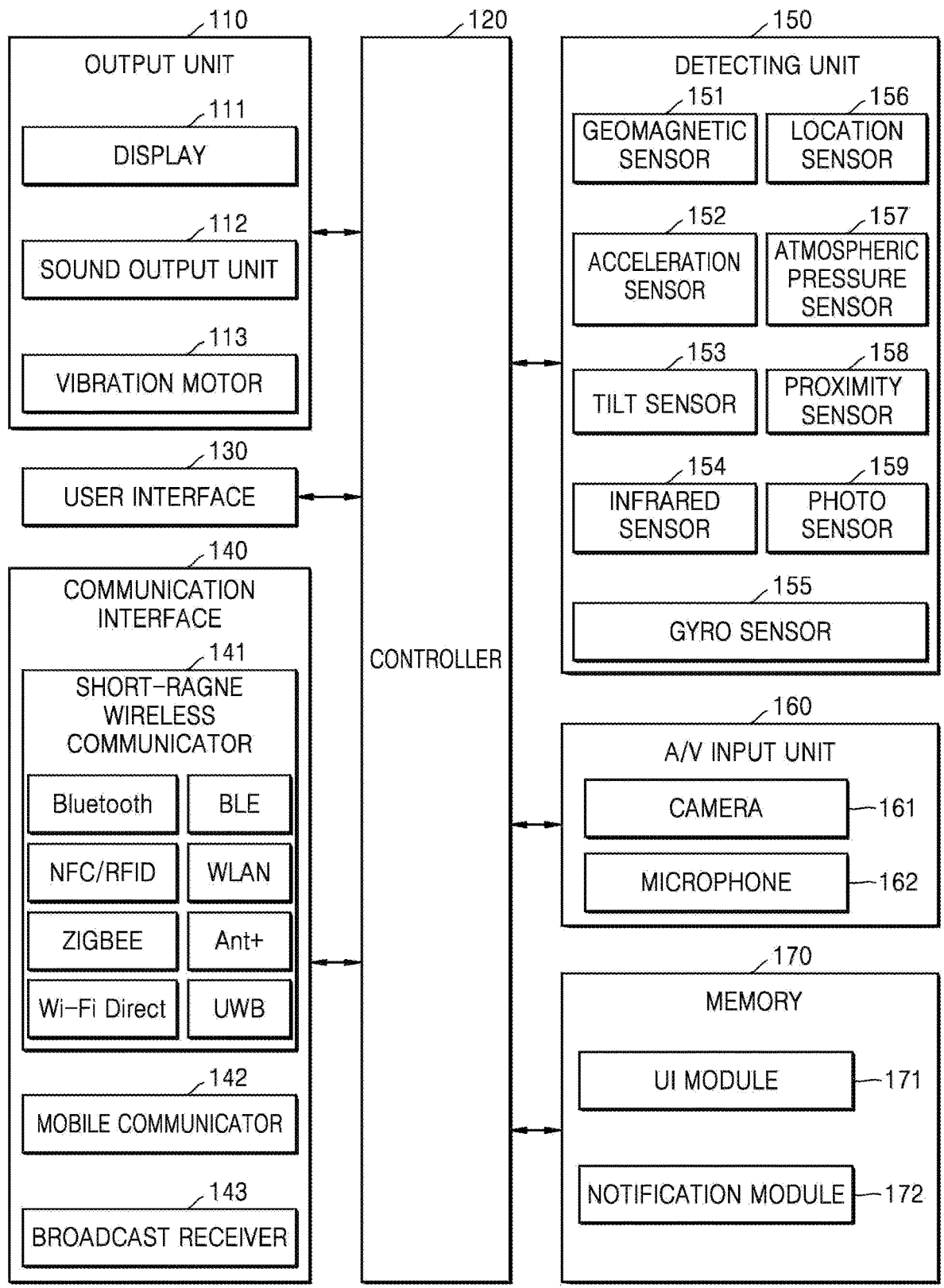

FIGS. 34 and 35 are block diagrams illustrating a constitution of a device according to an embodiment of the present disclosure.

Referring to FIG. 34, the device 100 according to an embodiment of the present disclosure may include a display 111 and a controller 120. However, not all components shown in the drawing are essential components. The device 100 may be implemented by more or less components than shown in the drawing.

For example, referring to FIG. 35, the device 100 according to an embodiment of the present disclosure may include an output unit 110, a controller 120, a user interface 130, a communication interface 140, a detecting unit 150, an audio/video (A/V) input unit 160, and a memory 170.

The components will be described in sequence below.

The output unit 110 is used to output an audio signal, a video signal, or a vibration signal, and may include a display 111, a sound output unit 112, a vibration motor 113, and the like.

The display 111 may display information processed in the device 100. For example, the display 111 may display handwritten content including a plurality of objects which have been processed in the form of a selectable object. The plurality of objects may include at least one of a figure object, a text object, a list object, a table object, and a formula object, but is not limited thereto.

The display 111 may display an image for identifying at least one selected object on handwritten content. The display 111 may also display labels indicating the object types of the respective plurality of objects on the handwritten content.

The display 111 may display the handwritten content in a first area of the screen, and display a list of thumbnail information corresponding to the respective plurality of objects in a second area of the screen. In addition, the display 111 may display a list of thumbnail information corresponding to objects included in a plurality of pieces of handwritten content. In addition, the display 111 may display additional information of a first object corresponding to first thumbnail information selected by the user.

Meanwhile, when the display 111 and a touchpad are layered to constitute a touch screen, the display 111 may be used as an input device as well as an output device.

The touch screen may be configured to detect not only a touch input position and a touched area but also a touch input pressure. In addition, the touch screen may be configured to detect a proximity touch (e.g., a hovering input) as well as a real touch.

The display 111 may include at least one of a liquid crystal display (LCD), a thin film transistor-LCD (TFT LCD), an organic light-emitting diode (OLED) display, a flexible display, a three-dimensional (3D) display, and an electrophoretic display. According to an implementation form of the device 100, the device 100 may include at least two displays 111.

The sound output unit 112 outputs audio data received from the communication interface 140 or stored in the memory 170. In addition, the sound output unit 112 outputs a sound signal (e.g., a call signal reception sound, a message reception sound, and a notification sound) related to a function performed by the device 100. The sound output unit 112 may include a speaker, a buzzer, and the like.

The vibration motor 113 may output a vibration signal. For example, the vibration motor 113 may output a vibration signal corresponding to an output of audio data (e.g., a call signal reception sound and a message reception sound) or video data. In addition, the vibration motor 113 may output a vibration signal when a touch is input to the touch screen.

In general, the controller 120 may control the overall operation of the device 100. The controller 120 may generally control the output unit 110, the user interface 130, the communication interface 140, the detecting unit 150, the A/V input unit 160, and the like, by executing programs stored in the memory 170.

The controller 120 may acquire handwritten content, and segment the handwritten content into a plurality of objects by grouping strokes included in the handwritten content. The controller 120 may process the respective plurality of objects in the form of a selectable object.

Based on a user input, the controller 120 may switch the operation mode to the edit mode for editing at least one object among the plurality of objects. In the edit mode, the controller 120 may provide a GUI for adjusting a segmentation level and change the segmentation level of the handwritten content according to a position of an adjustment button included in the GUI.

When an input for moving the first object among the plurality of objects is input in the edit mode, the controller 120 may determine whether a second object among the plurality of objects and the moved first object overlap. When the second object and the moved first object overlap, the controller 120 may displace the second object a certain distance apart from the first object.

The controller 120 may determine whether an input area in which a new handwritten input is received and the plurality of objects included in the handwritten content overlap, and displace at least one object overlapping the input area a certain distance apart from the input area.

Based on a certain template, the controller 120 may change the arrangement of the plurality of objects included in the handwritten content. The controller 120 may generate a plurality of pieces of thumbnail information corresponding to the plurality of objects, match up the plurality of pieces of thumbnail information and additional information of the plurality of objects, and store the matched thumbnail information and additional information in a memory.

The controller 120 may retrieve at least one object satisfying a retrieval condition, and control the display 111 to display a list of thumbnail information corresponding to the at least one retrieved object.

The controller 120 may determine access rights information for the respective plurality of objects included in the handwritten content, and control the display 111 to display some of the plurality of objects based on the access rights information.

The user interface 130 denotes a unit to which the user inputs data for controlling the device 100. For example, the user interface 130 may be a key pad, a dome switch, a touchpad (a capacitive overlay touchpad, a resistive overlay touchpad, an infrared beam touchpad, a surface acoustic wave touchpad, an integral strain gauge touchpad, a piezoelectric effect touchpad, and the like), a jog wheel, a jog switch, and the like, but is not limited thereto.

The user interface 130 may receive an input for selecting at least one object from among the plurality of objects for a set time or longer. In the edit mode, the user interface 130 may receive an input for moving the first object among the plurality of objects.

The user interface 130 may receive a new handwritten input on the handwritten content. The user interface 130 may receive an input for selecting first thumbnail information from a list. The user interface 130 may also receive a retrieval condition.

The communication interface 140 may include at least one component which enable communication between the device 100 and the server 200 or between the device 100 and a wearable device. For example, the communication interface 140 may include a short-range wireless communicator 141, a mobile communicator 142, and a broadcast receiver 143.

The short-range wireless communicator 141 may include a Bluetooth communicator, a Bluetooth low energy (BLE) communicator, a near field communication (NFC) unit, a wireless local area network (WLAN), wireless fidelity (Wi-Fi) communicator, a ZigBee communicator, a Wi-Fi direct (WFD) communicator, an ultra-wideband (UWB) communicator, an Ant+ communicator, and the like, but is not limited thereto.

The mobile communicator 142 exchanges wireless signals with at least one of a base station, an external terminal, and a server in a mobile communication network. Here, the wireless signals may include voice call signals, video call signals, or various types of data resulting from transmission and reception of text/multimedia messages.

The broadcast receiver 143 receives a broadcasting signal and/or broadcast-related information from the outside of the device 100 through a broadcasting channel. The broadcasting channel may include a satellite channel or a terrestrial channel. According to an implemented example, the device 100 may not include the broadcast receiver 143.

The communication interface 140 may receive handwritten content from the server 200. In addition, the communication interface 140 may transmit handwritten content generated in the device 100 to the server 200 or an external device. At this time, the device 100 may transmit thumbnail information and/or additional information corresponding to a plurality of objects segmented in the handwritten content to the server 200.

The detecting unit 150 may detect a state of the device 100, a state of the surroundings of the device 100, a state of the user who wears the device 100, and the like, and deliver information on the detected state to the controller 120.

The detecting unit 150 may include at least one of a geomagnetic sensor 151, an acceleration sensor 152, a tilt sensor 153, an infrared sensor 154, a gyro sensor 155, a location sensor (e.g., a global positioning system (GPS)) 156, an atmospheric pressure sensor 157, a proximity sensor 158, and a photosensor 159, but is not limited thereto. The detecting unit 150 may include a temperature sensor, an illumination sensor, a pressure sensor, an iris recognition sensor, and the like. Since functions of the respective sensors may be intuitively inferred from names thereof by those of ordinary skill in the art, detailed descriptions thereof will be omitted.

The A/V input unit 160 is used to input a video signal or an audio signal, and may include a camera 161, a microphone 162, and the like. The camera 161 may obtain a video frame, such as a still image, a moving image, and the like, in a video call mode or an image capturing mode. The video frame captured through the camera 161 may be processed by the controller 120 or a separate image processor (not shown).

The processed video frame may be stored in the memory 170 or transmitted to the outside through the communication interface 140. The camera 161 may be at least two in number according to a constitution of the device 100.

The microphone 162 receives a sound signal from the outside and processes the received sound signal into electrical voice data. For example, the microphone 162 may receive a sound signal from an external device or a speaker. The microphone 162 may use various noise removal algorithms for removing noise which is generated in the process of receiving a sound signal from the outside.

The memory 170 may store programs for processing and controlling by the controller 120, and store input/output data (e.g., applications, handwritten content, segmentation level information, and the like).

The memory 170 may include at least one type of storage medium among a flash memory type memory, a hard disk type memory, a multimedia card micro type memory, a card type memory (e.g., a secure digital (SD) memory, an extreme digital (XD) memory, and the like), a random access memory (RAM), a static RAM (SRAM), a read-only memory (ROM), a programmable ROM (PROM), an electrically erasable PROM (EEPROM), a magnetic memory, a magnetic disk, and an optical disc. In addition, the device 100 may run a web storage which performs a storage function of the memory 170 over the Internet.

The programs stored in the memory 170 may be classified into a plurality of modules according to functions thereof, for example, a user interface (UI) module 171, a notification module 172, and the like.

The UI module 171 may provide a specialized UI, a GUI, and the like, operated in conjunction with the device 100 according to applications. The notification module 172 may generate a signal for providing a notification that an event of the device 100 has occurred. The notification module 172 may output a notification signal in the form of a video signal through the display 111, output a notification signal in the form of an audio signal through the sound output unit 112, and output a notification signal in the form of a vibration signal through the vibration motor 113.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

According to an embodiment of the present disclosure, the device 100 segments handwritten content into a plurality of objects according to a certain segmentation level and provides the plurality of objects in the form of a selectable object, thereby enabling the user to easily select, edit, or retrieve an object in the handwritten content.

It should be understood that various embodiments of the present disclosure described herein should be considered in a descriptive detect and not for purposes of limitation. Descriptions of features or aspects within each embodiment of the present disclosure should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device comprising:
a display; and
at least one processor configured to:
control to display handwritten content on the display,
control to display, on the display, a scroll bar with a moving element indicating a segmentation level, the scroll bar being displayed to overlap the handwritten content based on a first input received on the displayed handwritten content, wherein the segmentation level indicates units for segmenting the handwritten content,
identify the segmentation level of the handwritten content based on an adjustment associated with the moving element of the scroll bar,
segment the displayed handwritten content into a plurality of objects by grouping strokes included in the handwritten content based on the identified segmentation level,
process each of the plurality of objects into selectable objects,
identify one object type of a plurality of object types corresponding to each of the selectable objects of the handwritten content based on a pattern of the strokes included in each of the selectable objects of the handwritten content, and
control to display, on the display, a list of the selectable objects and labels respectively indicating the identified object type corresponding to each of the selectable objects of the handwritten content,
wherein each of the selectable objects is part of the handwritten content and each of the identified object type is one of the plurality of object types of the handwritten content.

2. The device of claim 1, wherein the plurality of objects comprises at least one of a figure object, a text object, a list object, a table object, or a formula object.

3. The device of claim 1, further comprising a user interface configured to receive the first input to select at least one object from among the plurality of objects,
wherein the display is further configured to display an image for identifying the at least one selected object on the handwritten content.

4. The device of claim 1, further comprising a user interface configured to receive, for a set time or longer, the first input to select at least one object from among the plurality of objects,
wherein the at least one processor is further configured to switch an operation mode to an edit mode for editing the at least one object, based on the first input.

5. The device of claim 4,
wherein the user interface is further configured to receive a second input for moving a first object from among the plurality of objects in the edit mode, and
wherein the at least one processor is further configured to:
determine whether a second object from among the plurality of objects and the moved first object overlap, and
displace the second object a certain distance apart from the first object when the second object and the moved first object overlap.

6. The device of claim 1, further comprising a user interface configured to receive a new handwritten input on the handwritten content,
wherein the at least one processor is further configured to:
determine whether an input area in which the new handwritten input is received and the plurality of objects included in the handwritten content overlap, and
displace at least one object overlapping the input area a certain distance apart from the input area.

7. The device of claim 1, wherein the at least one processor is further configured to change an arrangement of the plurality of objects included in the handwritten content, based on a certain template.

8. The device of claim 1, wherein the at least one processor is further configured to:
generate a plurality of pieces of thumbnail information corresponding to the plurality of objects,
match up the plurality of pieces of thumbnail information to additional information of the plurality of objects, and
store the matched thumbnail information and additional information in a memory.

9. The device of claim 1, wherein the display is further configured to:
display the handwritten content in a first area of a screen, and
display a list of thumbnail information corresponding to the respective plurality of objects in a second area of the screen.

10. The device of claim 1, further comprising a user interface configured to receive a third input to select a plurality of pieces of handwritten content,
wherein the display is further configured to display a list of thumbnail information corresponding to objects included in the plurality of pieces of handwritten content.

11. The device of claim 10,
wherein the user interface is further configured to receive a fourth input to select first thumbnail information from the list, and
wherein the display is further configured to display additional information of a first object corresponding to the first thumbnail information.

12. The device of claim 10,
wherein the user interface is further configured to receive a fourth input for selecting first thumbnail information from the list, and
wherein the at least one processor is further configured to:
retrieve a first piece of handwritten content including a first object corresponding to the selected first thumbnail information from among the plurality of pieces of handwritten content, and
control the display to display the retrieved first piece of handwritten content.

13. The device of claim 10,
wherein the user interface is further configured to receive a retrieval condition, and
wherein the at least one processor is further configured to:
retrieve at least one object satisfying the retrieval condition, and
control the display to display a list of thumbnail information corresponding to the at least one retrieved object.

14. The device of claim 1, wherein the at least one processor is further configured to:
determine access rights information for the respective plurality of objects included in the handwritten content, and
control the display to display some of the plurality of objects based on the access rights information.

15. A method of providing handwritten content in a device, the method comprising:
- displaying handwritten content on a screen;
- displaying a scroll bar with a moving element indicating a segmentation level, the scroll bar being displayed to overlap the handwritten content based on a first input received on the displayed handwritten content, wherein the segmentation level indicates units for segmenting the handwritten content;
- identifying the segmentation level of the handwritten content based on an adjustment associated with the moving element of the scroll bar;
- segmenting the displayed handwritten content into a plurality of objects by grouping strokes included in the handwritten content based on the identified segmentation level;
- processing each of the plurality of objects into selectable objects;
- identifying one object type of a plurality of object types corresponding to each of the selectable objects of the handwritten content based on a pattern of the strokes included in each of the selectable objects of the handwritten content;
- displaying a list of the selectable objects, on the screen; and
- displaying labels respectively indicating the identified object type corresponding to each of the selectable objects of the handwritten content
- wherein each of the selectable objects is part of the handwritten content and each of the identified object type is one of the plurality of object types of the handwritten content.

16. The method of claim 15, further comprising:
- receiving the first input to select at least one object from among the plurality of objects; and
- displaying an image for identifying the at least one selected object on the handwritten content.

17. The method of claim 15, further comprising:
- receiving the first input to select at least one object from among the plurality of objects for a set time or longer; and
- switching an operation mode to an edit mode for editing the at least one object based on the first input.

18. The method of claim 17, wherein the switching of the operation mode to the edit mode comprises:
- receiving a second input for moving a first object from among the plurality of objects;
- determining whether a second object from among the plurality of objects and the moved first object overlap; and
- displacing the second object a certain distance apart from the first object when the second object and the moved first object overlap.

19. The method of claim 15, further comprising:
- receiving a new handwritten input on the handwritten content;
- determining whether an input area in which the new handwritten input is received and the plurality of objects included in the handwritten content overlap; and
- displacing at least one object overlapping the input area a certain distance apart from the input area based on a result of the determining.

20. The method of claim 15, wherein the displaying of the handwritten content comprises changing an arrangement of the plurality of objects included in the handwritten content based on a certain template.

21. The method of claim 15, wherein the processing of the respective plurality of objects comprises:
- generating a plurality of pieces of thumbnail information corresponding to the plurality of objects; and
- matching up the plurality of pieces of thumbnail information and additional information of the plurality of objects.

22. The method of claim 15, wherein the displaying of the handwritten content comprises:
- displaying the handwritten content in a first area of the screen; and
- displaying a list of thumbnail information corresponding to the respective plurality of objects in a second area of the screen.

23. The method of claim 15, further comprising:
- receiving a third input for selecting a plurality of pieces of handwritten content; and
- displaying a list of thumbnail information corresponding to objects included in the plurality of pieces of handwritten content.

24. The method of claim 23, further comprising:
- receiving a fourth input for selecting first thumbnail information from the list; and
- displaying additional information of a first object corresponding to the first thumbnail information.

25. The method of claim 23, further comprising:
- receiving a fourth input for selecting first thumbnail information from the list;
- retrieving a first piece of handwritten content including a first object corresponding to the selected first thumbnail information from among the plurality of pieces of handwritten content; and
- displaying the retrieved first piece of handwritten content.

26. The method of claim 23, further comprising:
- receiving a retrieval condition;
- retrieving at least one object satisfying the retrieval condition; and
- displaying a list of thumbnail information corresponding to the at least one retrieved object.

27. The method of claim 15, wherein the displaying of the handwritten content comprises:
- determining access rights information for the respective plurality of objects included in the handwritten content; and
- displaying some of the plurality of objects based on the access rights information.

28. At least one non-transitory computer-readable recording medium for storing a computer program, configured to be readable by at least one processor, for instructing the at least one processor to execute a computer process for performing the method of claim 15.

* * * * *